US005982373A

United States Patent [19]

Inman et al.

[11] Patent Number: 5,982,373

[45] Date of Patent: Nov. 9, 1999

[54] DYNAMIC ENHANCEMENT/REDUCTION OF GRAPHICAL IMAGE DATA RESOLUTION

[75] Inventors: Jennifer F. Inman, San Francisco; Wade K. Smith, Sunnyvale; Sanford S. Lum, San Jose, all of Calif.

[73] Assignee: Chromatic Research, Inc., Sunnyvale, Calif.

[21] Appl. No.: 08/747,374

[22] Filed: Nov. 12, 1996

[51] Int. Cl.$^{6}$ .................................................... G06T 15/00

[52] U.S. Cl. ............................................................ 345/419

[58] Field of Search ............................... 345/419, 427–8, 345/433, 439

[56] References Cited

U.S. PATENT DOCUMENTS

| | | | |
|---|---|---|---|
| 5,544,291 | 8/1996 | Gilley et al. | 345/423 |
| 5,577,960 | 11/1996 | Sasaki | 463/32 |
| 5,586,223 | 12/1996 | Mio et al. | 345/428 |
| 5,598,517 | 1/1997 | Watkins | 345/441 |
| 5,613,051 | 3/1997 | Iodice et al. | 345/428 |
| 5,661,824 | 8/1997 | Allebach et al. | 382/298 |
| 5,673,376 | 9/1997 | Ray et al. | 345/427 |
| 5,689,343 | 11/1997 | Loce et al. | 358/298 |

OTHER PUBLICATIONS

Wee–Chiew, et al, "Low–Power Polygon Renderer for Computer Graphics", *Application Array Processors, 1993 International Conference*, pp. 200–213.

McMillan, et al, "Pleoptic Modeling: An Image–Based Rendering System", *ACM Siggraph '95, Computer Graphics Proceedings*, pp. 39–46.

Toborg, et al, "Talisman: Commodity Realtime 3D Graphics for the PC", *ACM Siggraph '96, Computer Graphics Proceedings*, Aug. 4–9, 1966, pp. 39–46.

Bergman, et al, "Image Rendering by Adaptive Refinment", *ACM Siggraph '86*, Aug. 18–22, 1986, vol. 20, No. 4, pp. 29–37.

*Primary Examiner*—Mark R. Powell
*Attorney, Agent, or Firm*—Skjerven, Morrill, MacPherson, Franklin and Friel; Edward C. Kwok; Fabio E. Marino

[57] ABSTRACT

A method of rendering 3-D graphical image data suitable for use in interactive 3-D applications is provided, which reduces the amount of time required to perform the rendering. This is achieved by dynamically adjusting the resolution of the image depending upon the type of operation being performed. 3-D operations are performed at a reduced resolution, while 2-D operations (including display) are performed at full resolution. A method of dynamically enhancing/reducing resolution for image depth information (z-buffer data) is also provided.

17 Claims, 27 Drawing Sheets

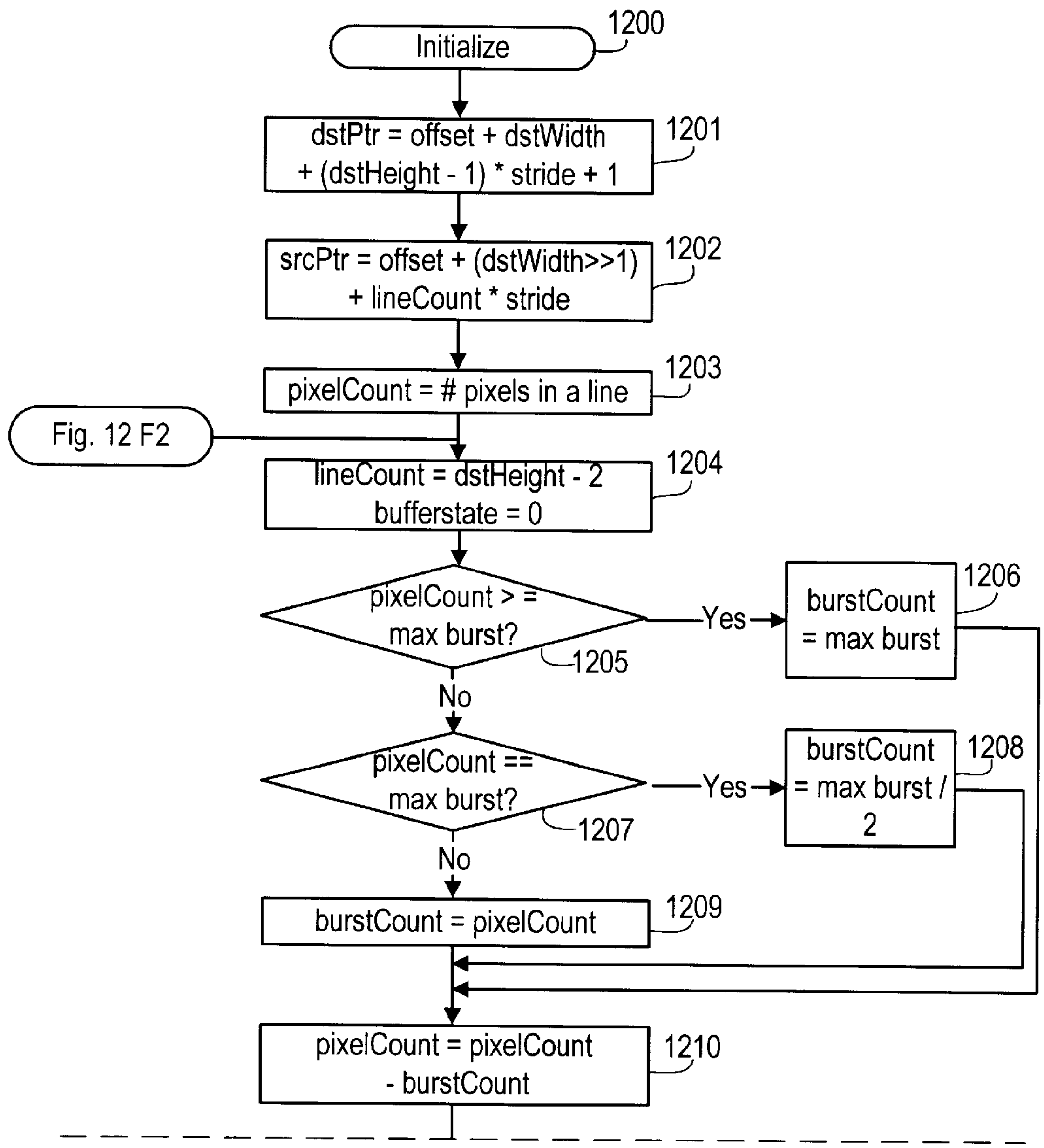
Fig. 12 A1

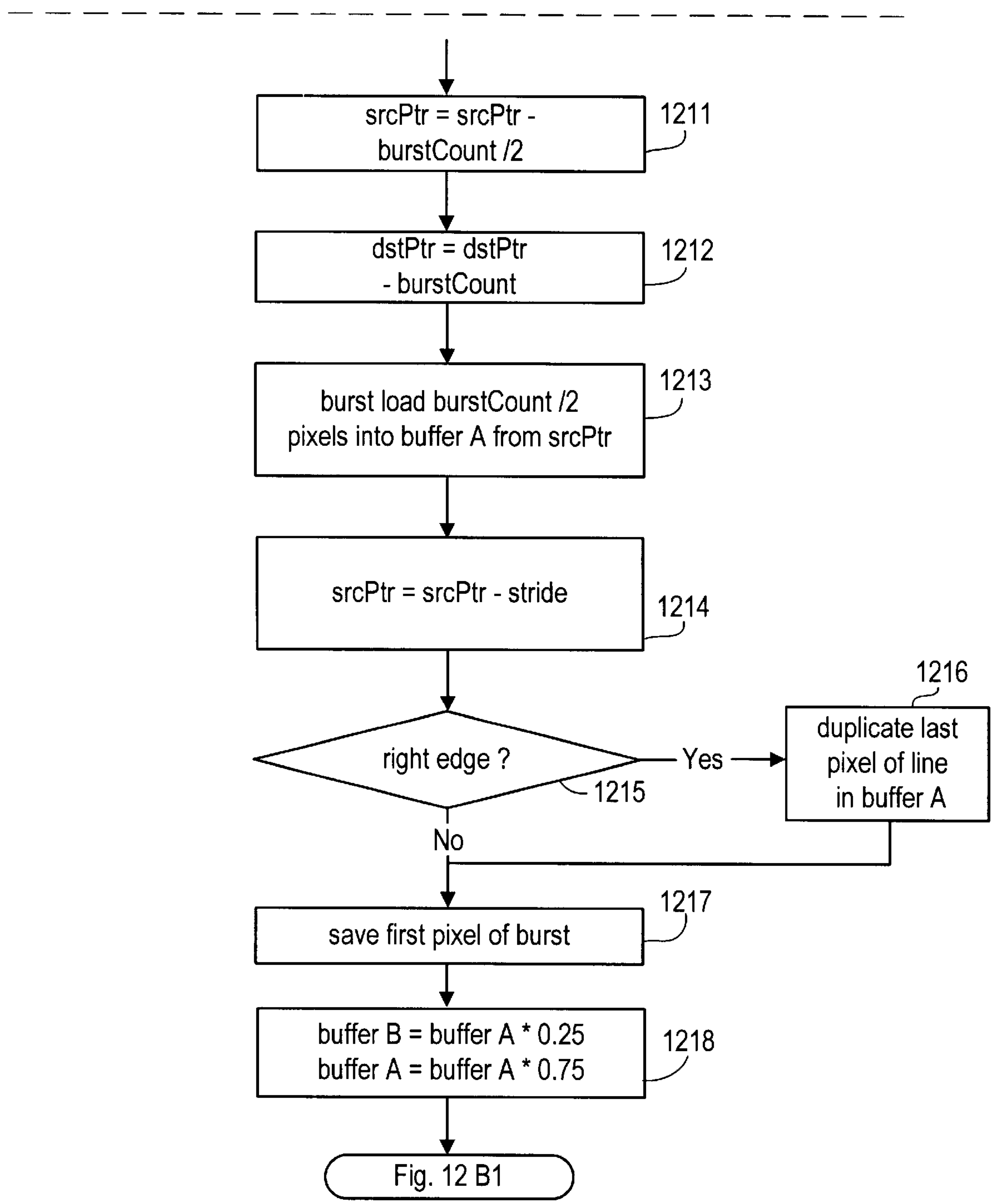
Fig. 12 A2

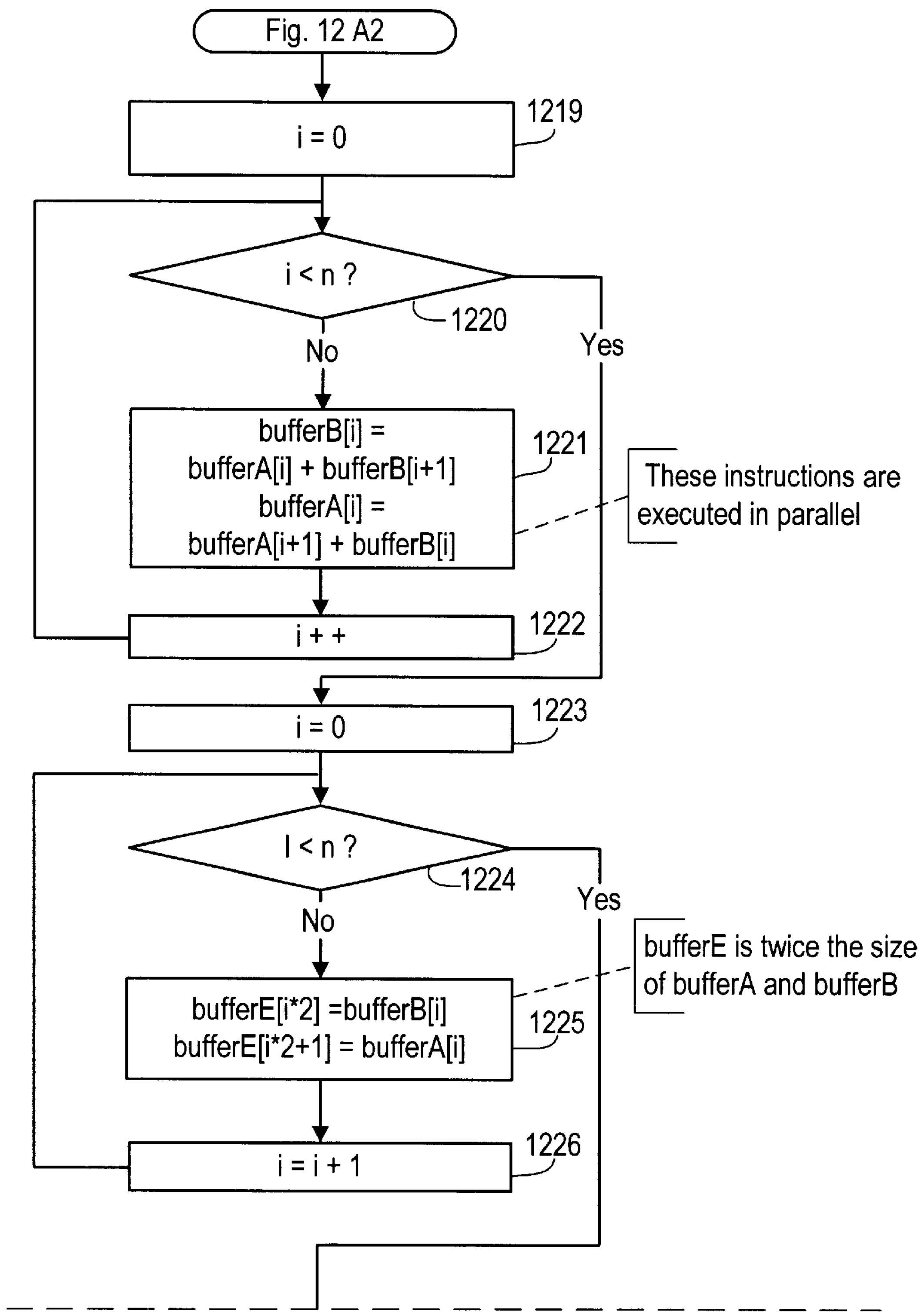
Fig. 12 B1

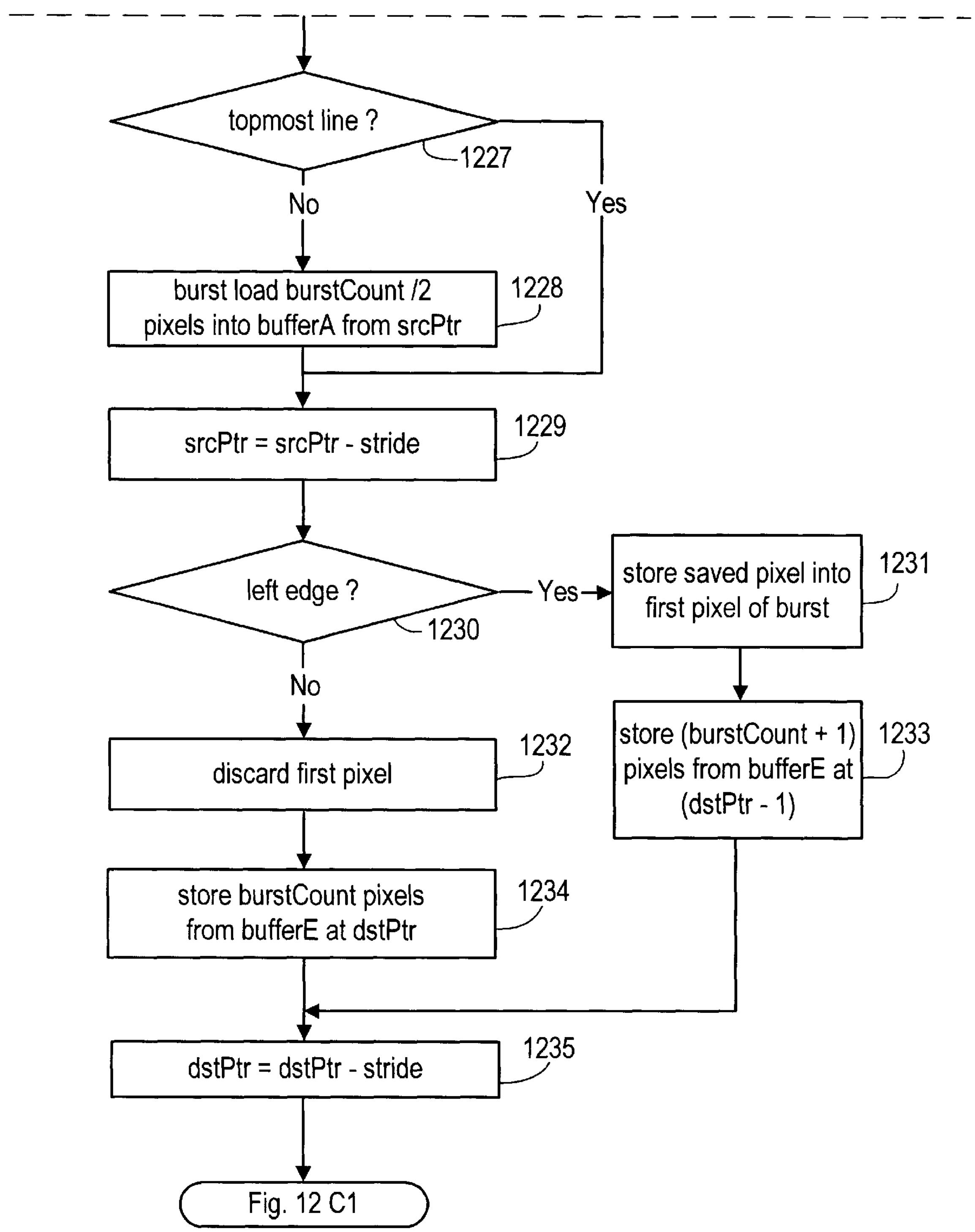
Fig. 12 B2

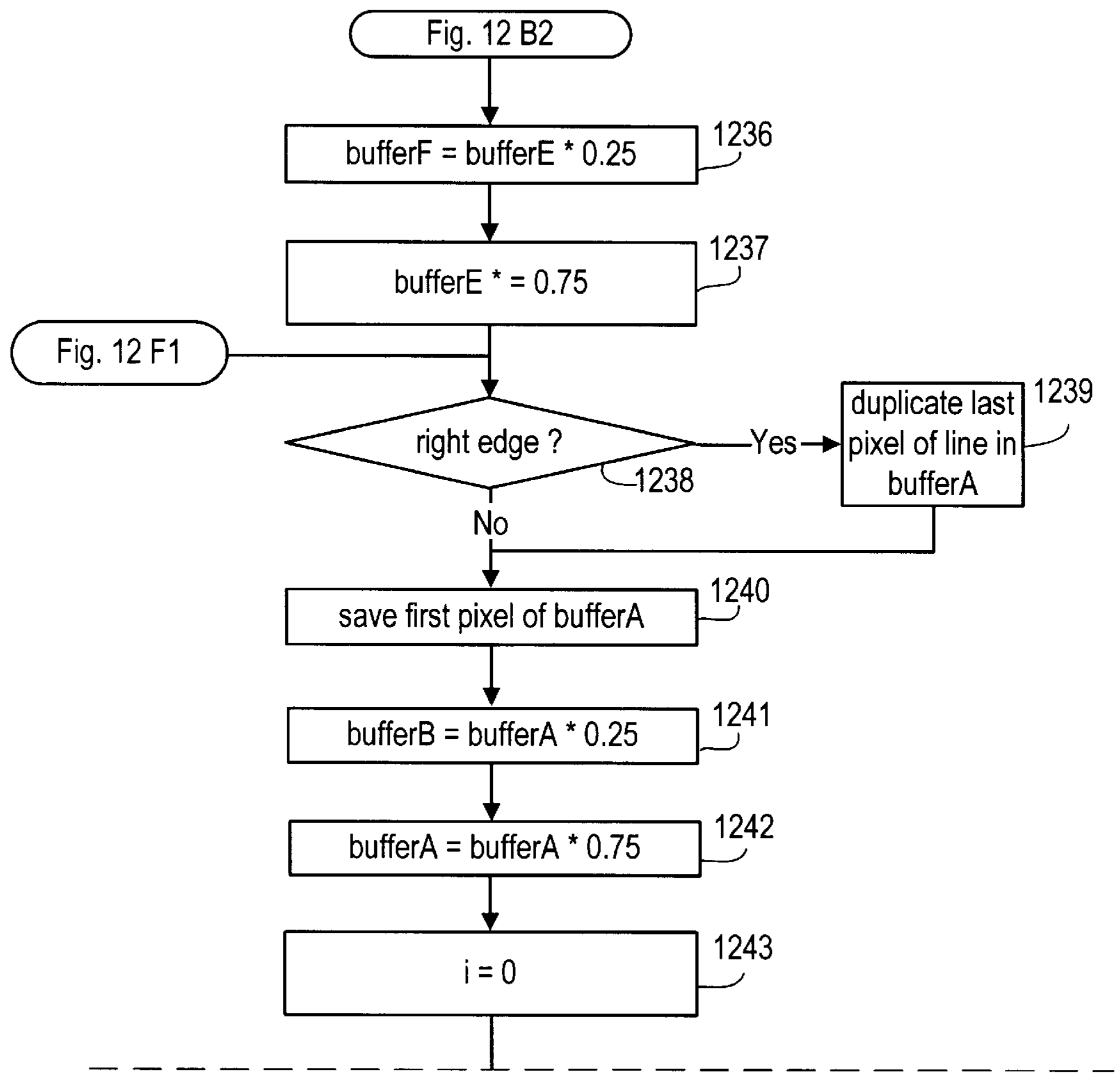
Fig. 12 C1

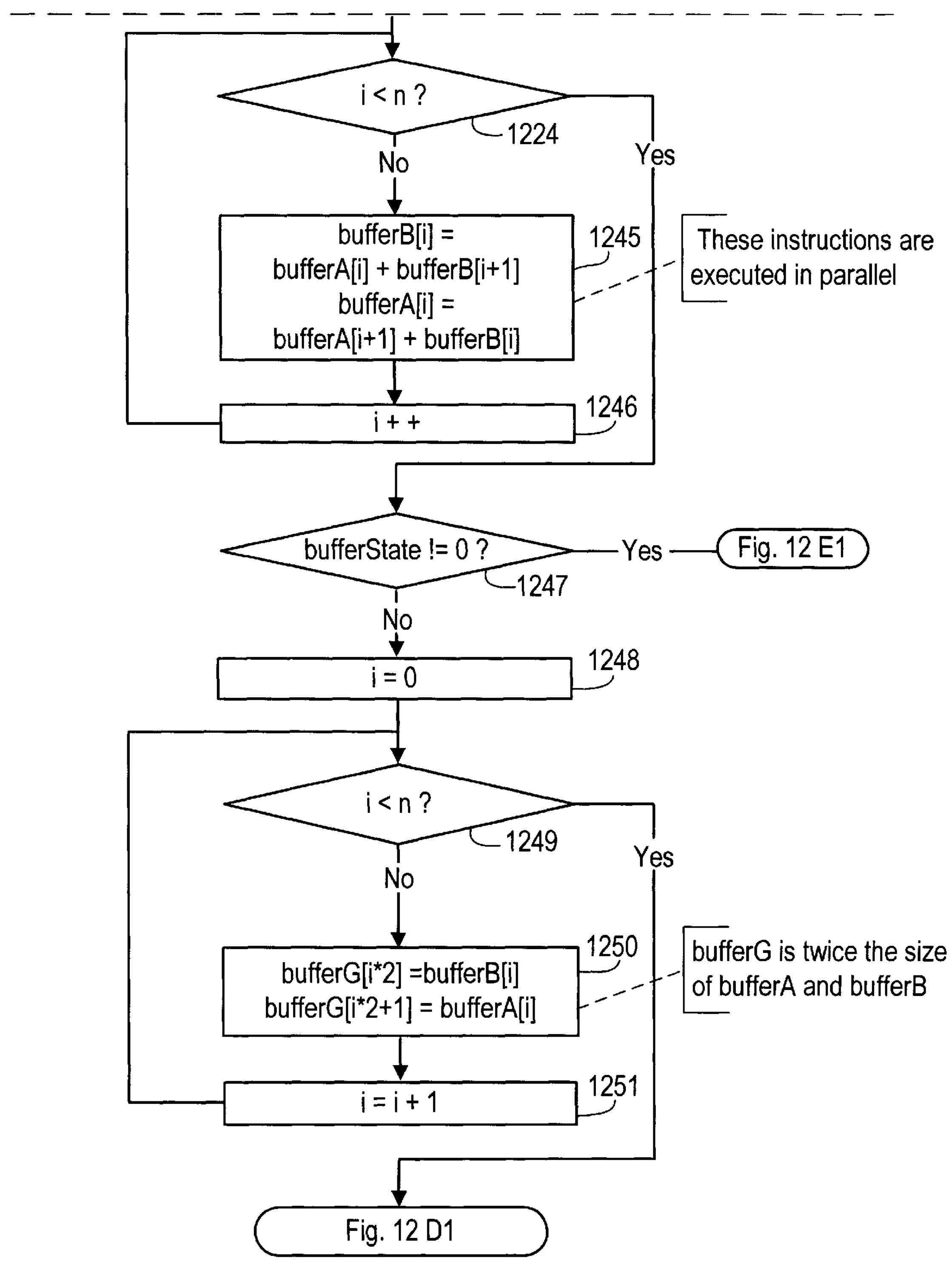
Fig. 12 C2

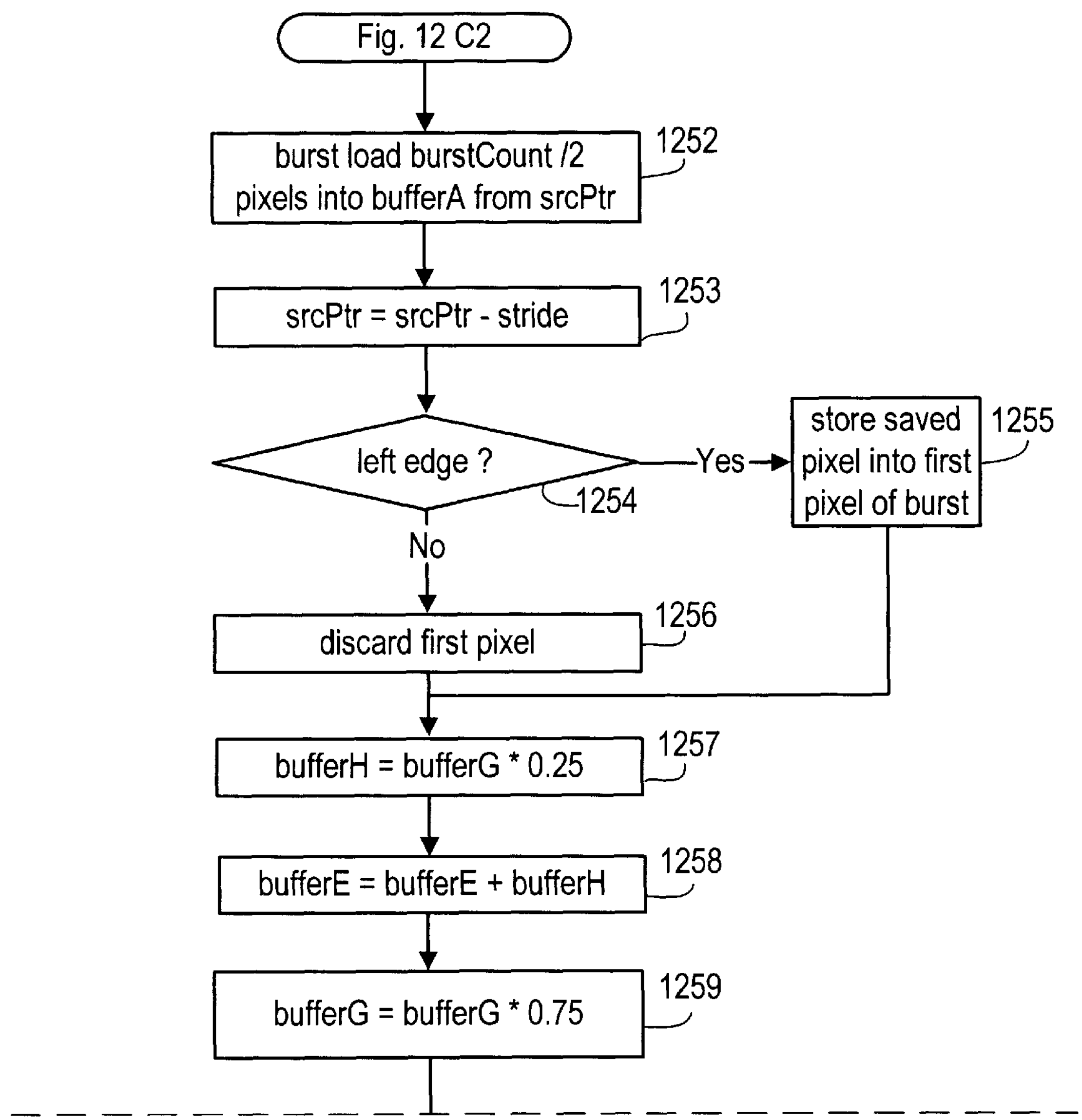
Fig. 12 D1

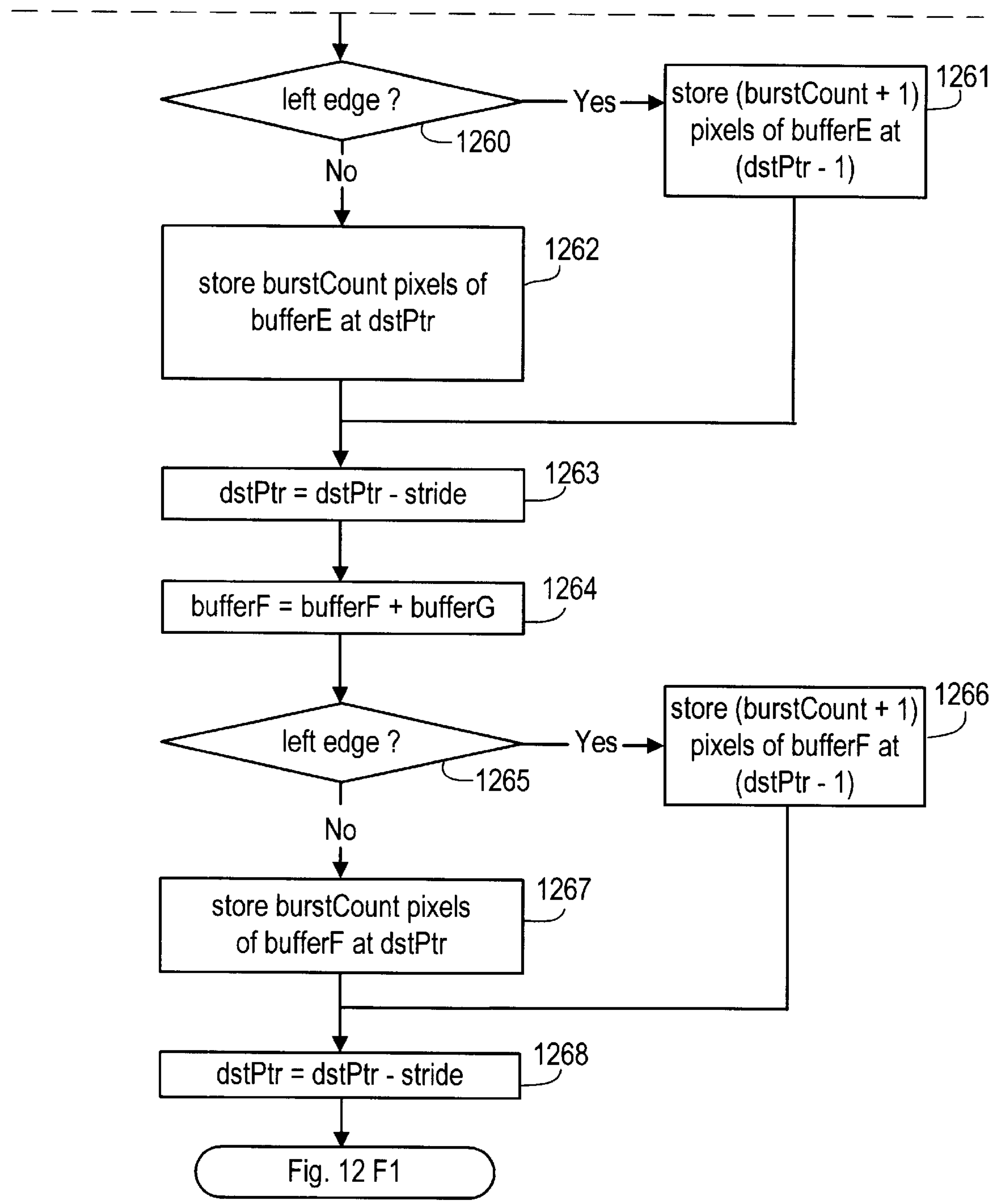
Fig. 12 D2

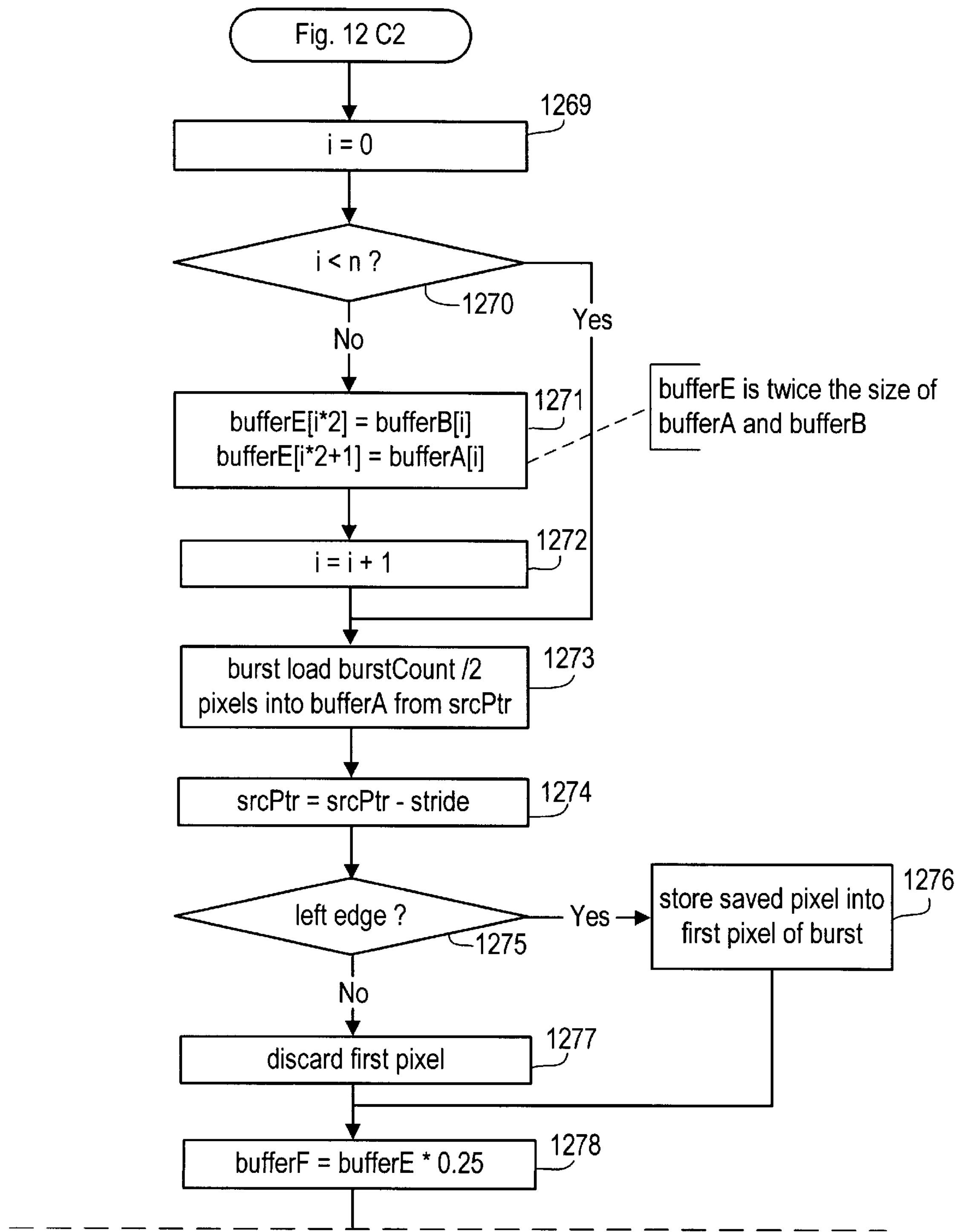
Fig. 12 E1

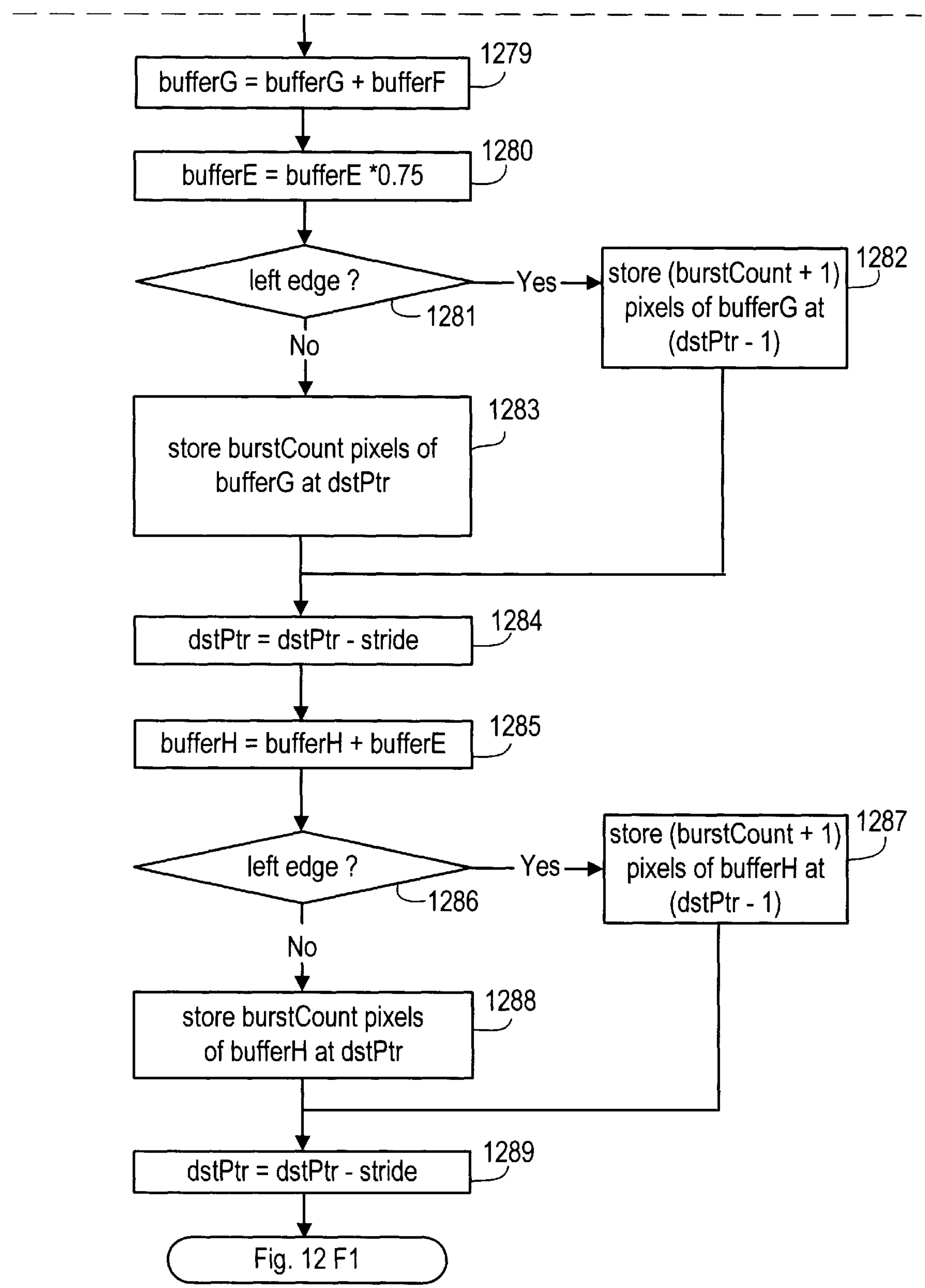
Fig. 12 E2

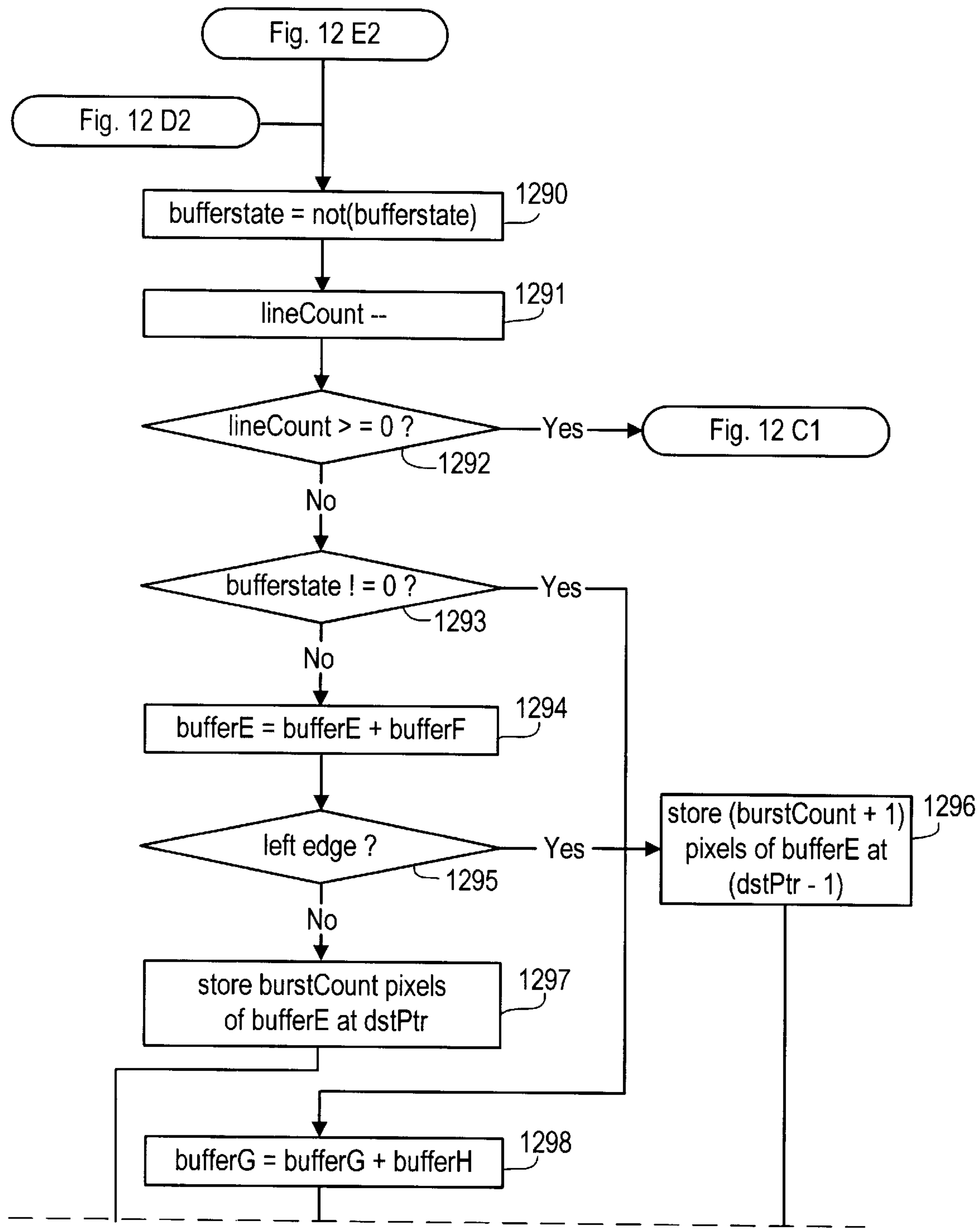
Fig. 12 F1

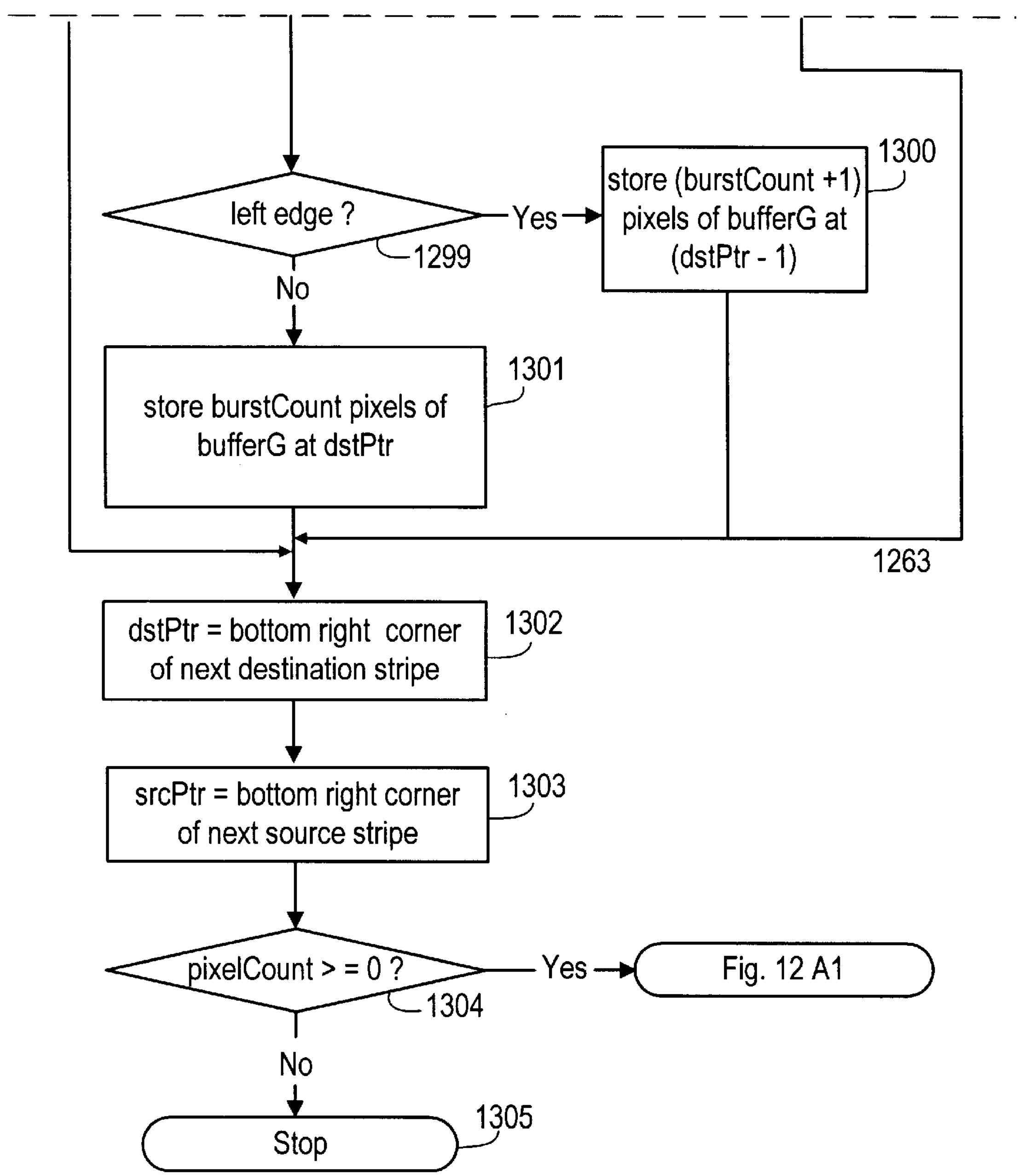
Fig. 12 F2

DYNAMIC ENHANCEMENT/REDUCTION OF GRAPHICAL IMAGE DATA RESOLUTION

CROSS REFERENCE TO APPENDIX INCLUDING A COMPUTER PROGRAM LISTING

Appendix A, which is a part of the present disclosure, is an appendix consisting of 16 sheets of listing of a computer program and related data in one embodiment of this invention. This listing of computer programs contains material which is subject to copyright protection. The copyright owner has no objection to the facsimile reproduction by anyone of the patent document or the present disclosure, as it appears in the Patent and Trademark Office patent files or records, but otherwise reserves all copyright rights whatsoever.

BACKGROUND OF THE INVENTION

1. Field of the Invention

The present invention relates generally to a method for performing three-dimensional (3-D) graphics on a computer and, in particular, to a method of accelerating rendering of 3-D images on a display device of a computer system with no incremental graphics memory requirements.

2. Description of Related Art

Multimedia computer systems often perform operations requiring the integration of rendered 3-D graphic image data and two-dimensional (2-D) graphics image data. A typical example of these operations is a flight simulator, where a 2-D image of the control panel of a simulated cockpit is displayed on one part of the screen and a 3-D rendered image simulating the landscape which would be seen by the pilot sitting in the cockpit is displayed on a separate part of the screen, partially hidden by the 2-D image of the control panel.

As the majority of multimedia computers include windowing systems, these images are displayed either in a window appearing on the screen or covering the entire screen. This scheme is illustrated in FIG. 1. In FIG. 1, a window 110 on display 120 of computer 130 shows an integrated picture 140 including a 2-D portion 150 and a rendered 3-D portion 160.

Since rendering the 3-D portion 160 of the image requires substantially more time than a single CRT frame scan of the display 120, the rendering is performed offline on a separate framebuffer (not shown). A framebuffer is a 2-D memory region whose locations map directly to pixel locations on display 120.

As rendering is a very time consuming operation, there is a need for a method of rendering which reduces the amount of time required to render 3-D image data in interactive applications.

SUMMARY OF THE INVENTION

The present invention provides a method of rendering 3-D graphical image data suitable for use in interactive 3-D applications which reduces rendering time. The rendering time is reduced by rendering the 3-D image data at a reduced resolution while the rendered image is not being displayed, dynamically enhancing the resolution before the rendered image data is displayed, and reducing the resolution before 3-D rendering commences. As 3-D rendering at partial resolution and enhancing the resolution of the rendered image data is substantially faster than continuously rendering at full resolution, this method increases the overall performance of the system in interactive 3-D rendering applications.

Some embodiments of the present invention further provide several filtering methods to enhance the quality of the image when computed at lower resolutions. As a result, the user is able to select an appropriate balance of quality of the rendering vs. performance of the system.

In addition, some embodiments provide a method of enhancing/reducing resolution for image depth information (z-buffer data) similar to the method used for enhancing/reducing the resolution of image data. Finally, some embodiments perform the enhancement/reduction of image resolution operations without requiring additional memory space.

BRIEF DESCRIPTION OF THE DRAWINGS

FIGS. 12A–12F are flow diagrams of a center-biased bilinear interpolation operation according to one embodiment of the present invention.

DESCRIPTION OF PREFERRED EMBODIMENTS

Figure 1:
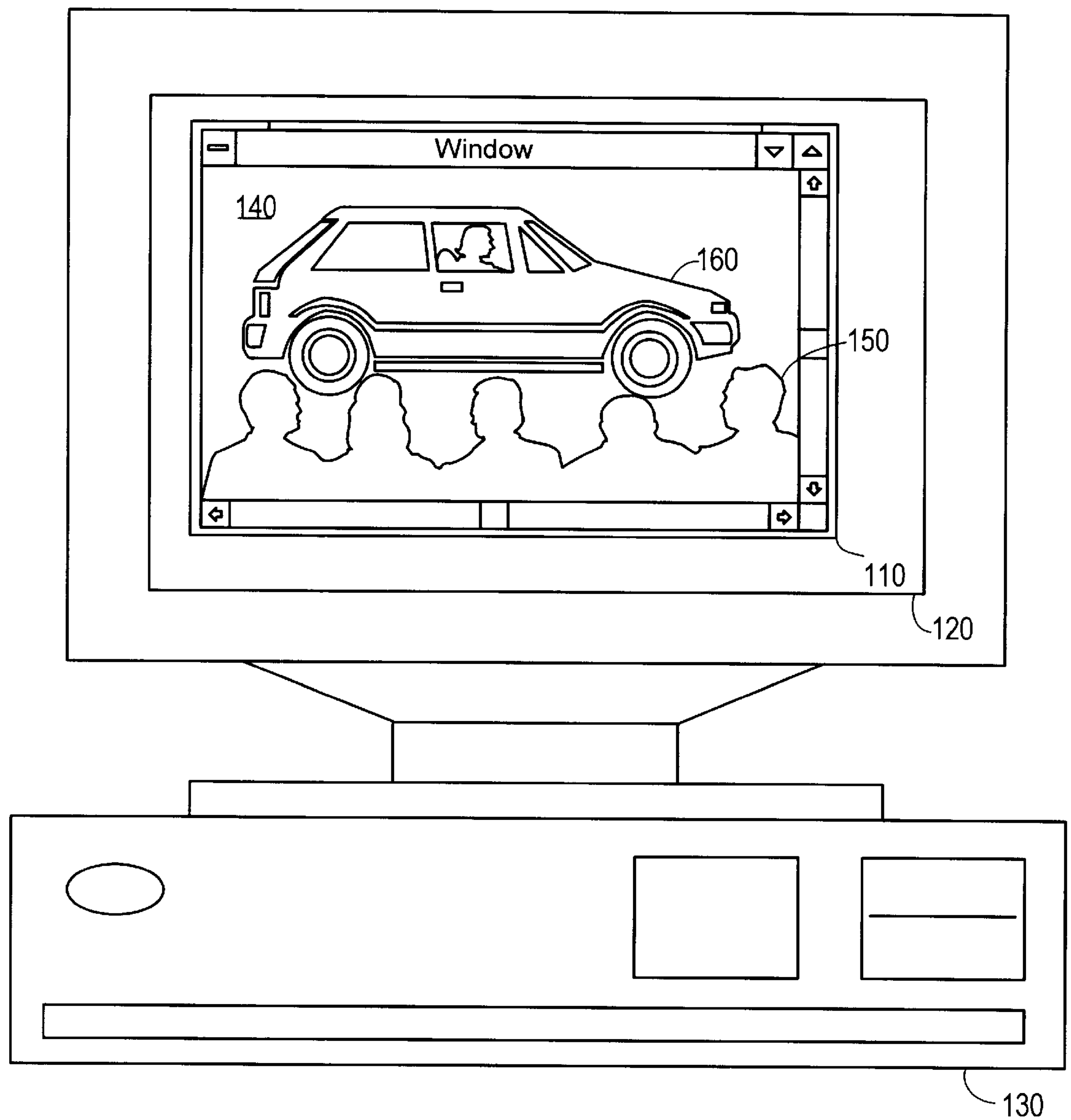
FIG. 1 illustrates a prior art application displaying integrated 2-D/3-D graphical image data on a computer screen device.
Figure 2A:
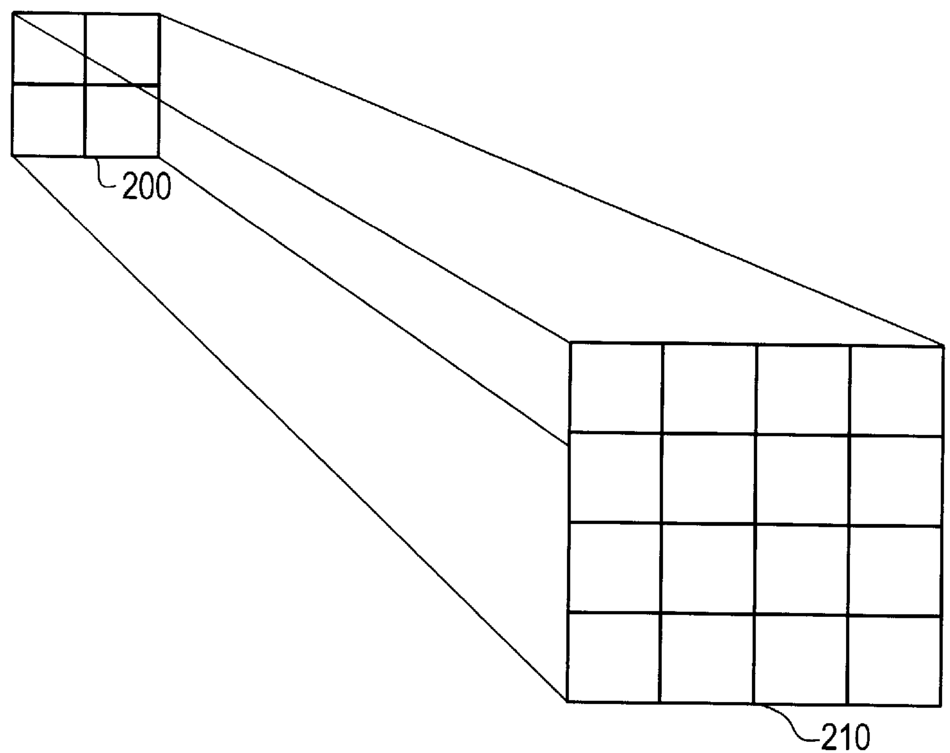
FIG. 2A is a block diagram of a resolution enhancing (expand) operation.

The present invention provides a method of dynamically enhancing and reducing the resolution of the rendering of a 3-D graphical image. Image resolution enhancement is achieved by increasing the number of pixel values-used to represent the rendered image. For example, if the image is represented by four pixels arranged in a 2×2 grid, the resolution can be enhanced by representing the image with sixteen pixels arranged in a 4×4 grid. The operation by which a grid is transformed into a larger grid is known as an "expand" operation. FIG. 2A illustrates an expand operation in accordance to the present invention. In FIG. 2A, low resolution grid 200 is transformed into high resolution grid 210.

Figure 2B:
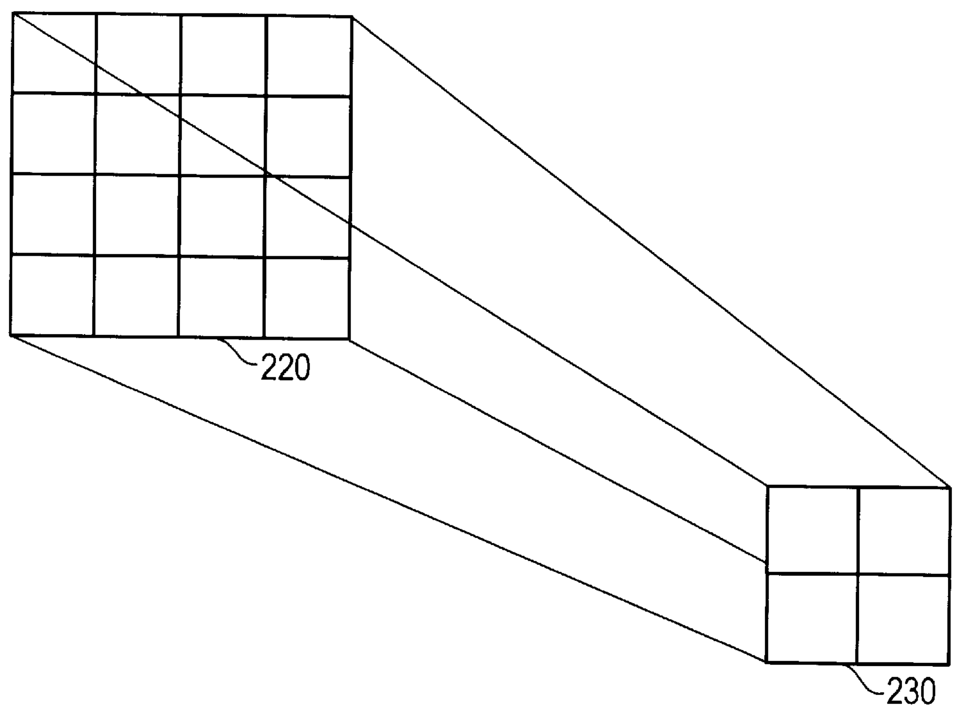
FIG. 2B is a block diagram of a resolution reducing (shrink) operation.

Conversely, the operation by which a grid is transformed into a smaller grid is known as a "shrink" operation. FIG. 2B illustrates a shrink operation in accordance to the present invention. In FIG. 2B, high resolution grid 220 is transformed into low resolution grid 230.

Several techniques can be used to perform the shrink and expand operations. Some techniques yield better image quality, while other techniques yield better system performance (i.e. require less time to execute). Thus, there is a trade-off between image quality and performance.

Figure 3A:
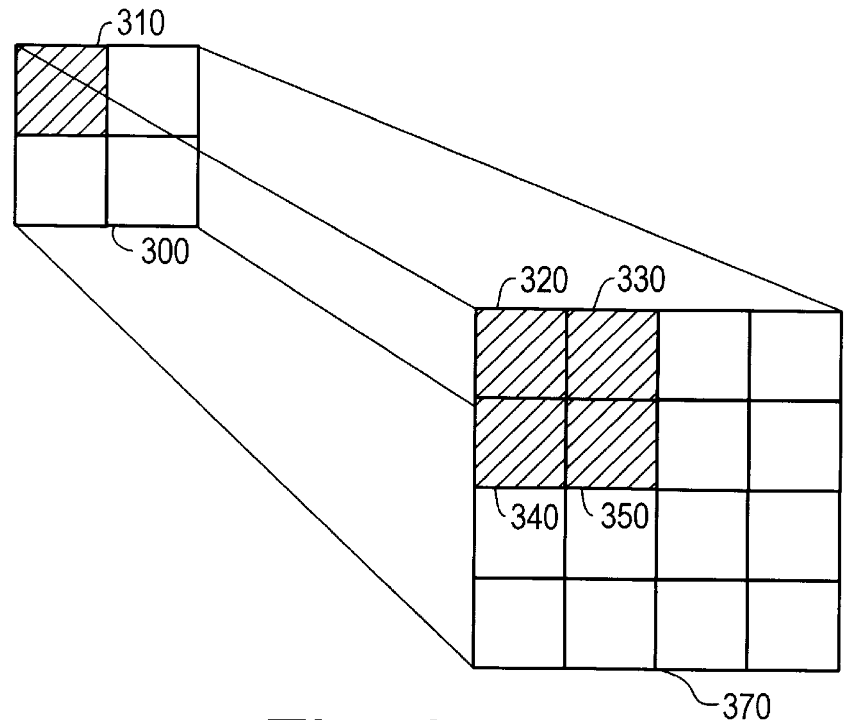
FIG. 3A is a block diagram of a pixel replication operation according to one embodiment of the present invention.

The simplest and the most efficient technique to perform both expand and shrink operations consists of simply replicating or discarding pixels. In the case of an expand operation, one pixel in the lower resolution grid is replicated a number of times equal to the ratio of the size of the larger grid to the smaller grid. For example, if the smaller grid is 2×2 pixels in size and the larger grid is 4×4 pixels in size, each pixel in the smaller, low resolution grid is replicated four times in the larger, high resolution grid. This technique, known as pixel replication, is illustrated in FIG. 3A. In FIG. 3A, pixel 310 in low resolution grid 300 is copied into pixels 320, 330, 340 and 350 of grid 370.

Figure 3B:
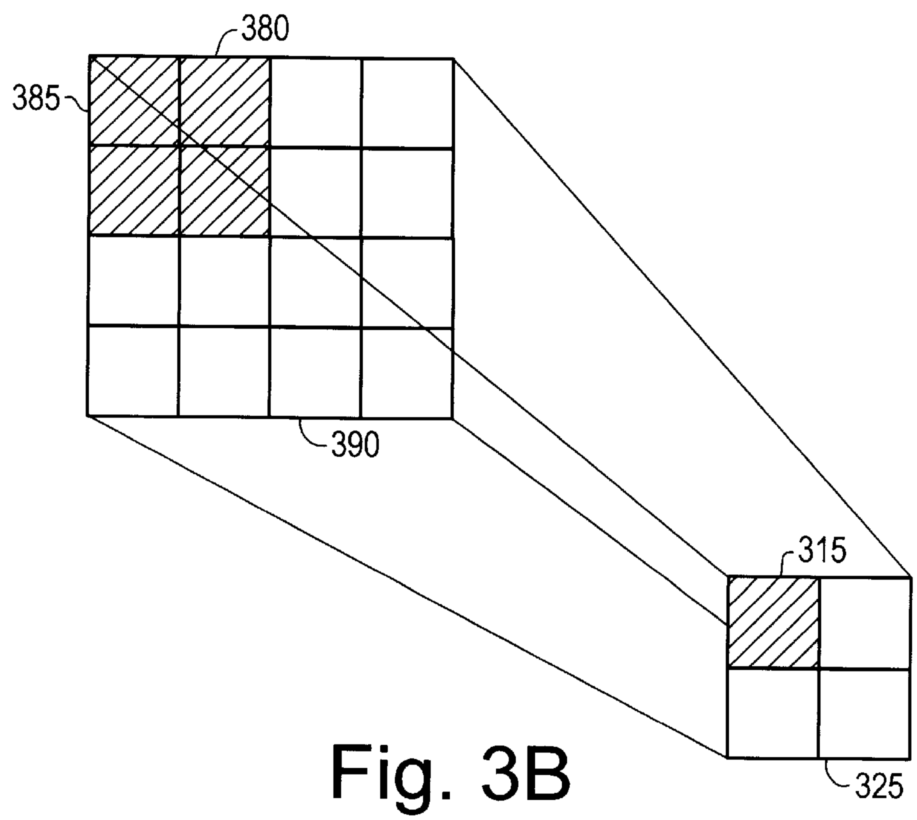
FIG. 3B is a block diagram of a pixel decimation operation according to one embodiment of the present invention.

In the case of a shrink operation, on the other hand, only one of a group of pixels in the larger grid is copied into the smaller grid. The pixel selected out of the group is usually, but not necessarily, picked in a fixed relationship to the other pixels in the group. For example, if the larger grid is 4×4 pixels in size and the smaller grid is 2×2 pixels in size, only four pixels out of sixteen in the larger grid are copied into the smaller grid. Thus, for each 2×2 pixel block in the larger grid, one pixel is selected to be copied to the smaller grid. This technique, known as pixel decimation, is illustrated in FIG. 3B. In FIG. 3B, only one pixel in pixel group 380 of grid 390 is copied into pixel 315 of grid 325. In the example of FIG. 3B, the pixel selected out of pixel group 380 is pixel 385 in the upper left end corner of pixel group 380. Accordingly, the four pixels selected for copying into grid 325 all occupy the upper left corner position in their respective pixel groups.

Figure 4A:
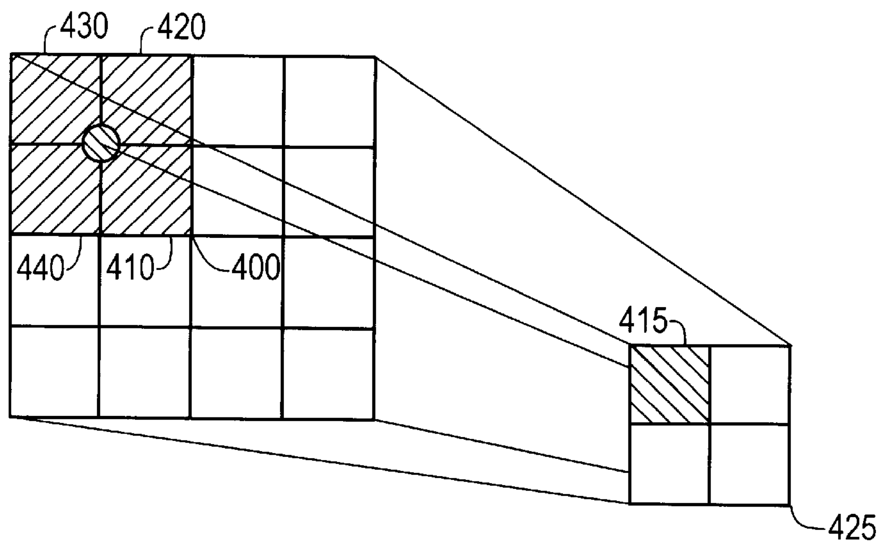
FIG. 4A is a block diagram of a pixel averaging operation according to one embodiment of the present invention.

However, while pixel replication and pixel decimation can be performed very efficiently, they do not yield very high image quality. Other techniques can be used to improve the quality of the image resulting from shrink and expand operations. One such technique consists of averaging pixel values in a pixel block during a shrink operation. This technique, known as pixel averaging, is illustrated in FIG. 4A. In FIG. 4A, pixel group 400 is comprised by pixels 410, 420, 430 and 440. Rather than simply selecting one of the pixel values, as in pixel decimation, the RGB values of pixels 410, 420, 430 and 440 are averaged together and the resulting value is copied into pixel 415 of low resolution grid 425.

Figure 4B:
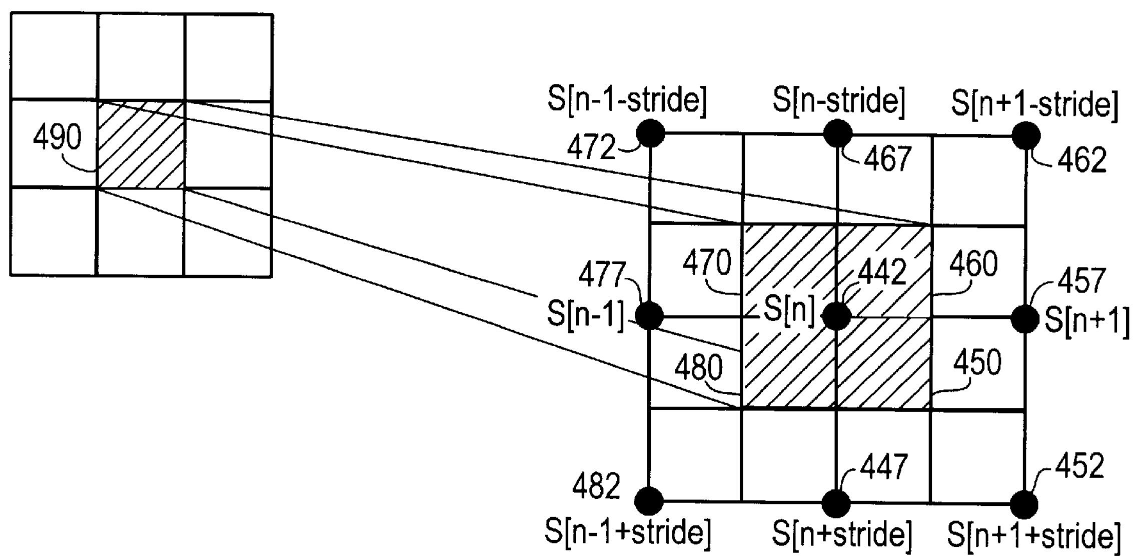
FIG. 4B is a block diagram of a center-biased bilinear interpolation operation according to one embodiment of the present invention.

Another technique which yields better image quality consists of interpolating pixel values during an expand operation. This technique, known as center-biased bilinear interpolation, is illustrated in FIG. 4B. In FIG. 4B, the values of pixels 450, 460, 470 and 480 of the high resolution grid are calculated by averaging the values of the closest corresponding pixels in the low resolution grid, namely pixels 442, 447, 452, 457, 462, 467, 472, 477 and 482. The pixel values for pixels 450, 460, 470 and 480 are calculated according to the following formulas, where Pa is the pixel value of pixel 470, Pb is the pixel value of pixel 460, Pc is the pixel value of pixel 480 and Pd is the pixel value of pixel 450:

Pa=0.75*(0.25*S[n−1]+0.75*S[n])+0.25*(0.25*S[n−1−stride]+0.75*S[n−stride])

Pb=0.75*(0.75*S[n]+0.25*S[n+1])+0.25*(0.25*S[n+1−stride]+0.75*S[n−stride])

Pc=0.75*(0.25*S[n−1]+0.75*S[n])+0.25*(0.25*S[n−1+stride]+0.75*S[n+stride])

Pd=0.75*(0.75*S[n]+0.25*S[n+1])+0.25*(0.25*S[n+1+stride]+0.75*S[n+stride])

As these formulas approximate the value of each pixel by interpolating the values of the adjacent corresponding pixels in the low resolution grid, the pixels on the borders of the grid represent special cases in which the formulas above are replaced by the following:

Top and Bottom Line

Pa or Pc=0.25*S[n−1]+0.75*S[n]

Pb or Pd=0.75*S[n]+0.25*S[n+1]

Left and Right Edge

Pa or Pb=0.25*S[n−stride]+0.75*S[n]

Pc or Pd=0.25*S[n+stride]+0.75*S[n]

Corners

Pa or Pb or Pc or Pd=S[n]

where:

S[n] is the current source pixel 442

S[n+1] is the pixel 457 to the right of S[n]

S[n−1] is the pixel 477 to the left of S[n]

S[n+stride] is the pixel 447 below S[n]

S[n−stride] is the pixel 467 above S[n]

S[n+1+stride] is the pixel 452 below and to the right of S[n]

S[n−1+stride] is the pixel 482 below and to the left of S[n]

S[n+1−stride] is the pixel 462 above and to the right of S[n]

S[n−1−stride] is the pixel 472 above and to the left of S[n]

'stride' is a term which is synonymous with 'span' or 'pitch' which refers to the distance to the corresponding pixel on the next scan line.

The present invention uses shrink and expand operations to speed up rendering of 3-D graphical images in interactive applications. As a result, the present invention accelerates the rendering process by rendering at a lower resolution than the resolution of the image displayed to the user, and then dynamically enhancing the resolution of the rendered image via an expand operation when the image is about to be either displayed or modified by the client application. Display and modification are thus made at the high resolution of the displayed image. Once the image is no longer being displayed or has been modified by an application program, the image can be rendered again at the lower, faster, resolution. As a result, the resolution of the image is reduced via a shrink operation before 3-D rendering is resumed. This process is illustrated in FIGS. 5A–5E.

Figure 5A:
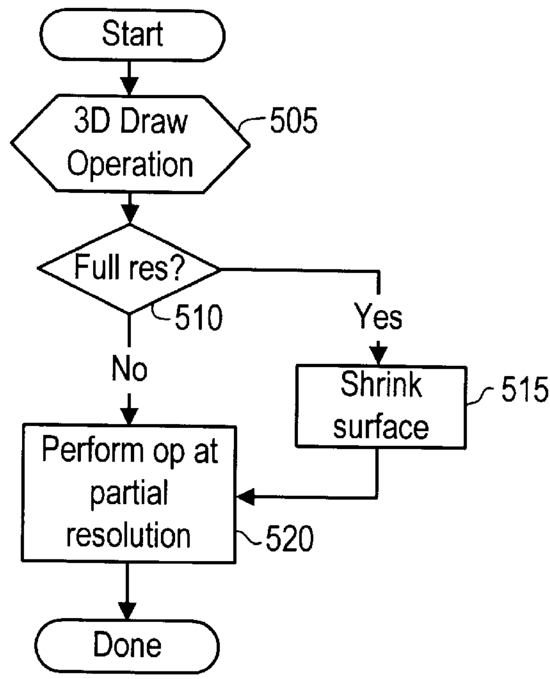
FIG. 5A is flow diagram of the process of dynamically enhancing/reducing the resolution of rendered image data for a 3D draw operation, according to one embodiment of the present invention.

FIG. 5A is a flow diagram of the process of dynamically enhancing/reducing the resolution of rendered image data for a 3-D draw operation. In FIG. 5A, a 3-D draw operation request is received in stage 505. It is then determined in stage 510 whether the surface is at full resolution, in which case the surface is shrunk in stage 515. The operation is then performed at partial resolution in stage 520.

Figure 5E:
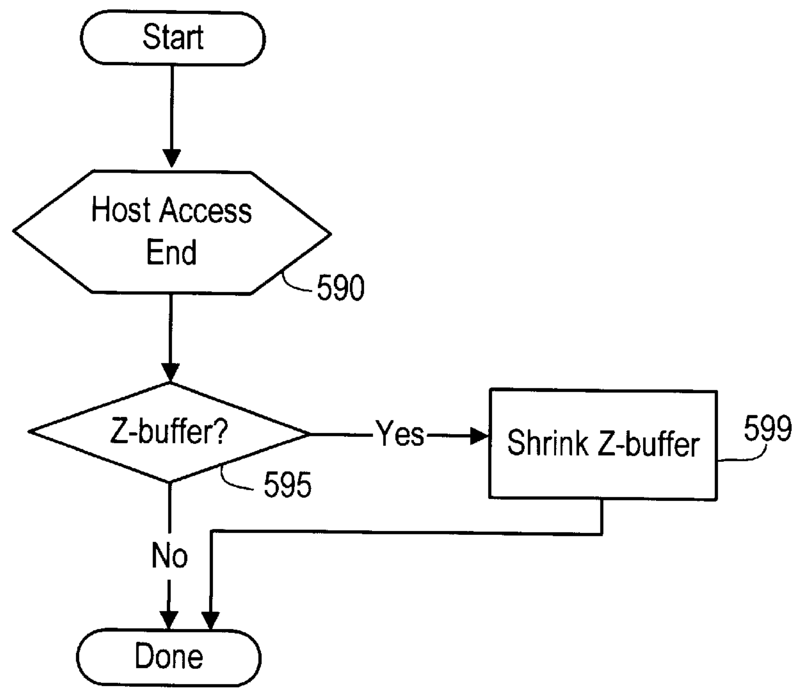
FIG. 5E is flow diagram of the process of dynamically enhancing/reducing the resolution of rendered image data for a surface unlock request, according to one embodiment of the present invention.
Figure 5B:
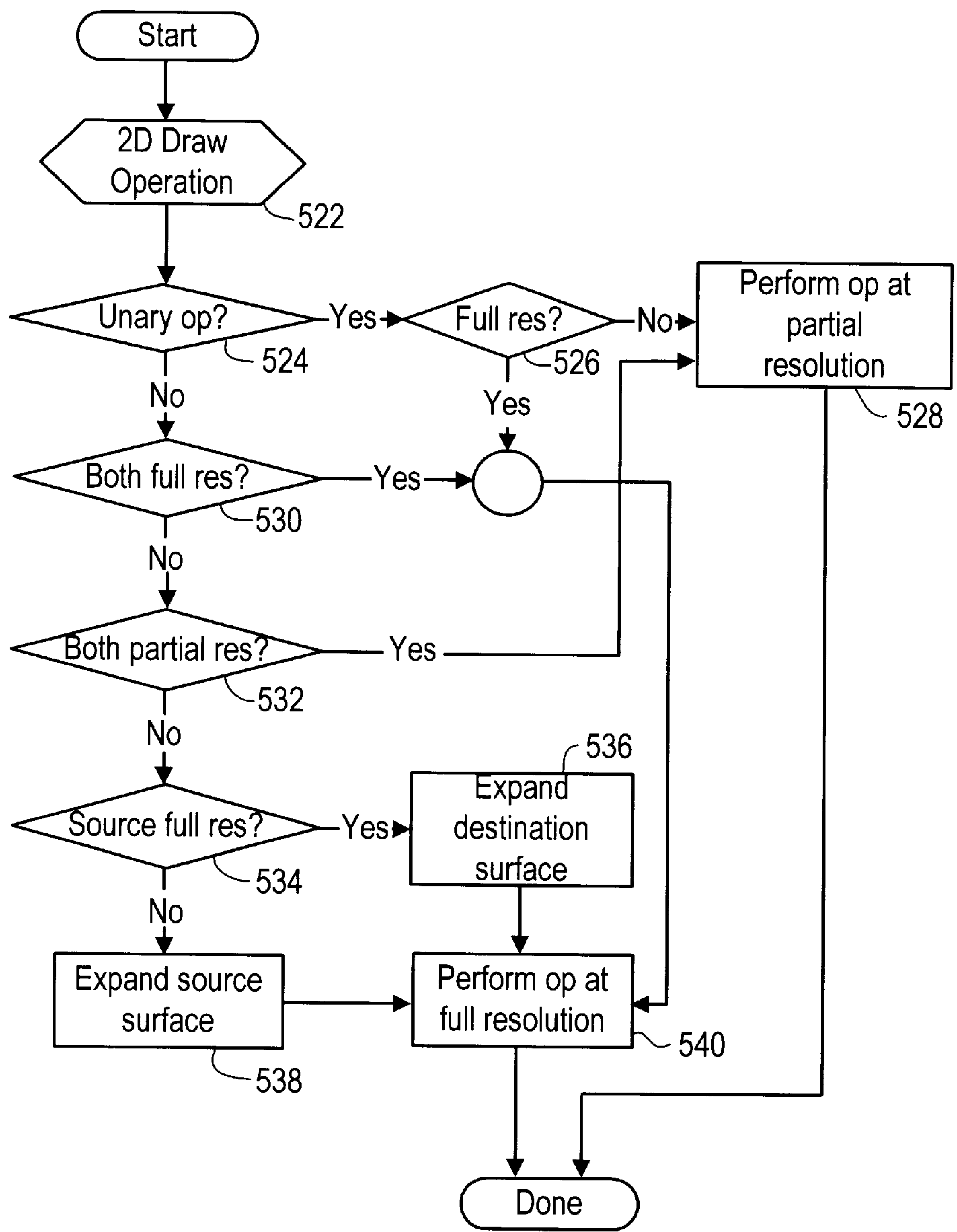
FIG. 5B is flow diagram of the process of dynamically enhancing/reducing the resolution of rendered image data for a 2D draw operation, according to one embodiment of the present invention.

FIG. 5B is a flow diagram of the process of dynamically enhancing/reducing the resolution of rendered image data for a 2-D draw operation. In FIG. 5B, a 2-D draw operation request is received in stage 522. It is then determined in stage 524 whether the operation requested is a unary or binary operation (i.e. whether the operation has a single destination surface or whether the operation has both a source and a destination surface). If the operation is unary, it is then determined in stage 526 whether the surface is at full resolution, in which case the operation is performed at full resolution in stage 540, otherwise the operation is performed at partial resolution in stage 528. If the operation is not unary, it is then determined in stage 530 whether both source and destination surfaces are at full resolution, in which case the operation is perfomed at full resolution in stage 540 If the surfaces are not both at full resolution, it is then determined in stage 532 whether the surfaces are both at partial resolution, in which case the operation is performed at partial resolution in stage 528. If the surfaces are not both at partial resolution, it is then determined in stage 534 whether the source surface is at full resolution, in which case the destination surface is expanded in stage 536 and the operation is performed at full resolution in stage 540, otherwise (i.e. if the destination surface is at full resolution), the source surface is expanded in stage 538 and the operation is performed at full resolution in stage 540.

Figure 5C:
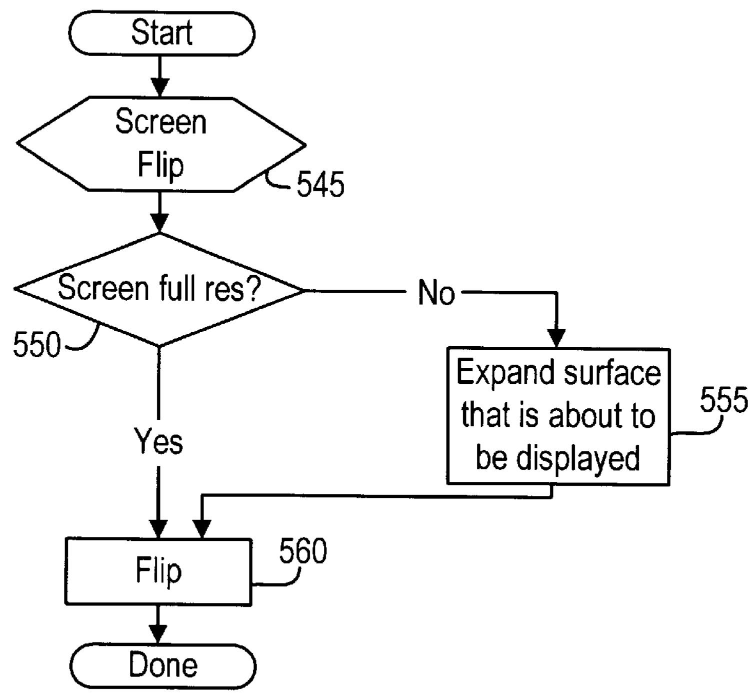
FIG. 5C is flow diagram of the process of dynamically enhancing/reducing the resolution of rendered image data for a screen flip request, according to one embodiment of the present invention.

FIG. 5C is a flow diagram of the process of dynamically enhancing/reducing the resolution of rendered image data for a screen flip request. In FIG. 5C, a screen flip request is received in stage 545. It is then determined in stage 550 whether the surface is at full resolution. If the surface is not at full resolution, the surface is expanded in stage 555. The flip operation is then performed in stage 560.

Figure 5D:
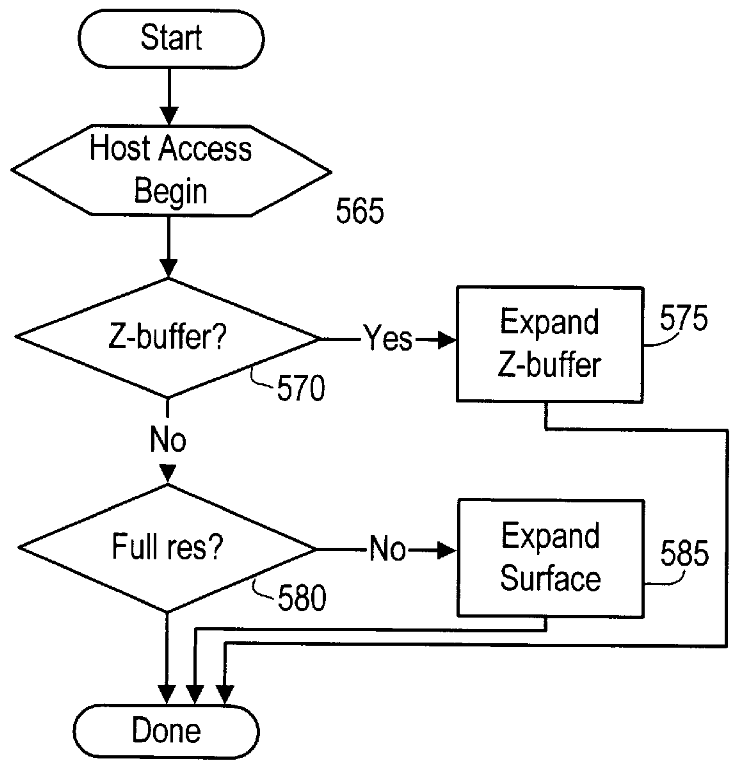
FIG. 5D is flow diagram of the process of dynamically enhancing/reducing the resolution of rendered image data for a surface lock request, according to one embodiment of the present invention.

FIG. 5D is a flow diagram of the process of dynamically enhancing/reducing the resolution of rendered image data for a surface lock request. In FIG. 5D, a host access begin request is received in stage 565. It is then determined in stage 570 whether the source surface is a z-buffer, in which case the z-buffer is expanded in stage 575, otherwise it is determined in stage 580 whether the surface is at full resolution. If the surface is not at full resolution, the surface is expanded in stage 585.

FIG. 5E is a flow diagram of the process of dynamically enhancing/reducing the resolution of rendered image data for a surface unlock request. In FIG. 5E a host access end request is received in stage 590. It is then determined in stage 595 whether source surface is a z-buffer, in which case the z-buffer is shrunk in stage 599. Automatically shrinking a z-buffer surface during an unlock operation is a design choice, due to the relative infrequency of 2-D operations on z-buffers. As a result, in some embodiments the z-buffer is shrunk only before 3-D rendering commences.

A special problem is posed by performing shrink and expand operations when z-buffer compositing is used. Z-buffer compositing is a technique used to render complex scenes having a fairly static background and a fairly dynamic foreground. Accordingly, a high resolution image of the background is blitted (i.e. copied) with a high resolution image of the moving foreground. Since the background does not change, only the foreground objects need to be rendered. Accordingly, a high resolution pre-rendered image with depth (z-buffer) information is used as a background. The dynamic objects are rendered onto the background with the depth of those objects used to control the composition of the resulting image. Since depth information is not necessarily continuous across object/pixel boundaries, applying the techniques described above for improving the image quality during shrink and expand operations to z-buffer information would yield unsatisfactory results. The special case method used to shrink and expand z-buffer data is illustrated in FIGS. 6A and 6B.

Figure 6A:
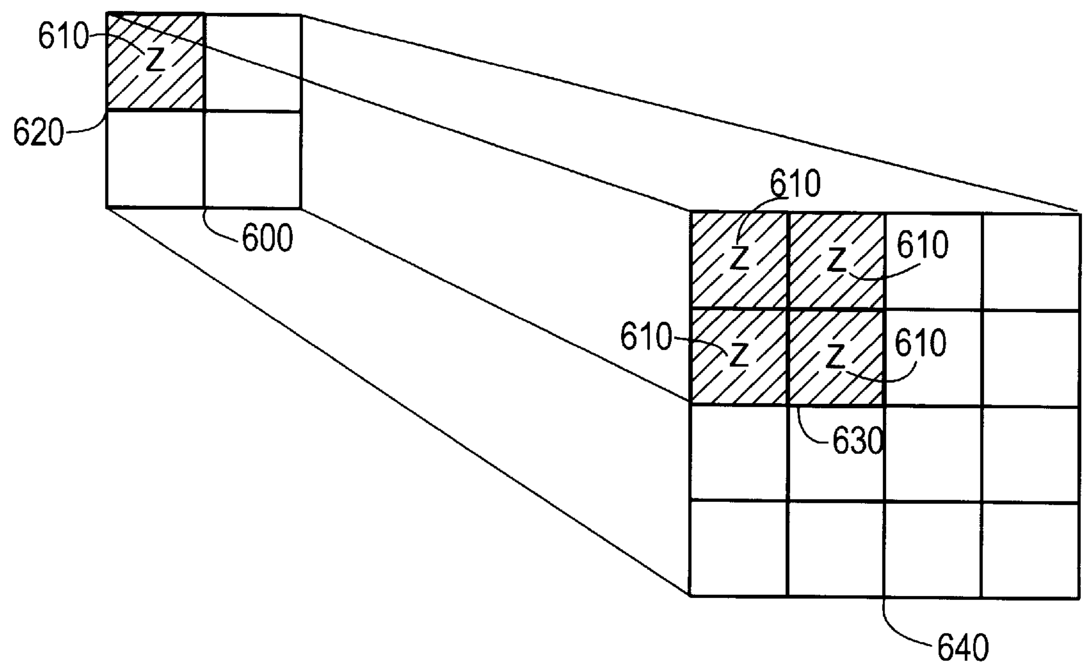
FIG. 6A is a block diagram of an image depth resolution enhancement operation according to one embodiment of the present invention.

In FIG. 6A, 2×2 pixel grid 600 is expanded to 4×4 pixel grid 640 by replicating the z-buffer value 610 of pixel 620 in all pixels of pixel block 630. Note that this method is analogous to the pixel replication technique described above for an expand operation.

Figure 6B:
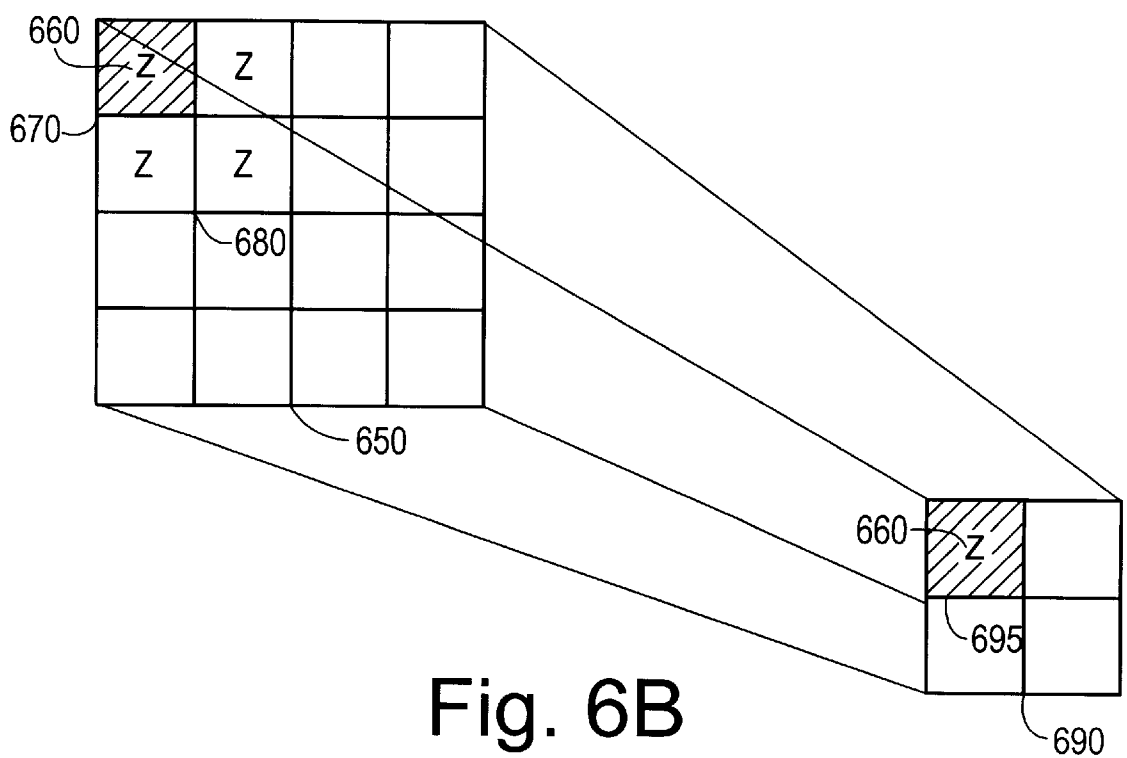
FIG. 6B is a block diagram of an image depth resolution reduction operation according to one embodiment of the present invention.

In FIG. 6B, 4×4 pixel grid 650 is shrunk into 2×2 pixel grid 690 by copying z-buffer value 660 of pixel 670 into pixel 695. However, as z-buffer value 660 really represents the upper left corner of pixel 695, subpixel correction is used to render pixel 695 by moving its center to the upper left corner.

A video display driver incorporating the principles of the present invention and used to drive a graphic accelerator is now described. The driver is available from Chromatic Research, Inc. of Sunnyvale, Calif. A graphic accelerator suitable for use with the driver described herein is described in patent application Ser. No. 08/698,366 filed on Aug. 15, 1996 and entitled "COMPUTING APPARATUS AND OPERATING METHOD USING SOFTWARE QUEUES TO IMPROVE GRAPHICS PERFORMANCE" of Roey Ben-Yoseph, Paul Hsieh and Wade K. Smith, which is incorporated herein by reference in its entirety.

The video display driver operates as part of the "DIRECTX"® multimedia system, available from Microsoft, Corp. of Redmond, Wash.

"DIRECTX"® is a group of APIs (Application Programming Interfaces) designed to extend the functionality of the "WINDOWS"® system into the domain of game applications. The components of interest for this invention are "DIRECTDRAW"® and "DIRECT3D"®. "DIRECTDRAW"® provides 2-D graphics functionality used for games in place of GDI (Graphics Device Interface), the original "WINDOWS"® 2-D graphics API. "DIRECT3D"® provides an interface for 3-D graphics.

"DIRECTDRAW"® provides the following features in addition to the usual capabilities of the GDI:

- Direct access to surface memory by the client applications.
- Game specific functionality including double and triple buffering capability, transparent blits, special effects, etc.
- "DIRECTDRAW"® uses Microsoft's Component Object Model (COM) to allow upgradability of the API without sacrificing compatibility.
- "DIRECTDRAW"® uses a watchdog process that stops any unstable "DIRECTX"® applications without affecting other processes.

Services not provided by the Hardware Abstraction Layer (HAL) are emulated through the Hardware Emulation Layer (HEL). Applications can be assured of uniform functionality across hardware platforms.

"DIRECT3D"® is a client of "DIRECTDRAW"®, which provides surfaces in graphics memory into which the 3-D component renders. "DIRECT3D"® provides a high level interface (retained mode) and a low level interface (immediate mode) for rendering 3-D objects or primitives to a "DIRECTDRAW"® surface. "DIRECT3D"® provides the display driver with requests to draw individual triangles which are identified by the coordinates of the vertices, depth (z-buffer), and other information. The driver is then responsible for rendering the triangle on the display device.

Figure 7:
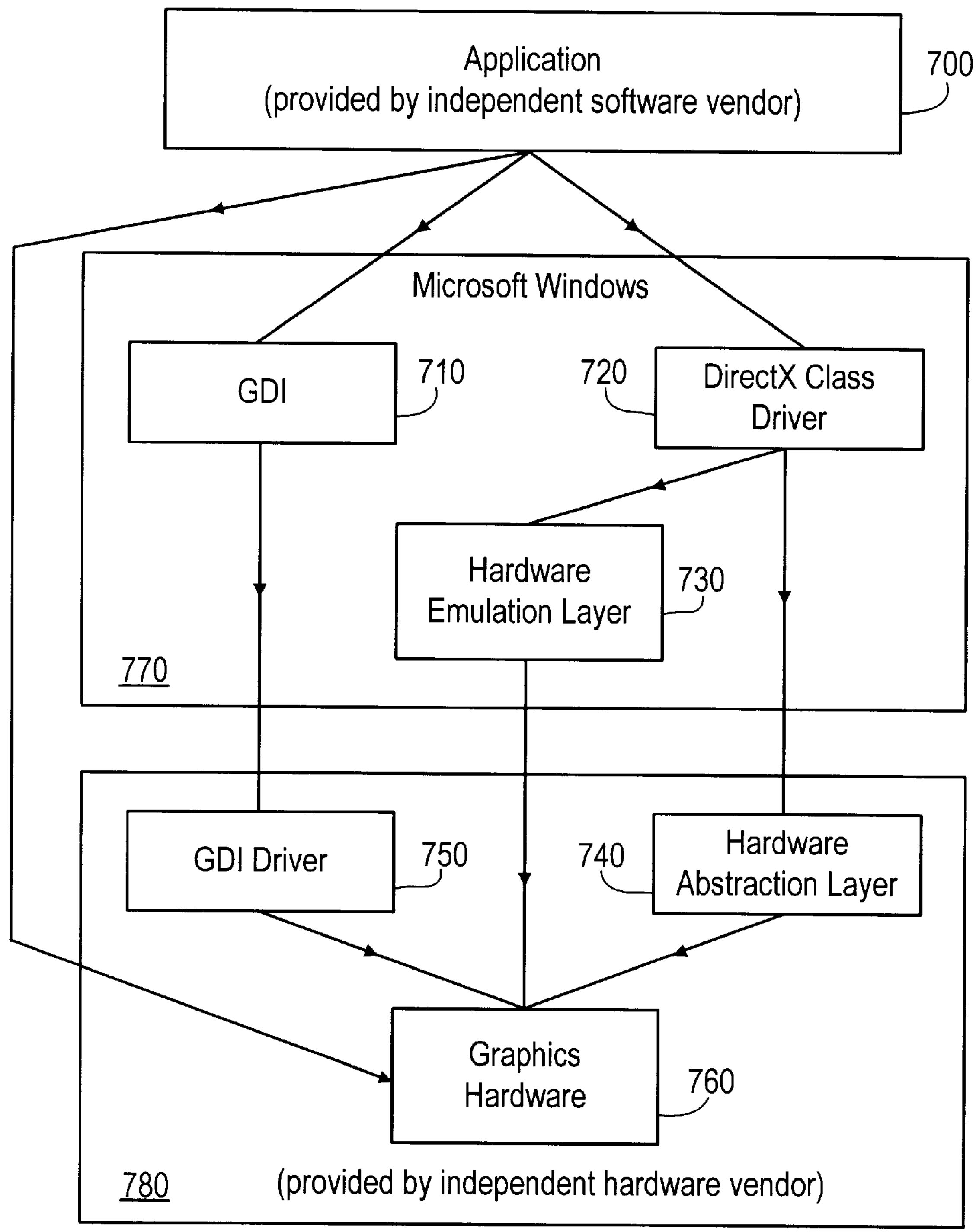
FIG. 7 is a block diagram of a windowing system according to one embodiment of the present invention.

The architecture of the graphics component of "WINDOWS"® is shown in FIG. 7. In FIG. 7, application 700 communicates with graphics hardware 760 either directly or via GDI 710 or "DIRECTX"® class driver 720 in "DIRECTX"® layer 770. "DIRECTX"® class driver 720, in turn, communicates with HEL 730 or HAL 740. GDI 710, on the other hand communicates with GDI driver 750. HEL 730, HAL 740 and GDI driver 750 all have access to graphics hardware 760. There are separate class drivers 720, HELs 730, and HALs 740 for each component of "DIRECTX"®. GDI drivers 750, HALs 740 and graphics hardware 760 are generally provided by independent hardware vendors.

Applications access graphics hardware 760 either through GDI 710 or "DIRECTDRAW"®/"DIRECT3D"®. GDI 710 provides 2-D graphics and text primitives to the visible display screen.

"DIRECTDRAW"® provides surface (memory region) management capabilities (which may be on-screen or off-screen) and some 2-D graphics primitives. Some of the 2-D primitives are similar to GDI functions, but many are not. The "DIRECTDRAW"® HAL is notified prior to an application accessing a surface directly, and prior to any surface being made visible to the user. These notifications are key to the functioning of this invention.

The methods of FIGS. 5A–5E are implemented in the device driver by the code reproduced in Appendix A.

The shrink or expand operation is triggered by one of five types of operation requests trapped by the driver: lock, unlock, flip, blit or 3D draw operation. A lock is an operation in which a client application program requests access to a "surface" (i.e., the graphical data in a 2-D memory region). An unlock is an operation by which a client application relinquishes a previously "locked" surface. A flip is an operation in which an invisible surface is made visible. Flips are primarily used in full screen double and triple buffering. A blit is an operation in which a block of data is copied from one surface to another surface in a single operation.

The code reproduced in Appendix A traps the operations described above, checks whether the surface can be rendered at low resolution (quarterRes), and performs the appropriate shrink (Quickmin) and expand (Quickstretch) operations. The actual shrink and expand operations are performed by microcode routines.

Figure 9:
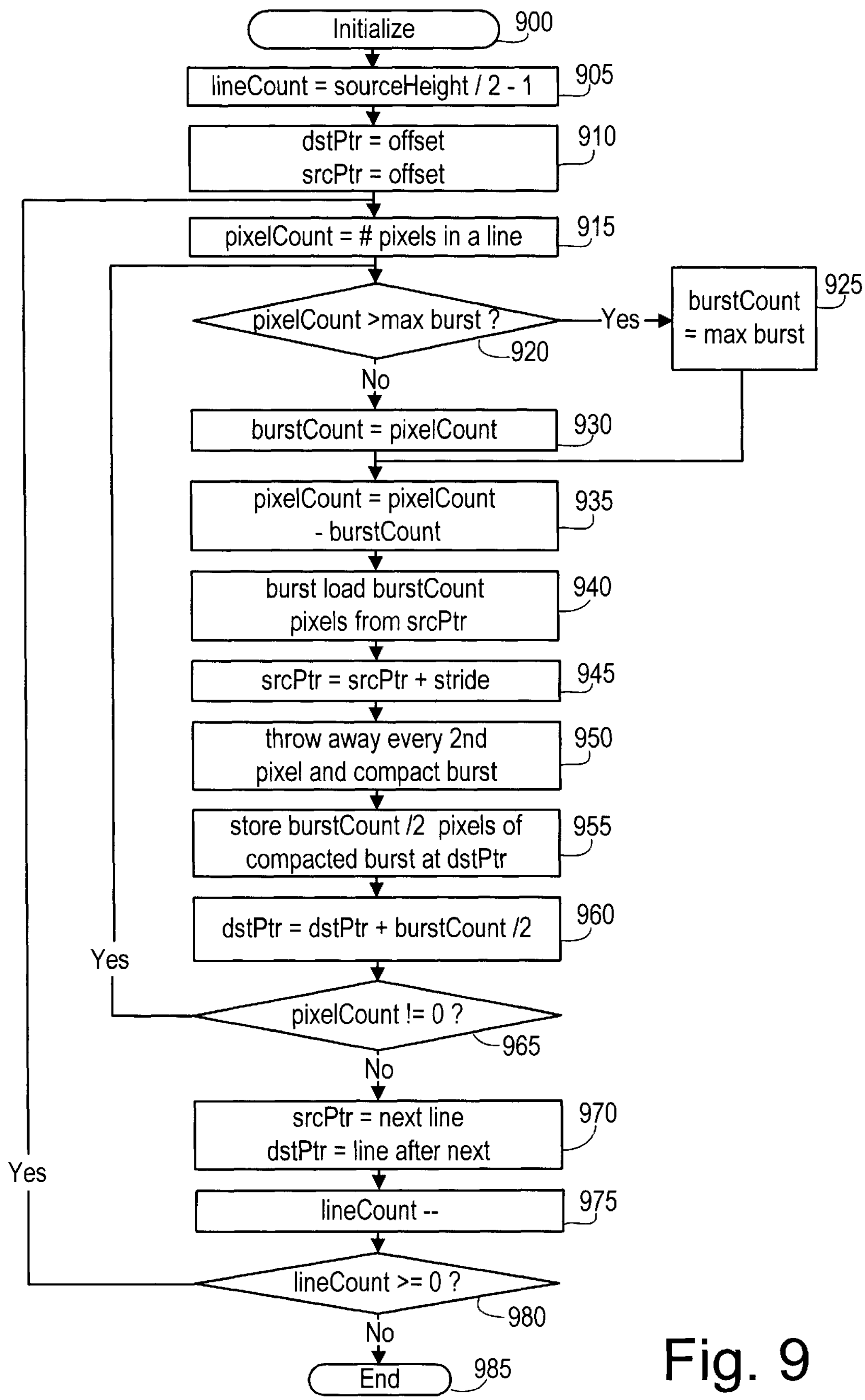
FIG. 9 is a flow diagram of a pixel decimation operation according to one embodiment of the present invention.

The operation of a shrink microcode routine using pixel decimation is illustrated in FIG. 9. The shrink operation consists essentially of selecting one pixel out of every 2×2 pixel block. The pixel is arbitrarily selected to be the one in the upper left corner. The shrink is done in-place in a left-to-right, top-to-bottom fashion as the operational area of the ¼ sized surface is arbitrarily at the top left corner of the full resolution area. Pixels are not operated upon singly, rather they are operated upon in bursts. The pseudocode in FIG. 9 is conceptually in pixel units, but in reality the microcode deals with byte units. Those skilled in the art understand how the pseudocode of FIG. 9 can be modified to deal with byte units.

With reference to FIG. 9, the hardware is first initialized in stage 900, a line counter is then set to equal half the height of the source surface minus one in stage 905. Memory source and destination pointers are then set to an offset into a graphics memory (RDRAM) corresponding to the location of the source and destination surfaces, respectively, in stage 910. A pixel counter is set to equal the number of pixels in a line in stage 915. The pixel counter is then compared to the maximum burst size in stage 920. If the value of the pixel counter exceeds the maximum burst size, a burst counter is set to the maximum burst size in stage 925, otherwise the burst counter is set to equal the value of the pixel counter in stage 930. The value of the pixel counter is then decreased by the value of the burst counter in stage 935. A number of pixels equal to the value of the burst counter is then loaded into an on-chip static RAM (SMEM) from the RDRAM pointed to by the source pointer in stage 940. The value of the source pointer is then increased by a stride (i.e. the number of pixels to the corresponding pixel on the next scan line) in stage 945. In stage 950, every second pixel in the burst is discarded and the remaining pixels are compacted in place (i.e. the spaces left by the discarded pixels are eliminated). The remaining pixels, which are now half the value of the burst counter, are then stored into the RDRAM into a location pointed to by the destination pointer in stage 955. The destination pointer is then increased by half the value of the burst counter in stage 960. In stage 965, the value of the pixel counter is compared to zero. If the value of the pixel counter is zero (i.e. there are no pixels left in the line) the source pointer is set to point to the beginning of the next line and the destination pointer is set to point to the beginning of the line after next in stage 970, otherwise execution proceeds back to stage 920. The value of the line counter is then decreased by one in stage 975. Finally, the value of the line counter is compared to zero in stage 980. If the value of the line counter is equal to zero, the routine terminates in stage 985, otherwise execution proceeds back to stage 915.

Figure 10:
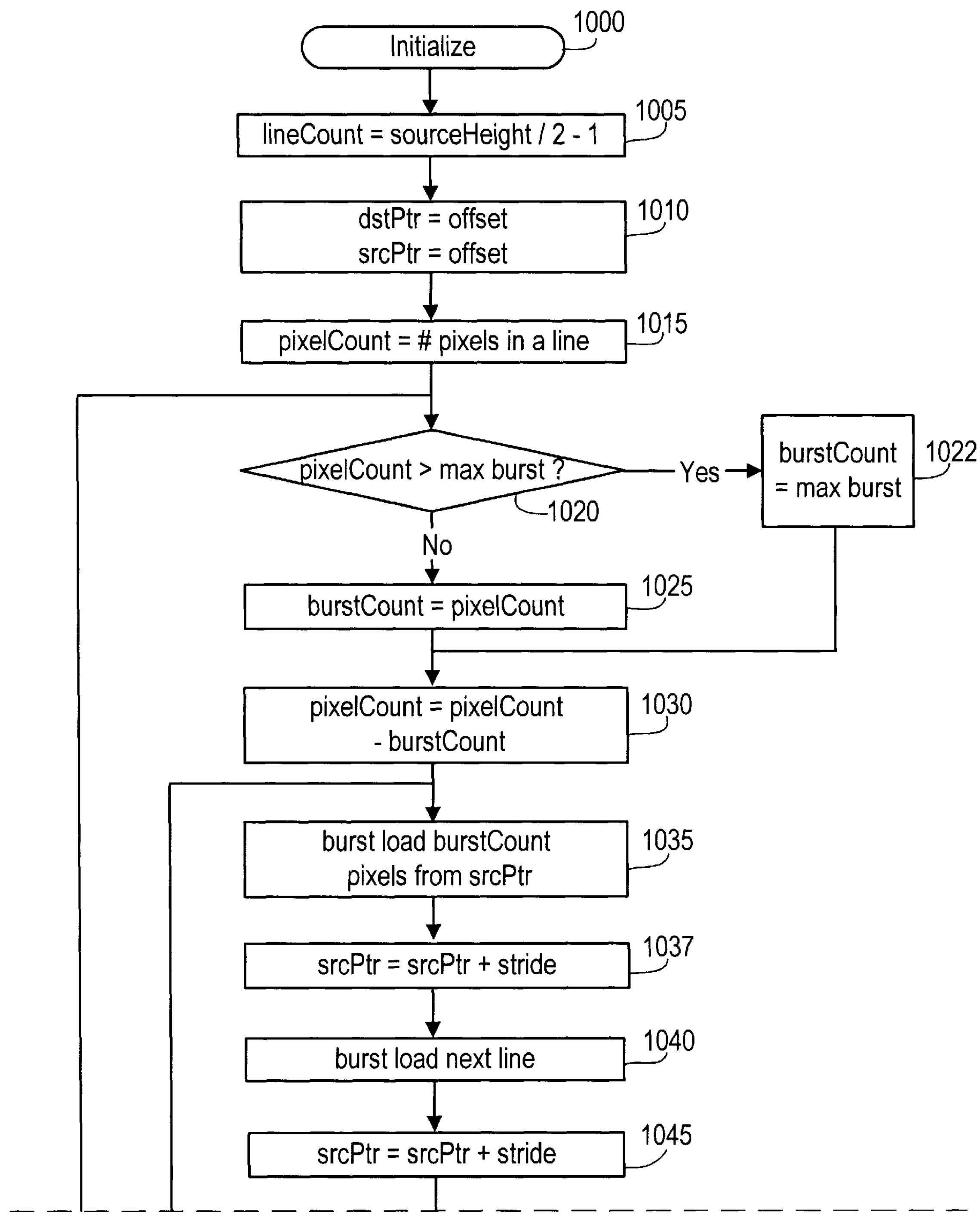
FIG. 10 is a flow diagram of a pixel averaging operation according to one embodiment of the present invention.
Figure 10:
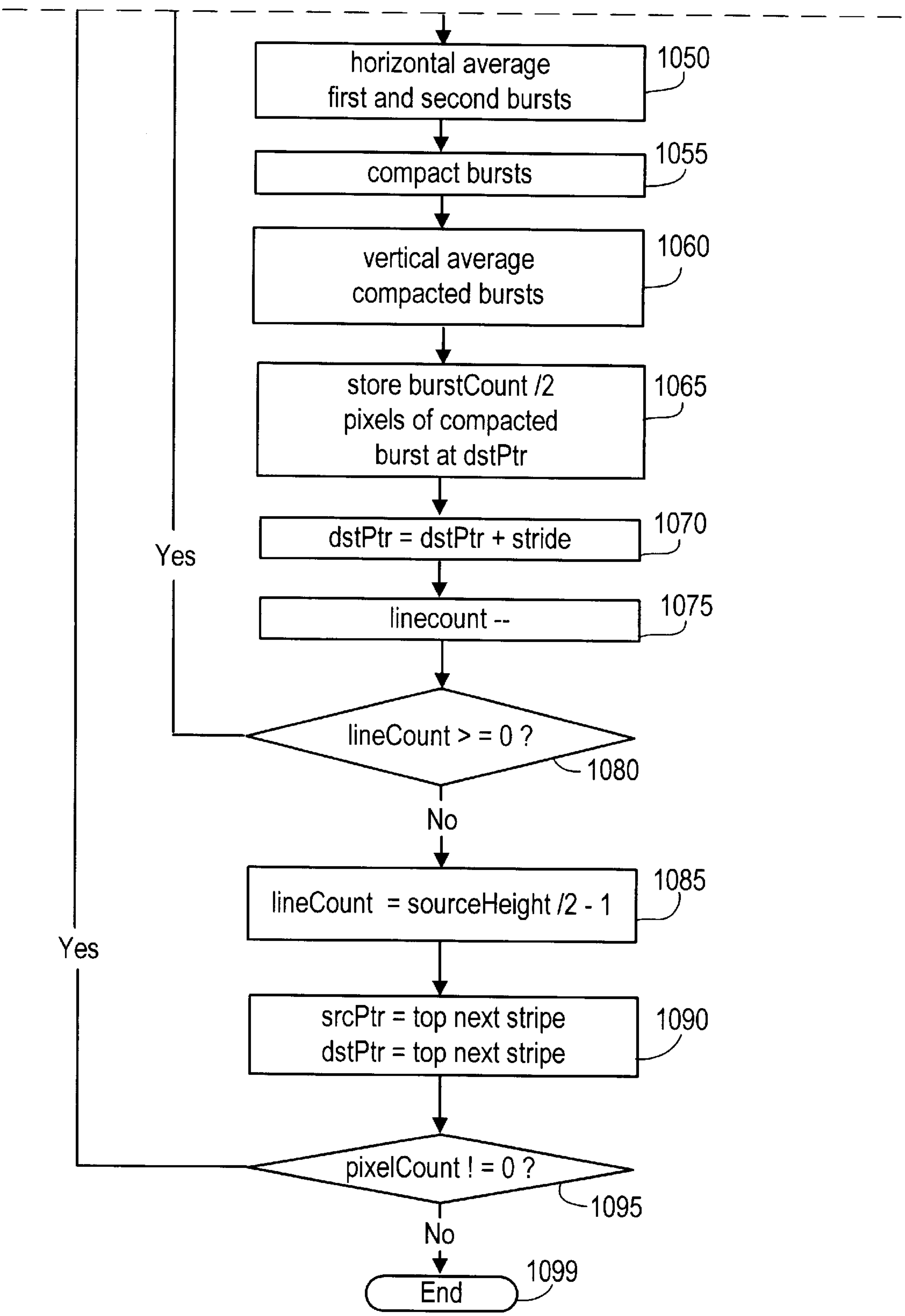

The operation of a shrink microcode routine using pixel averaging is illustrated in FIG. 10. This routine operates similarly to the pixel decimation routine, except that no pixels are discarded. Each source block of 2×2 pixels is averaged together to produce a single destination pixel. Unlike in pixel decimation, however, the pixels are operated upon in vertical stripes which are the width of the maximum burst size or smaller. These stripes proceed in a left-to-right fashion.

With reference to FIG. 10, the hardware is first initialized in stage 1000, a line counter is then set to equal half the height of the source surface minus one in stage 1005. Memory source and destination pointers are then set to an offset into a graphics memory (RDRAM) corresponding to the location of the source and destination surfaces, respectively, in stage 1010. A pixel counter is set to equal the number of pixels in a line in stage 1015. The pixel counter is then compared to the maximum burst size in stage 1020. If the value of the pixel counter exceeds the maximum burst size, a burst counter is set to the maximum burst size in stage 1022, otherwise the burst counter is set to equal the value of the pixel counter in stage 1025. In stage 1030, the value of the pixel counter is decreased by the value of the burst counter. A number of pixels equal to the value of the burst counter is then loaded into an on-chip static RAM (SMEM)

from the RDRAM pointed to by the source pointer in stage 1035. The value of the source pointer is then increased by a stride (i.e. the number of pixels to the corresponding pixel on the next scan line) in stage 1037. In stage 1040, a burst of pixels corresponding to the next line is loaded from the RDRAM into the SMEM starting at a location pointed to by the source pointer. The value of the source pointer is then again increased by a stride in stage 1045. The first and second bursts are then averaged horizontally (i.e. every second pixel is averaged with the adjacent pixel) in stage 1050. In stage 1055, the averaged bursts are compacted. Then the compacted bursts are averaged vertically in stage 1060. A number of pixels equal to half the value of the burst counter are stored into the RDRAM starting at a location pointed to by the destination pointer is stage 1065. The destination pointer is then increased by half the value of the burst counter in stage 1070. In stage 1075, the value of the line counter in decreased by one. In stage 1080, the value of the line counter is compared to zero. If the value of the line counter is greater than or equal to zero (i.e. there are still lines left to process in the stripe) execution proceeds back to stage 1035, otherwise the line counter is set to half the height of the source surface minus one in stage 1085. The source and the destination pointers are set to point to the beginning of the next stripe in stage 1090. Finally, the pixel counter is compared to zero in stage 1095. If the value of the pixel counter is not equal to zero, the routine terminates in stage 1099, otherwise execution proceeds back to stage 1020.

To allow for faster operation, a SIMD (Single Instruction Multiple Data) technique is used to operate on multiple pixel components at the same time, instead of separating out the individual R, G, and B components and operating on them individually.

In the particular mode of interest, pixels are packed in 18 bits as RGB 6:6:6. However, the ALUs of the hardware engine which is operating on these pixels can only operate on 9, 18, or 36 bits at a time. Ordinarily, these 18 bit pixels would have to be unpacked to 3 9-bit components before they can be operated upon arithmetically (in this case, the average operation), and then repacked again before storing. The SIMD technique described below circumvents the necessity of the unpacking and packing operations and operates directly on the packed 18-bit pixel. The same technique can also be applied to the more traditional case of packed RGB 5:6:5 pixels when the operating processor ALUs only deal with 8, 16, or 32 bits at a time.

An understanding of how adders work is helpful to understanding this SIMD technique. A single bit adder generates 2 bits of output as shown in Table 1.

TABLE 1

| Op1 | Op2 | Carry-In | Result | Carry-Out |
|---|---|---|---|---|
| 0 | 0 | 0 | 0 | 0 |
| 0 | 1 | 0 | 1 | 0 |
| 1 | 0 | 0 | 1 | 0 |
| 1 | 1 | 0 | 0 | 1 |
| 0 | 0 | 1 | 1 | 0 |
| 0 | 1 | 1 | 0 | 1 |
| 1 | 0 | 1 | 0 | 1 |
| 1 | 1 | 1 | 1 | 1 |

A multiple-bit adder is comprised of several single-bit adders, in which the carry-out bit becomes the carry-in bit of the next most significant bit. The carry-in bit for the least significant bit is always zero. The averaging operation is described as follows:

$$\text{Average}=(Op1+Op2)>>1$$

where the ">>" notation indicates a shift right operation. A shift right by one bit is equivalent to a division by two, but is performed more efficiently by current processors. The hardware accelerator in the present implementation supports a signed average operation, but does not support an unsigned average operation. The difference between signed and unsigned averaging operations is the type of shift operation performed. Signed averaging involves an arithmetic shift right, while unsigned averaging involves a logical shift right. An arithmetic shift right duplicates the most significant bit into the bit position vacated after the shift. A logical shift right, on the other hand, simply inserts a zero in the most significant bit position vacated by the shift.

Average operations cannot be performed on raw, packed 18-bit values as the carry bit from an operation on a color component may spill over into an adjacent color component, causing color error. The technique described below operates by breaking the carry chain and thus preventing the propagation of color error. The cost is the loss of 3 bits of color resolution.

First, the least significant bit of each color component of an 18-bit RGB 6:6:6 pixel is masked out to zero, then the pixel is logically shifted right by one bit position, as shown in Tables 2 and 3.

TABLE 2

| Bit Position | Value |
|---|---|
| 17 | R5 |
| 16 | R4 |
| 15 | R3 |
| 14 | R2 |
| 13 | R1 |
| 12 | R0 |
| 11 | G5 |
| 10 | G4 |
| 9 | G3 |
| 8 | G2 |
| 7 | G1 |
| 6 | G0 |
| 5 | B5 |
| 4 | B4 |
| 3 | B3 |
| 2 | B2 |
| 1 | B1 |
| 0 | B0 |

TABLE 3

| Bit Position | Value |
|---|---|
| 17 | 0 |
| 16 | R5 |
| 15 | R4 |
| 14 | R3 |
| 13 | R2 |
| 12 | R1 |
| 11 | 0 |
| 10 | G5 |
| 9 | G4 |
| 8 | G3 |
| 7 | G2 |
| 6 | G1 |
| 5 | 0 |
| 4 | B5 |
| 3 | B4 |
| 2 | B3 |
| 1 | B2 |
| 0 | B1 |

This operation is performed on both operands of the arithmetic operation. Referring back to Table 1, it is observed that when the corresponding bits of both operands are zero, the carry-out bit is also zero. This effectively breaks the carry chain, stopping any color error from propagating upwards past the least significant bit of the adjacent color component. The zeroes at bits 5 and 11 are used to break the carry chain. The zero at bit 17 forces the ALU to perform the equivalent of a logical shift right when averaging (all pixel components are unsigned).

If multiple arithmetic operations are to be performed, bits 5, 11, and 17 must be masked out again to prevent any chance of the previous operation leaving a logical one in those bit positions.

After all pixel arithmetic operations have been performed, the 18-bit word is shifted left by one bit position, producing the format shown in Table 4.

TABLE 4

| Bit Position | Value |
|---|---|
| 17 | R5 |
| 16 | R4 |
| 15 | R3 |
| 14 | R2 |
| 13 | R1 |
| 12 | x |
| 11 | G5 |
| 10 | G4 |
| 9 | G3 |
| 8 | G2 |
| 7 | G1 |
| 6 | x |
| 5 | B5 |
| 4 | B4 |
| 3 | B3 |
| 2 | B2 |
| 1 | B1 |
| 0 | x |

where x represents a “don’t care” bit. A don’t care bit is simply a bit whose value is undefined.

The technique described above presents the following advantages: the initial shift and mask operation are executed faster than an unpack to 9 bit components operation, the final shift operation is executed faster than a pack operation and the size of the data to be processed is reduced. The disadvantage is the loss of 3 bits of color resolution. Hence, the result is effectively a value expressed in RGB 5:5:5 format.

The technique described above can also be applied to the following arithmetic operations: addition, subtraction and integer multiplication. Integer multiplication can only be performed if it can be guaranteed than no overflow will occur.

In embodiments in which the hardware accelerator supports an unsigned average operation, the color resolution loss is limited to 2 bits, as no shift operation on the operands is required. The format of the result of this operation is shown in Table 5.

TABLE 5

| Bit Position | Value |
|---|---|
| 17 | R5 |
| 16 | R4 |
| 15 | R3 |
| 14 | R2 |
| 13 | R1 |
| 12 | 0 |
| 11 | G5 |
| 10 | G4 |
| 9 | G3 |
| 8 | G2 |
| 7 | G1 |
| 6 | 0 |
| 5 | B5 |
| 4 | B4 |
| 3 | B3 |
| 2 | B2 |
| 1 | B1 |
| 0 | B0 |

This technique is also applicable to the more traditional case in which the operation is performed on RGB 5:6:5 operands, as in the case of the x86 family of processors, available from Intel, Corp. of Santa Clara, Calif. The format of the operands and of the result are illustrated in Tables 6 and 7, respectively.

TABLE 6

| Bit Position | Value |
|---|---|
| 15 | R4 |
| 14 | R3 |
| 13 | R2 |
| 12 | R1 |
| 11 | R0 |
| 10 | G5 |
| 9 | G4 |
| 8 | G3 |
| 7 | G2 |
| 6 | G1 |
| 5 | G0 |
| 4 | B4 |
| 3 | B3 |
| 2 | B2 |
| 1 | B1 |
| 0 | B0 |

TABLE 7

| Bit Position | Value |
|---|---|
| 15 | R4 |
| 14 | R3 |
| 13 | R2 |
| 12 | R1 |
| 11 | 0 |
| 10 | G5 |
| 9 | G4 |
| 8 | G3 |
| 7 | G2 |
| 6 | G1 |
| 5 | 0 |
| 4 | B4 |
| 3 | B3 |
| 2 | B2 |
| 1 | B1 |
| 0 | B0 |

No shift operation is required as the x86 family of processors supports unsigned arithmetic operations.

This concept can be extended for processing more than one pixel at a time. For example, a 32-bit x86 family processor can perform pixel arithmetic on two RGB 5:6:5 pixels at a time. Tables 8 and 9 illustrate the formats of the two RGB pixels before and after the operation.

TABLE 8

| Bit Position | Value |
|---|---|
| 31 | P1R4 |
| 30 | P1R3 |
| 29 | P1R2 |
| 28 | P1R1 |
| 27 | P1R0 |
| 26 | P1G5 |
| 25 | P1G4 |
| 24 | P1G3 |
| 23 | P1G2 |
| 22 | P1G1 |
| 21 | P1G0 |
| 20 | P1B4 |
| 19 | P1B3 |
| 18 | P1B2 |
| 17 | P1B1 |
| 16 | P1B0 |
| 15 | P0R4 |
| 14 | P0R3 |
| 13 | P0R2 |
| 12 | P0R1 |
| 11 | P0R0 |
| 10 | P0G5 |
| 9 | P0G4 |
| 8 | P0G3 |
| 7 | P0G2 |
| 6 | P0G1 |
| 5 | P0G0 |
| 4 | P0B4 |
| 3 | P0B3 |
| 2 | P0B2 |
| 1 | P0B1 |
| 0 | P0B0 |

TABLE 9

| Bit Position | Value |
|---|---|
| 31 | P1R4 |
| 30 | P1R3 |
| 29 | P1R2 |
| 28 | P1R1 |
| 27 | 0 |
| 26 | P1G5 |
| 25 | P1G4 |
| 24 | P1G3 |
| 23 | P1G2 |
| 22 | P1G1 |
| 21 | 0 |
| 20 | P1B4 |
| 19 | P1B3 |
| 18 | P1B2 |
| 17 | P1B1 |
| 16 | 0 |
| 15 | P0R4 |
| 14 | P0R3 |
| 13 | P0R2 |
| 12 | P0R1 |
| 11 | 0 |
| 10 | P0G5 |
| 9 | P0G4 |
| 8 | P0G3 |
| 7 | P0G2 |
| 6 | P0G1 |
| 5 | 0 |
| 4 | P0B4 |
| 3 | P0B3 |
| 2 | P0B2 |
| 1 | P0B1 |
| 0 | 0 |

The effective loss of color resolution is 3 bits for each RGB pixel. Although it is not strictly necessary to zero-out bit 0 of this 32-bit word, it is desirable to provide a uniform loss of color resolution. If odd and even pixels were to have different loss rates, it could have undesirable visual effects on the image.

Figure 11:
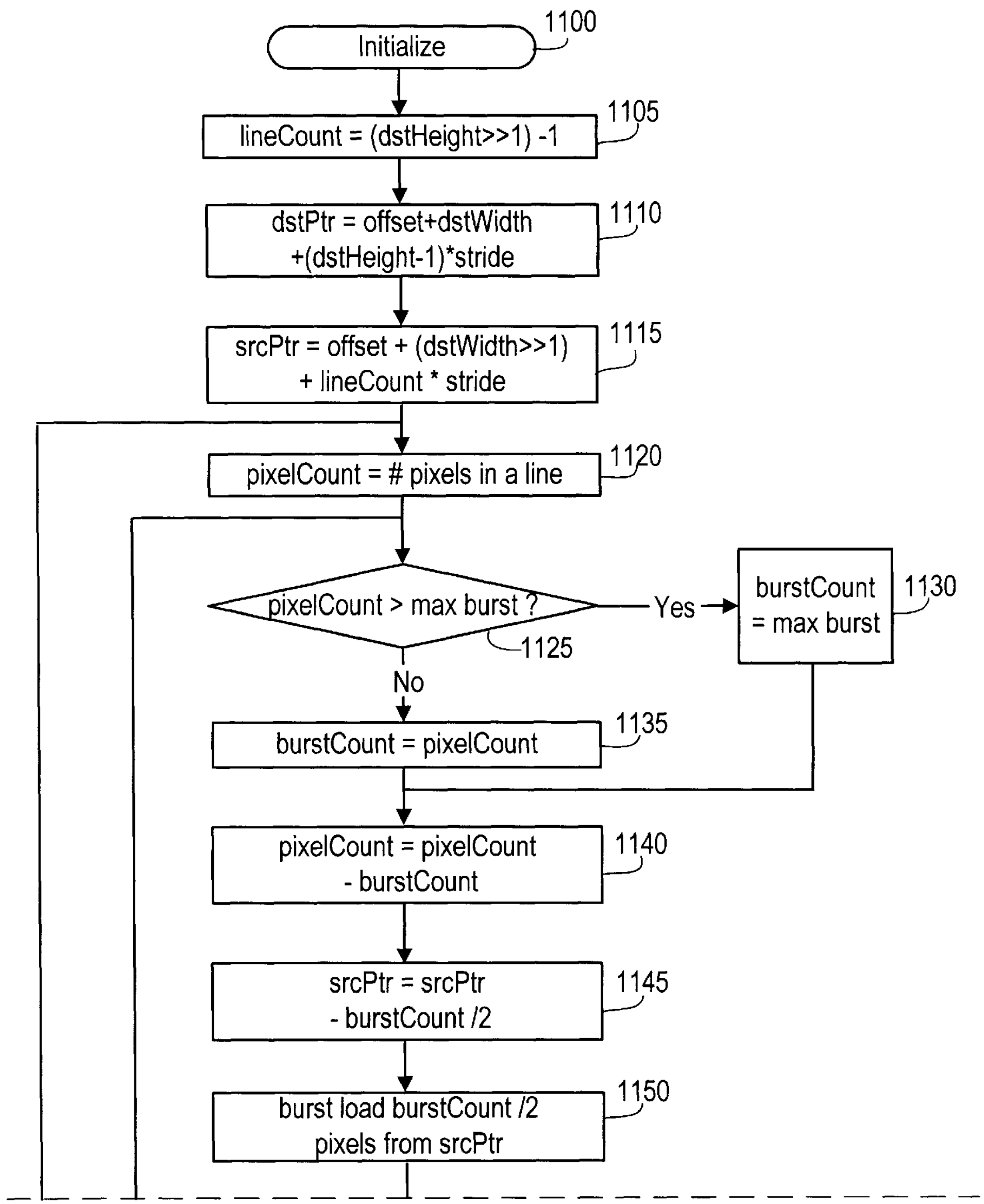
FIG. 11 is a flow diagram of a pixel replication operation according to one embodiment of the present invention.
Figure 11:
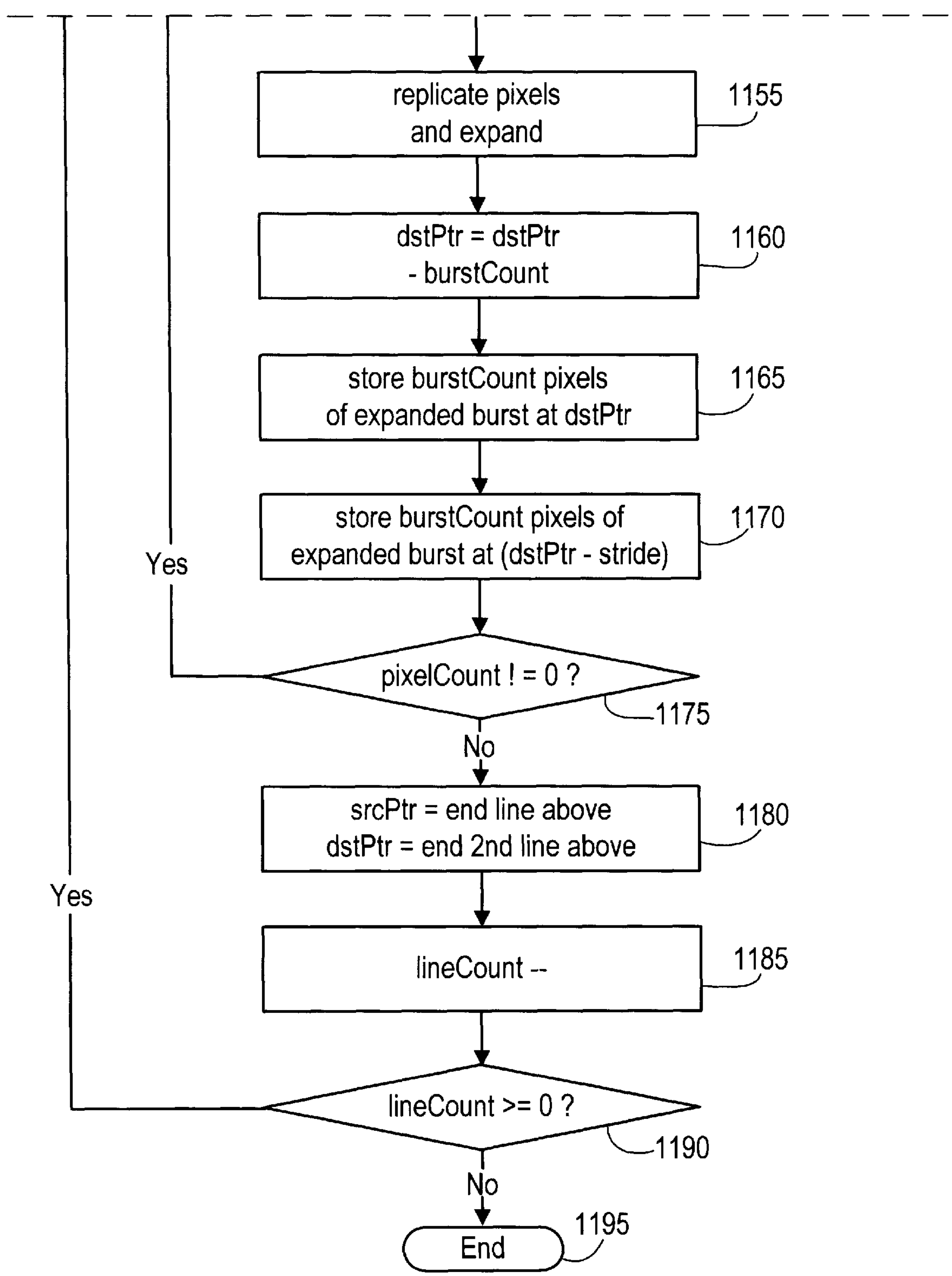

The operation of an expand microcode routine using pixel replication is illustrated in FIG. 11. This expand operation has a 1-to-4 mapping from source to destination. Each source pixel is replicated into a 2×2 destination block at the corresponding destination location. This expand operation proceeds in a right-to-left, bottom-to-top trajectory so that writing back the destination does not overwrite unprocessed source.

With reference to FIG. 11, the hardware is first initialized in stage 1100, a line counter is then set to equal half the height of the source surface minus one in stage 1105. Destination and source pointers are set to point to the bottom right corner of the destination and source surfaces in stages 1110 and 1115, respectively. The value of a pixel counter is set to the number of pixels in a line in stage 1120. In stage 1125, the value of the pixel counter is compared to the maximum burst size. If the value of the pixel counter is greater than the maximum burst size, the value of the burst counter is set to the maximum burst size in stage 1130, otherwise the value of the burst counter is set to the value of the pixel counter in stage 1135. The value of the pixel counter is decreased by the value of the burst counter in stage 1140. The value of the source pointer is decreased by half the value of the burst counter in stage 1145. A number of pixels equal to half the value of the burst counter is loaded from a graphics memory (RDRAM) into an on-chip RAM (SMEM) starting at a location pointed to by the source pointer in stage 1150. In stage 1155, the pixels are replicated and expanded (i.e. the replicated pixels are inserted into the buffer allocated in the SMEM). In stage 1160, the destination pointer is decreased by the value of the burst counter. In stage 1165, a number of pixels equal to the value of the burst counter is stored into the RDRAM starting at a location pointed to by the destination pointer. In stage 1170, a second number of pixels equal to the value of the burst counter is stored into the RDRAM starting at a location pointed to by the destination pointer decreased by a stride. The value of the pixel counter is compared to zero in stage 1175. If the value of the pixel counter is not equal to zero (i.e. there are still pixels left to be processed) the execution proceeds back to stage 1125, otherwise the source pointer is set to point to the end of the line above the current line and the destination pointer is set to point to the end of the line two lines above the current line in stage 1180. In stage 1185, the value of the line counter is decreased by one. Finally, the value of the line counter is compared to zero in stage 1190. If the value of the line counter is less than zero, the routine ends in stage 1195, otherwise execution proceeds back to stage 1120.

The actual microcode implementation pipelines load and store operations in order to take advantage of the parallelism of the underlying hardware. Those skilled in the art understand how to modify the pseudocode in FIGS. 9–11F to perform pipelined load and store operations.

The operation of an expand microcode routine using center-biased bilinear interpolation is illustrated in FIGS. 12A–12F. Center-biased bilinear interpolation maps each source pixel to a 2×2 destination block described by the equations above. The trajectories of source and destination proceed in vertical stripes which are the width of the maximum burst size or smaller. These stripes proceed in a right-to-left fashion. To avoid duplicating reads of the source, loads are pingponged to one of two SMEM buffers. Which buffer to load into is kept track of in the bufferState variable. The same SIMD technique for fast pixel arithmetic is used here.

With reference to FIGS. 12A–12F, the hardware is first initialized in stage 1200, destination and source pointers are then set to point to the bottom right corner of the destination and source surfaces in stages 1201 and 1202, respectively. The value of a pixel counter is set to the number of pixels in a line in stage 1203. The value of a line counter is set the height of the destination surface minus two and a buffer state variable is set to zero in stage 1204. In stage 1205, the value of the pixel counter is compared to the maximum burst size. If the value of the pixel counter is greater than the maximum burst size, the value of the burst counter is set to the maximum burst size in stage 1206, otherwise the value of the pixel counter is again compared to the maximum burst size in stage 1207. If the value of the pixel counter is equal to the maximum burst size, the value of the burst counter is set to half the maximum burst size in stage 1208, otherwise the value of the burst counter is set to the value of the pixel counter in stage 1209. The value of the pixel counter is decreased by the value of the burst counter in stage 1210. The value of the source pointer is decreased by half the value of the burst counter in stage 1211. The value of the destination pointer is decreased by the value of the burst counter in stage 1212. A number of pixels equal to half the value of the burst counter is loaded from the RDRAM into a bufferA in the local SMEM starting at a location pointed to by the source pointer in stage 1213. In stage 1214, the value of the source pointer is decreased by a stride. In stage 1215, it is determined whether the current burst is at the right edge of the surface, in which case the last pixel of the burst is duplicated in the pixel immediately following the burst in bufferA in stage 1216. The first pixel of the burst is then saved into a temporary storage in stage 1217. In stage 1218, the values stored in bufferA are multiplied by 0.25 and the results are stored in bufferB, also in the local SMEM, and the values stored in bufferA are then multiplied by 0.75.

In stage 1219, a counter i is initialized to zero, i is then compared to the number of pixels in the burst n in stage 1220. If i is less than n, the ith element of bufferB is set equal to the sum of the ith element of bufferA and the i+1th element of bufferB, while the ith element of bufferA is set equal to the sum of the ith element of bufferB and the i+1th element of bufferA in stage 1221, otherwise execution proceeds to stage 1223. To take advantage of the parallelism of the underlying hardware, the two operations of stage 1221 are executed in parallel, as shown in FIG. 12B. The value of i is then incremented by one in stage 1222. The operation described in stages 1223–1226 effectively "weaves" the elements of bufferA and bufferB and stores the result in bufferE. Hereinafter, the expression "a buffer is weaved" indicates an operation analogous to the one described in stages 1223–1226. In stage 1223, the counter i is reset to zero. The value of i is compared to n in stage 1224. If i is less than n, the element of bufferE, which is twice the size of bufferA and bufferB, having an index of i*2 is set to the value of the ith element of bufferB and the element of bufferE having an index of i*2+1 is set to the value of the ith element of bufferA in stage 1225, otherwise execution proceeds to stage 1227. In stage 1226, the value of i is increased by one and execution loops back to stage 1224.

In stage 1227, it is determined whether the current line is the topmost line, in which case execution proceeds to stage 1229, otherwise a number of pixels equal to half the value of the burst counter is loaded from the RDRAM into bufferA, starting at a location pointed to by the source pointer in stage 1228. The value of the source pointer is then decreased by a stride in stage 1229. In stage 1230, it is then determined whether the current line burst is at the left edge of the surface, in which case the pixel saved into the temporary storage in stage 1217 is stored into the first pixel of the burst in stage 1231, otherwise the first pixel is discarded in stage 1232. In stage 1233, a number of pixels equal to the value of the burst counter plus one are stored in the RDRAM from bufferE starting at a location pointed to by the destination pointer minus one. In stage 1234, a number of pixels equal to the value of the burst counter are stored in the RDRAM from bufferE starting at a location pointed to by the destination pointer. The value of the destination pointer is then decreased by a stride in stage 1235.

In stage 1236, the values stored in a bufferE are multiplied by 0.25 and the result is stored in bufferF. In stage 1237, the values stored in bufferE are multiplied by 0.75. In stage 1238, it is determined whether the current line is at the right edge of the surface, in which case the last pixel of the line in bufferA is duplicated in stage 1239. In stage 1240, the first pixel of bufferA is saved into a temporary storage. In stage 1241, the values stored in bufferA are multiplied by 0.25 and the result is stored in bufferB. In stage 1242, the values stored in bufferA are multiplied by 0.75. The operation described in stages 1219–1222 is repeated in stages 1243–1246. In stage 1247, the buffer state variable is compared to zero. If the buffer state variable is not equal to zero, execution proceeds to stage 1269, otherwise the execution proceeds to stage 1248. In stages 1248–1251, bufferG is weaved, as described above.

In stage 1252, a number of pixels equal to half the value of the burst counter is loaded into bufferA from the RDRAM starting at a location pointed to by the source pointer. The source pointer is then decreased by a stride in stage 1253. In stage 1254, it is determined whether the current line is at the left edge of the surface, in which case the pixel saved into the temporary storage in stage 1240 is stored into the first pixel of the burst in stage 1255, otherwise the pixel is discarded in stage 1256. In stage 1257, the values stored in bufferG are multiplied by 0.25 and the result is stored in bufferH. Then the values stored in bufferH are added to the values stored in bufferE in stage 1258. In stage 1259, the values stored in bufferG are multiplied by 0.75. In stage 1260, it is determined whether the current line is at the left edge of the surface, in which case a number of pixels equal to the value stored in the burst counter minus one is stored from bufferE into the RDRAM starting at a location pointed to by the destination pointer minus one in stage 1261, otherwise a number of pixels equal to the value stored in the burst counter is stored from bufferE into the RDRAM starting at a location pointed to by the destination pointer in stage 1262. The destination pointer is then decreased by a stride in stage 1263. In stage 1264, the values stored in bufferG are added to the corresponding value stored in bufferF and the result is stored in bufferF. In stage 1265, it is determined whether the current line is at the left edge of the surface, in which case a number of pixels equal to the value stored in the burst counter minus one is stored from bufferF into the RDRAM starting at a location pointed to by the destination pointer minus one in stage 1266, otherwise a number of pixels equal to the value stored in the burst counter is stored from bufferF into the RDRAM starting at a location pointed to by the destination pointer in stage 1267. The destination pointer is then decreased by a stride in stage 1268.

BufferE is weaved in stages 1269–1272. A number of pixels equal to half the value of the burst counter into bufferA from the RDRAM starting at a location pointed to by the source pointer in stage 1273. The source pointer is then decreased by a stride in stage 1274. In stage 1275, it is determined whether the current line is at the left edge of the surface, in which case the pixel saved into the temporary storage in stage 1240 is stored into the first pixel of the burst in stage 1276, otherwise the pixel is discarded in stage 1277. In stage 1278, the values stored in bufferE are multiplied by 0.25 and the result is stored in bufferF. Then the values stored in bufferF are added to the values stored in bufferG in stage 1279. In stage 1280, the values stored in bufferE are multiplied by 0.75. In stage 1281, it is determined whether the current line is at the left edge of the surface, in which case a number of pixels equal to the value stored in the burst counter minus one is stored from bufferG into the RDRAM starting at a location pointed to by the destination pointer minus one in stage 1282, otherwise a number of pixels equal to the value stored in the burst counter is stored from bufferG into the RDRAM starting at a location pointed to by the destination pointer in stage 1283. The destination pointer is then decreased by a stride in stage 1284. In stage 1285, the values stored in bufferE are added to the corresponding value stored in bufferH and the result is stored in bufferH. In stage 1286, it is determined whether the current line is at the left edge of the surface, in which case a number of pixels equal to the value stored in the burst counter minus one is stored from bufferH into the RDRAM starting at a location pointed to by the destination pointer minus one in stage 1287, otherwise a number of pixels equal to the value stored in the burst counter is stored from bufferH into the RDRAM starting at a location pointed to by the destination pointer in stage 1288. The destination pointer is then decreased by a stride in stage 1289.

In stage 1290, the buffer state variable is toggled (i.e. its logical value is converted to the opposite logical value). Then the value of the line counter is decreased by one in stage 1291. In stage 1292, the value of the line counter is compared to zero. If the value of the line counter is not less than zero, execution proceeds back to stage 1238, otherwise the buffer state variable is compared to zero in stage 1293. If the buffer state variable is not equal to zero, execution proceeds to stage 1298, otherwise execution proceeds to stage 1294. In stage 1294, the values stored in bufferF are added to the corresponding value stored in bufferE and the result is stored in bufferE. In stage 1295, it is determined whether the current line is at the left edge of the surface, in which case a number of pixels equal to the value stored in the burst counter minus one is stored from bufferE into the RDRAM starting at a location pointed to by the destination pointer minus one in stage 1296, otherwise a number of pixels equal to the value stored in the burst counter is stored from bufferE into the RDRAM starting at a location pointed to by the destination pointer in stage 1297. In stage 1298, the values stored in bufferH are added to the corresponding value stored in bufferG and the result is stored in bufferG. In stage 1299, it is determined whether the current line is at the left edge of the surface, in which case a number of pixels equal to the value stored in the burst counter minus one is stored from bufferG into the RDRAM starting at a location pointed to by the destination pointer minus one in stage 1300, otherwise a number of pixels equal to the value stored in the burst counter is stored from bufferG into the RDRAM starting at a location pointed to by the destination pointer in stage 1301. The destination and the source pointers are then set to point to the bottom right corner of the next destination stripe in stages 1302 and 1303, respectively. Finally, the pixel counter is compared to zero in stage 1304. If the value of the pixel counter is not less than zero, execution proceeds back to stage 1204, otherwise the routine ends in stage 1305.

In addition to the shrink and expand techniques described above, other image quality enhancement techniques known in the art can be used. Two such techniques are subpixel correction and bilinear filtering. Just as the techniques described above, subpixel correction and bilinear filtering present a trade-off between image quality and performance.

The device driver supports a variety of user selectable modes which reflect an appropriate balance between image quality and performance. Table 10 summarizes the modes available on the device driver.

TABLE 10

| Mode | Subpixel Correction | Bilinear Filter | Quick Draw | Expand | Shrink |
|---|---|---|---|---|---|
| MaxRes | On | enabled | Off | — | — |
| HiRes | Off | enabled | Off | — | — |
| Res | Off | Off | Off | — | — |
| Per | Off | Off | On | Interp | Avg |
| HiPer | Off | Off | On | PixRep | Avg |
| MaxPer | Off | Off | On | PixRep | PixRep |

Figure 8:
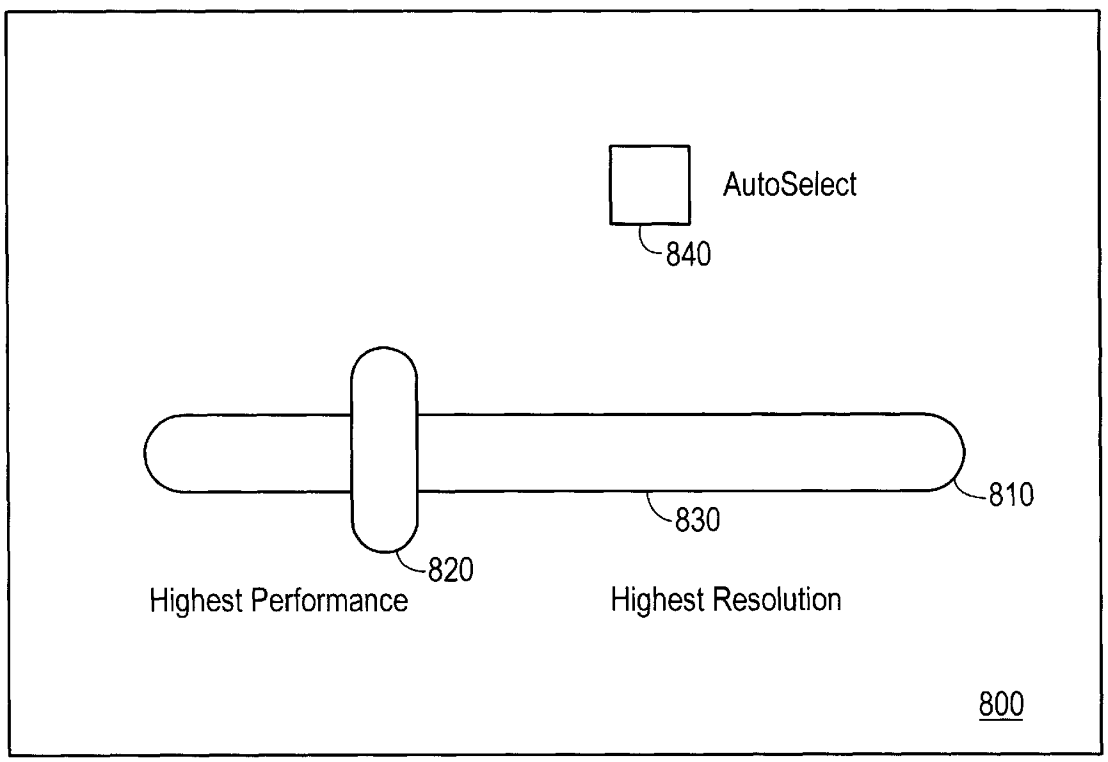
FIG. 8 is a block diagram of a control panel used to select different levels of performance and image quality in a display driver application according to one embodiment of the present invention.

Any of the modes described above can be selected by the user by means of the control panel tool shown in FIG. 8. In FIG. 8, control panel 800 is comprised of autoselect box 840 and slider 810. Each of the modes listed in Table 10, can be selected by positioning sliding element 820 at a certain location along scale 810. Scale 810 is roughly subdivided in a number of segments corresponding to the modes listed in Table 10, with MaxRes mode at one end of scale 830 and MaxPer mode at the other end of scale 830. In addition, autoselect box 840 allows the user to select a mode in which the image quality and resolution settings are determined according to the size of the triangle being rendered. If the rendering surface is large (more than 120,000 pixels) the triangle is rendered at Res mode, while if the rendering surface is small (120,000 pixels or less), the triangle is rendered at HiPer mode.

Embodiments described above illustrate but do not limit the invention. In particular, the invention is not limited to any particular image resolution, nor to any particular ratio of resolution enhancement or reduction. For example, in some embodiments one pixel of a first image corresponds to four pixels of a second image, in other embodiments one pixel of a first image corresponds to sixteen pixels of a second image, etc. Furthermore, the invention is not limited to the image quality enhancement techniques described above. Any suitable image quality enhancement technique known in the art may be used in the present invention.

Other embodiments and variations are within the scope of the invention, as defined by the following claims.

~~REPDIX A~~ Appendix A

```
// ------------------------------------------------------------------------------------
----------------
// Flip32
//
// Description:
//      Flip to requested page if drawing has finished.  The H/W will not actually do the f
lip until near
//      the end of the display scan.  PaulC says I should poll to see if scan is on odd or
even line before
//      setting the DISP_BASE registers, but this seems to work fine with no glitches.
// ------------------------------------------------------------------------------------
----------------

DWORD __stdcall Flip32(  LPDDHAL_FLIPDATA pfd )
{
DWORD dwRGBBitCount = pDriverData->HALInfo.vmiData.ddpfDisplay.dwRGBBitCount;
LPPRIVATE_DDSURFACEINFO targSurfInfo = (LPPRIVATE_DDSURFACEINFO)pfd->lpSurfTarg->lpGbl->dwR
eserved1;
LPPRIVATE_DDSURFACEINFO currSurfInfo = (LPPRIVATE_DDSURFACEINFO)pfd->lpSurfCurr->lpGbl->dwR
eserved1;
HRESULT ddrval;
DWORD   flipTo, flipToFlags;

    /*
     * NOTES:
     *
     * This callback is invoked whenever we are about to flip to from
     * one surface to another.   pfd->lpSurfCurr is the surface we were at,
     * pfd->lpSurfTarg is the one we are flipping to.
     *
     * You should point the hardware registers at the new surface, and
     * also keep track of the surface that was flipped away from, so
     * that if the user tries to lock it, you can be sure that it is done
     * being displayed
     */
    DPF("Flip32: curr=%08lx, targ=%08lx", pfd->lpSurfCurr, pfd->lpSurfTarg);
    DPF("         vidmem ptrs change: %08lx->%08lx", pfd->lpSurfCurr->lpGbl->fpVidMem, pfd->
lpSurfTarg->lpGbl->fpVidMem);

    flipTo = (FLATPTR)targSurfInfo->lpTrueHostAddress - pDriverData->HALInfo.vmiData.fpPrim
ary;
    if (pDriverData->HALInfo.vmiData.ddpfDisplay.dwRGBBitCount == 32) flipTo >>= 1;

    // if this is a D3D 1/4 rendering surface, then stretch it before flipping
    flipToFlags = pfd->lpSurfTarg->ddsCaps.dwCaps;
    if (targSurfInfo->dwQResState) {
        QuickStretch(pfd->lpSurfTarg->lpGbl, targSurfInfo->bQResCapable);
        targSurfInfo->dwQResState = 0;
    }


    ddrval = updateFlipStatus(0);
    if (ddrval)
    {
        pfd->ddRVal = ddrval;
        return DDHAL_DRIVER_HANDLED;
    }

    // is the blitter busy right now?
    if (VspBusy())
```

1

```
    {
        pfd->ddRVal = DDERR_WASSTILLDRAWING;
        return DDHAL_DRIVER_HANDLED;
    }

    /*
     * everything is OK, do the flip here
     */
    VspReg(PCI_DISP_BASE0) = flipTo;
    VspReg(PCI_DISP_BASE1) = flipTo;

    /*
     * remember were/when we were when we did the flip
     */
    QueryPerformanceCounter((LARGE_INTEGER*)&flipRecord.liFlipTime);
    flipRecord.bFlipFlag = TRUE;
    flipRecord.fpFlipFrom = (FLATPTR)((LPPRIVATE_DDSURFACEINFO)pfd->lpSurfCurr->lpGbl->dwRe
served1)->lpTrueHostAddress;
/*
    flipRecord.bHaveEverCrossedVBlank = FALSE;

    if (InVBlank())

    {
        flipRecord.dwFlipScanLine = 0;
        flipRecord.bWasEverInDisplay = FALSE;
    }
    else
    {
        flipRecord.dwFlipScanLine = CURRENT_VLINE;
        flipRecord.bWasEverInDisplay = TRUE;
    }
*/

//  if (currSurfInfo->bQResCapable && (currSurfInfo->dwQResState == 0)) {
//      QuickMin(pfd->lpSurfCurr->lpGbl);
//      currSurfInfo->dwQResState = 1;
//  }

    pfd->ddRVal = DD_OK;
    return DDHAL_DRIVER_HANDLED;

} /* Flip32 */
```

2

OK TO PRINT
USE CAMERA

```
// ------------------------------------------------------------------------------
---------------
// Lock32
//
// Description:
//      Prepare surface for host access.  Return an error if VSP is still active.  One day
we will
//      keep track of this on a surface by surface basis, but not today.
// ------------------------------------------------------------------------------
---------------

DWORD __stdcall Lock32(LPDDHAL_LOCKDATA lpLockData)
{
LPPRIVATE_DDSURFACEINFO privSurfInfo = (LPPRIVATE_DDSURFACEINFO)lpLockData->lpDDSurface->lp
Gbl->dwReserved1;
HRESULT ddrval;
LPDWORD lpZBufferRDRAM;
LPWORD lpZBufferHost;
DWORD x, y, pitch;

    DPF("Enter Lock32");

    /*
     * NOTES:
     *
     * This callback is invoked whenever a surface is about to be directly
     * accessed by the user.   This is where you need to make sure that
     * a surface can be safely accessed by the user.
     *
     * If your memory cannot be accessed while in accelerator mode, you
     * should take either take the card out of accelerator mode or else
     * return DDERR_SURFACEBUSY
     *
     * If someone is accessing a surface that was just flipped away from,
     * make sure that the old surface (what was the primary) has finished
     * being displayed.
     */

    /*
     * check to see if any pending physical flip has occurred
     */

    if (privSurfInfo != NULL) {
        if (privSurfInfo->dwQResState) {
            if (lpLockData->lpDDSurface->ddsCaps.dwCaps & DDSCAPS_ZBUFFER) QuickStretch(lpL
ockData->lpDDSurface->lpGbl, 2);
            else QuickStretch(lpLockData->lpDDSurface->lpGbl, privSurfInfo->bQResCapable);
            privSurfInfo->dwQResState = 0;
        }
        ddrval = updateFlipStatus((FLATPTR)privSurfInfo->lpTrueHostAddress);
    } else {
        ddrval = updateFlipStatus(lpLockData->lpDDSurface->lpGbl->fpVidMem);
    }
    if( ddrval != DD_OK )
    {
        lpLockData->ddRVal = DDERR_WASSTILLDRAWING;
        return DDHAL_DRIVER_HANDLED;
    }

1

    if (lpLockData->lpDDSurface->ddsCaps.dwCaps & DDSCAPS_HWCODEC) {
        // if HWCODEC then lock now
        if (privSurfInfo == NULL || privSurfInfo->lpRMSeg == NULL) {
            lpLockData->ddRVal = DDERR_SURFACELOST;
            return DDHAL_DRIVER_HANDLED;
        }
        lpLockData->lpDDSurface->lpGbl->fpVidMem = (FLATPTR)VSPLock(lpLockData->lpDDSurface
, privSurfInfo->dwView);
        privSurfInfo->llVSPAddress = (lpLockData->lpDDSurface->lpGbl->fpVidMem - privSurfIn
fo->dwViewBase) | VSPOFFSET_KERNEL_BIT;
    } else {
        // if not HWCODEC then return an error if VSP active
        if(VspBusy())
        {
            lpLockData->ddRVal = DDERR_WASSTILLDRAWING;
            return DDHAL_DRIVER_HANDLED;
        }
    }

    // standard full sized surfaces
    // if zbuffer, then convert 18 bit RDRAM zbuffer to 16 bit host zbuffer
    if (lpLockData->lpDDSurface->ddsCaps.dwCaps & DDSCAPS_ZBUFFER) {
        if (privSurfInfo == NULL || privSurfInfo->lpRMSeg == NULL || privSurfInfo->lpTrueHo
stAddress == NULL) {
            lpLockData->ddRVal = DDERR_SURFACELOST;
            return DDHAL_DRIVER_HANDLED;
        }
        if (!privSurfInfo->bShadowed) {
            lpLockData->lpDDSurface->lpGbl->fpVidMem = (FLATPTR) HeapAlloc(privateHeap, 0,
lpLockData->lpDDSurface->lpGbl->lPitch * lpLockData->lpDDSurface->lpGbl->wHeight);
            privSurfInfo->bShadowed = TRUE;
        }

        if (fullScreen) pitch = lpLockData->lpDDSurface->lpGbl->lPitch << 1;
        else pitch = lpLockData->lpDDSurface->lpGbl->lPitch;
        lpZBufferHost = (LPWORD)(lpLockData->lpDDSurface->lpGbl->fpVidMem);
        lpZBufferRDRAM = privSurfInfo->lpTrueHostAddress;
        for (y=0; y<lpLockData->lpDDSurface->lpGbl->wHeight; y++) {
            for (x=0; x<lpLockData->lpDDSurface->lpGbl->wWidth; x++) {
                *(lpZBufferHost + x) = (WORD) *(lpZBufferRDRAM + x);
            }
            lpZBufferHost += pitch >> 2;
            lpZBufferRDRAM += pitch >> 2;
        }
    }

/*
    // send cursor exclusion message to display driver
    if (lpLockData->lpDDSurface->ddsCaps.dwCaps & DDSCAPS_PRIMARYSURFACE) {
        HDC hDispDrv;

        hDispDrv = GetDC(GetDesktopWindow());
        if (lpLockData->bHasRect) {
            ExtEscape(hDispDrv, ESCAPE_CURSOREXCLUDE, sizeof(RECTL), (LPCSTR)&lpLockData->r
Area, 0, NULL);
        } else {
            RECTL lockRect;

            lockRect.left   = 0;
            lockRect.top    = 0;

2
```

```
// ----------------------------------------------------------------------------
----------------
// Unlock32
//
// Description:
//      Application has declared that it has finished accessing a surface
// ----------------------------------------------------------------------------
----------------

DWORD __stdcall Unlock32( LPDDHAL_UNLOCKDATA lpUnlockData )
{
LPPRIVATE_DDSURFACEINFO privSurfInfo = (LPPRIVATE_DDSURFACEINFO)lpUnlockData->lpDDSurface->
lpGbl->dwReserved1;
DWORD qPtr;
DWORD *pSrc;
int i,dif1,dif2;
LPDWORD lpZBufferRDRAM;
LPWORD lpZBufferHost;
DWORD x, y, pitch;

    DPF("Enter Unlock32");

    // Stefan's special MPEG dispatch
    if (lpUnlockData->lpDDSurface->ddsCaps.dwCaps & DDSCAPS_HWCODEC)
    {
        pSrc = (DWORD *)lpUnlockData->lpDDSurface->lpGbl->fpVidMem;

        if (pSrc[0] == 0x37f8b5a6) // magic
        {
            switch(pSrc[1])
            {
            case 1:
                // initialization
                pSrc[2] = pSrc[3] = *pDriverData->pPrivDDInfo->lpVspPrimaryUsage;
                break;
            case 0:
                // ignore request if still two or more tokens in queue
                dif1 = *pDriverData->pPrivDDInfo->lpHostPrimaryUsage - pSrc[3];
                dif2 = pSrc[3] - *pDriverData->pPrivDDInfo->lpVspPrimaryUsage;
                if (!(dif1>=0 && dif2>0))
                {
                    qPtr = mlPostQueue(24, TASK_DD);
                    QVIEW35ALL(qPtr) = (TASK_MV << 18) | (pDriverData->pPrivDDInfo->vspDDFu
nctions.functionPointers(VZpMVMpegTask) & 0x3ffff);
                    for (i=0; i<8; i++)
                    {
                        QVIEW18ALL(qPtr+2*i+4) = pSrc[i+4];
                    }

                    (*pDriverData->pPrivDDInfo->lpHostPrimaryUsage)++;
                    pSrc[3] = pSrc[2];
                    pSrc[2] = *pDriverData->pPrivDDInfo->lpHostPrimaryUsage;
                    mlUpdateQueue();
                }
                break;
            }
        }

        VSPUnlock(lpUnlockData->lpDDSurface);
        lpUnlockData->lpDDSurface->lpGbl->fpVidMem = 0;
```

1

```
    }

    // full size surfaces
    // if zbuffer, then convert 16 bit host zbuffer to 18 bit RDRAM zbuffer
    if (lpUnlockData->lpDDSurface->ddsCaps.dwCaps & DDSCAPS_ZBUFFER) {
        lpZBufferHost = (LPWORD)(lpUnlockData->lpDDSurface->lpGbl->fpVidMem);
        lpZBufferRDRAM = privSurfInfo->lpTrueHostAddress;
        if (fullScreen) pitch = lpUnlockData->lpDDSurface->lpGbl->lPitch << 1;
        else pitch = lpUnlockData->lpDDSurface->lpGbl->lPitch;
        for (y=0; y<lpUnlockData->lpDDSurface->lpGbl->wHeight; y++) {
            for (x=0; x<lpUnlockData->lpDDSurface->lpGbl->wWidth; x++) {
                *(lpZBufferRDRAM + x) = (DWORD) *(lpZBufferHost + x);
            }
            lpZBufferHost += pitch >> 2;
            lpZBufferRDRAM += pitch >> 2;
        }

        // zbuffers are by default in 1/4 size state
        if (privSurfInfo->bQResCapable && privSurfInfo->dwQResState == 0) {
            QuickMin(lpUnlockData->lpDDSurface->lpGbl, 2);
            privSurfInfo->dwQResState = 1;
        }
    }



/*
    // send display unexclude message to display driver
    if (lpUnlockData->lpDDSurface->ddsCaps.dwCaps & DDSCAPS_PRIMARYSURFACE) {
        HDC hDispDrv;

        hDispDrv = GetDC(GetDesktopWindow());
        ExtEscape(hDispDrv, ESCAPE_CURSORUNEXCLUDE, 0, NULL, 0, NULL);
        ReleaseDC(GetDesktopWindow(), hDispDrv);
    }
*/
#ifdef LOCK_TIMING
    QueryPerformanceCounter((LARGE_INTEGER*)&lockStopTime);
    lockTime = (DWORD)(lockStopTime - lockStartTime);
    lockTimeAcc += lockTime;
    lockCount++;
    avgLockTime = (DWORD)(lockTimeAcc / lockCount);
    maxLockTime = max(lockTime, maxLockTime);
#endif

    return DDHAL_DRIVER_NOTHANDLED;
} // UnLock32
```

2

```
            lockRect.right  = lpLockData->lpDDSurface->lpGbl->wWidth;
            lockRect.bottom = lpLockData->lpDDSurface->lpGbl->wHeight;
            ExtEscape(hDispDrv, ESCAPE_CURSOREXCLUDE, sizeof(RECTL), (LPCSTR)&lockRect, 0,
NULL);
        }
        ReleaseDC(GetDesktopWindow(), hDispDrv);
    }
*/

#ifdef LOCK_TIMING
    QueryPerformanceCounter((LARGE_INTEGER*)&lockStartTime);
#endif

    return DDHAL_DRIVER_NOTHANDLED;
} /* Lock32 */
```

```
// ----------------------------------------------------------------------------
----------------
// Blt32
//
// Description:
//   Handles hardware acceleration of all blit functions
//
// Current support:
//        DDBLT_WAIT
//        DDBLT_ASYNC
//        DDBLT_ROP
//            SRCCOPY w/strblt (expand only, 18 bpp only, bilinear interpolation, not optimiz
ed)
//                DDBLT_KEYSRCOVERRIDE
//                DDBLT_KEYDESTOVERRIDE
//                DDBLT_KEYSRC
//                DDBLT_KEYDEST
//            WHITENESS
//            BLACKNESS
//        DDBLT_DDFX w/strblt (same caveats, y interpolation is optional)
//            DDBLTFX_MIRRORUPDOWN
//            DDBLTFX_MIRRORLEFTRIGHT (not fully debugged)
//        DDBLT_COLORFILL
//        DDBLT_DEPTHFILL
// ----------------------------------------------------------------------------
----------------

DWORD __stdcall Blt32( LPDDHAL_BLTDATA pbd )
[
HRESULT ddrval;
DWORD dwFlags, dstFlags, srcFlags;
DWORD dwColorKey;
DWORD dwDstOffset, dwDstWidth, dwDstHeight, dwDstPitch;
DWORD dwSrcOffset, dwSrcWidth, dwSrcHeight, dwSrcPitch;
DWORD dwRGBBitCount = pDriverData->HALInfo.vmiData.ddpfDisplay.dwRGBBitCount;
DWORD qPtr;
DWORD dstTile, srcTile, dstArbTile, srcArbTile;
DWORD tileSave;
LPPRIVATE_DDSURFACEINFO srcInfo=NULL, dstInfo=NULL;
BOOL srcOp;

    DPF("Enter Blt32");

    /*
     * NOTES:
     *
     * Everything you need is in pdb->bltFX .
     * Look at pdb->dwFlags to determine what kind of blt you are doing,
     * DDBLT_xxxx are the flags.
     *
     * COLORKEY NOTES:
     *
     * ColorKey ALWAY comes in BLTFX.   You don't have to look it up in
     * the surface.
     */

    dwFlags = pbd->dwFlags;
    dstInfo - (LPPRIVATE_DDSURFACEINFO) pbd->lpDDDestSurface->lpGbl->dwReserved1;

    if (dwFlags & DDBLT_WAIT) {
```

1

```
            while (updateFlipStatus((FLATPTR)dstInfo->lpTrueHostAddress) != DD_OK);
    } else {
        // is a flip in progress?
        ddrval = updateFlipStatus((FLATPTR)dstInfo->lpTrueHostAddress);
        if( ddrval != DD_OK ) {
            pbd->ddRVal = ddrval;
            return DDHAL_DRIVER_HANDLED;
        }
    }

    /*
     * If async, then only work if bltter isn't busy
     * This should probably be a little more specific to each call, but
     * waiting for 16 is pretty close
     */
    if(dwFlags & DDBLT_ASYNC) {
        if(FreeFIFOEntries() < 16) [
            DPF("ASYNC FAILED");
            pbd->ddRVal = DDERR_WASSTILLDRAWING;
            return DDHAL_DRIVER_HANDLED;
        }
    }

    // calculate destination parameters: offset, width, height
    dstFlags = pbd->lpDDDestSurface->ddsCaps.dwCaps;
//  if ((pbd->lpDDDestSurface->lpGbl->fpVidMem == 0) || (dstInfo == NULL) || (dstInfo->lpRM
Seg == NULL)) {
//      pbd->ddRVal = DD_OK;
//      return DDHAL_DRIVER_HANDLED;
//  }
    dwDstOffset = (FLATPTR)dstInfo->lpTrueHostAddress - dstInfo->dwViewBase;
    if (dstInfo->dwView == k18BitView || dstInfo->dwView == k32To16BitView || (dstInfo->dwV
iew == kFrameBufferView && dwRGBBitCount == 32)) dwDstOffset >>= 1;
    dwDstWidth  = pbd->rDest.right  - pbd->rDest.left;
    dwDstHeight = pbd->rDest.bottom - pbd->rDest.top;
    dwDstPitch  = pbd->lpDDDestSurface->lpGbl->lPitch;
    if (dstInfo->dwTileMode == PSTM_TILEMODE_0  && tileConfig != 0) {
        dstTile = 0;
        dstArbTile = 0;
    } else {
        dstTile = SF_SURFACE_TILED << 27;
        dstArbTile = FORCE_GFX1_HI18;
    }

    srcOp = ((dwFlags & DDBLT_ROP) && (pbd->bltFX.dwROP == SRCCOPY)) || (dwFlags & DDBLT_DD
FX);

    if (srcOp) {
        // calculate source parameters: offset, width, height
        srcInfo = (LPPRIVATE_DDSURFACEINFO) pbd->lpDDSrcSurface->lpGbl->dwReserved1;
        srcFlags = pbd->lpDDSrcSurface->ddsCaps.dwCaps;
//      if ((pbd->lpDDSrcSurface->lpGbl->fpVidMem == 0) || (srcInfo == NULL) || (srcInfo->l
pRMSeg == NULL)) {
//          pbd->ddRVal = DD_OK;
//          return DDHAL_DRIVER_HANDLED;
//      }
        dwSrcOffset = (FLATPTR)srcInfo->lpTrueHostAddress - srcInfo->dwViewBase;
        if (srcInfo->dwView == k18BitView || srcInfo->dwView == k32To16BitView || (srcInfo-
>dwView == kFrameBufferView && dwRGBBitCount == 32)) dwSrcOffset >>= 1;
        dwSrcWidth  = pbd->rSrc.right  - pbd->rSrc.left;
```

2

```
        dwSrcHeight = pbd->rSrc.bottom - pbd->rSrc.top;
        dwSrcPitch  = pbd->lpDDSrcSurface->lpGbl->lPitch;
        if (srcInfo->dwTileMode == PSTM_TILEMODE_0 && tileConfig != 0) {
            srcTile = 0;
            srcArbTile = 0;
        } else {
            srcTile = SF_SURFACE_TILED << 27;
            srcArbTile = FORCE_GFX1_HI18;
        }

        if (srcInfo->dwQResState && dstInfo->dwQResState) {
            // if dst and src are 1/4 rendering surfaces, simply adjust coordinates
            pbd->rSrc.left   = (pbd->rSrc.left + 0) >> 1;
            pbd->rSrc.top    = (pbd->rSrc.top + 0) >> 1;
            pbd->rSrc.right  = (pbd->rSrc.right + 1) >> 1;
            pbd->rSrc.bottom = (pbd->rSrc.bottom + 1) >> 1;
            dwSrcWidth  = pbd->rSrc.right  - pbd->rSrc.left;
            dwSrcHeight = pbd->rSrc.bottom - pbd->rSrc.top;

            pbd->rDest.left   = (pbd->rDest.left + 0) >> 1;
            pbd->rDest.top    = (pbd->rDest.top + 0) >> 1;
            pbd->rDest.right  = (pbd->rDest.right + 1) >> 1;
            pbd->rDest.bottom = (pbd->rDest.bottom + 1) >> 1;
            dwDstWidth  = pbd->rDest.right  - pbd->rDest.left;
            dwDstHeight = pbd->rDest.bottom - pbd->rDest.top;
        } else if (dstInfo->dwQResState) {
            // if only dst is a 1/4 rendering surface, quickstretch it
            QuickStretch(pbd->lpDDDestSurface->lpGbl, dstInfo->bQResCapable);
            dstInfo->dwQResState = 0;
        } else if (srcInfo->dwQResState) {
            // if only src is a 1/4 rendering surface, quickstretch it
            QuickStretch(pbd->lpDDSrcSurface->lpGbl, srcInfo->bQResCapable);
            srcInfo->dwQResState = 0;
        }
    } else {
        if (dstInfo->dwQResState) {
            // this is a destination only operation, adjust coordinates for 1/4 rendering s
urface
            pbd->rDest.left   = (pbd->rDest.left + 0) >> 1;
            pbd->rDest.top    = (pbd->rDest.top + 0) >> 1;
            pbd->rDest.right  = (pbd->rDest.right + 1) >> 1;
            pbd->rDest.bottom = (pbd->rDest.bottom + 1) >> 1;
            dwDstWidth  = pbd->rDest.right  - pbd->rDest.left;
            dwDstHeight = pbd->rDest.bottom - pbd->rDest.top;
        }
    }

    if (dwFlags & DDBLT_ROP)
    {
        switch (pbd->bltFX.dwROP)
        {
            case SRCCOPY:
                if (dwSrcWidth != dwDstWidth || dwSrcHeight != dwDstHeight) {
                    // -------------------------------------------------------------------
-----------------------------------
                    // Pixel replicating StretchBlit with transparency
                    //
                    // Description:
                    //      Low quality stretchblit with pixel replication.  Generates swit
ch constants and breaks up
```

3

```
                    //      destination width into 256 byte bands for easy VSP digestion.
                    // -------------------------------------------------------------------
-----------------------------------
                    DWORD iDst, iSrc, iPos;
                    DWORD dstIndex, leftPos;
                    DWORD dstWidthBurst, srcWidthBurst;
                    DWORD bytePP, alignMask, originalAlignment;
                    DWORD dwTmp1, dwTmp2, dwTmp3;
                    BOOL rightToLeft, striping;

                    DPF("Blt32: StrBlt from %08X (%d,%d) %dx%d -> %08X (%d,%d) %dx%d", dwSr
cOffset, pbd->rSrc.left, pbd->rSrc.top, dwSrcWidth, dwSrcHeight, dwDstOffset, pbd->rDest.le
ft, pbd->rDest.top, dwDstWidth, dwDstHeight);
                    DDASSERT(pDriverData->pPrivDDInfo->vspDDFunctions.numFunctions != 0);

                    if (dwFlags & DDBLT_KEYSRCOVERRIDE)       dwColorKey  = pbd->bltFX.ddck
SrcColorkey.dwColorSpaceLowValue;
                    else if (dwFlags & DDBLT_KEYDESTOVERRIDE) dwColorKey  = pbd->bltFX.ddck
DestColorkey.dwColorSpaceLowValue;
                    else if (dwFlags & DDBLT_KEYSRC)          dwColorKey  = pbd->lpDDSrcSur
face->ddckCKSrcBlt.dwColorSpaceLowValue;
                    else if (dwFlags & DDBLT_KEYDEST)         dwColorKey  = pbd->lpDDDestSu
rface->ddckCKDestBlt.dwColorSpaceLowValue;

                    // generate alignment mask for determining alignment within a double
                    switch (dwRGBBitCount) {
                        case 8:  alignMask = 0x7; break;
                        case 15:
                        case 16:
                        case 32: alignMask = 0x3; break;
                        case 24: alignMask = 0x1; break;
                    }

                    // if stretch parameters are same as previous stretch, then do not reco
mpute
                    bytePP = ((dwRGBBitCount + 1) >> 3) - 1;    // bytes per pixel - 1
                    dwTmp1 = (dwSrcWidth << 18) / dwDstWidth;   // xDDA increment term
                    dwTmp2 = ((pbd->rSrc.left & alignMask) - (pbd->rDest.left & alignMask))
 << bytePP;
                    dwTmp3 = pbd->rDest.left & alignMask;       // destination modulus = ds
tX % 8
                    if (dwTmp1 != xDDAInc || dwTmp2 != alignment || dwTmp3 != dstMod || dwD
stWidth > dwDstWidthPrev || dwRGBBitCount != dwPixelDepthPrev) {
                        alignment = dwTmp2;
                        dstMod = dwTmp3;
                        dwDstWidthPrev = dwDstWidth;
                        dwPixelDepthPrev = dwRGBBitCount;

                        GenerateSwitchConstants(alignMask, bytePP, dwTmp1, pbd->rDest.left,
 dwDstWidth);
                    }

                    // post it to the queue
                    rightToLeft = pbd->rDest.left >= pbd->rSrc.left;
                    originalAlignment = alignment;
                    if (bytePP == 2) dstMod = pbd->rDest.left & 0x7;
                    if (rightToLeft) {
                        dstWidthBurst = dwDstWidth;
                        if (dstWidthBurst > ((DWORD)256 >> bytePP)) {
                            dstWidthBurst -= ((DWORD)256 >> bytePP) - dstMod;
```

4

```
                        while (dstWidthBurst > ((DWORD)256 >> bytePP)) dstWidthBurst -=
(DWORD)256 >> bytePP;
                    }
                    iDst = dwDstWidth - dstWidthBurst;
                } else {
                    iDst = 0;
                    dstWidthBurst = min(dwDstWidth, ((DWORD)256 >> bytePP) - dstMod);
                }
                do {
                    iSrc = xDDA[iDst] >> 18;
                    dstIndex = iDst + dstMod;
                    leftPos = pbd->rSrc.left + iSrc;
                    srcWidthBurst = (xDDA[iDst + dstWidthBurst] >> 18) - iSrc + 2;
                    qPtr = mlPostQueue(STRBLTLQ_SIZE, TASK_DD);
                    QV(qPtr + STRBLTLQ_ENTRY)        = pDriverData->pPrivDDInfo->vspDDFu
nctions.functionPointers[VEpDDStrBltLQ];
                    QV(qPtr + STRBLTLQ_SRCOFFSET)    = dwSrcOffset;
                    if (bytePP == 2) {
                        alignment = (((pbd->rDest.left + iDst) & alignMask) - (leftPos
& alignMask)) << 2;

                        if (originalAlignment != 0) alignment = abs(alignment);
                        QV(qPtr + STRBLTLQ_SRCXY)        = (pbd->rSrc.top << 18) | leftP
os;
                        QV(qPtr + STRBLTLQ_SRCEXT)       = (dwSrcHeight << 18) | srcWidt
hBurst;
                        QV(qPtr + STRBLTLQ_ALIGNMENT)    = alignment;
                    } else {
                        // if the starting byte position plus alignment transitions ano
ther double, make adjustments
                        if (((leftPos * (bytePP + 1)) & -0x7) == ((leftPos * (bytePP +
1)) - alignment) & -0x7)) {
                            // no adjustments
                            QV(qPtr + STRBLTLQ_SRCXY)        = (pbd->rSrc.top << 18) | l
eftPos;
                            QV(qPtr + STRBLTLQ_SRCEXT)       = (dwSrcHeight << 18) | src
WidthBurst;
                            QV(qPtr + STRBLTLQ_ALIGNMENT)    = alignment;
                        } else {
                            if (alignment & 0x80000000) {
                                // first pixel is on next double when aligned, easy fix
 is to just shift the other way
                                QV(qPtr + STRBLTLQ_SRCXY)        = (pbd->rSrc.top << 18)
 | leftPos;
                                QV(qPtr + STRBLTLQ_SRCEXT)       = (dwSrcHeight << 18) |
 srcWidthBurst;
                                QV(qPtr + STRBLTLQ_ALIGNMENT)    = 8 + alignment;
                            } else {
                                // first pixel is on previous double when aligned, read
 a double's worth more data
                                QV(qPtr + STRBLTLQ_SRCXY)        = (pbd->rSrc.top << 18)
 | (leftPos - (8 >> bytePP));
                                QV(qPtr + STRBLTLQ_SRCEXT)       = (dwSrcHeight << 18) |
 (srcWidthBurst + (8 >> bytePP));
                                QV(qPtr + STRBLTLQ_ALIGNMENT)    = alignment;
                            }
                        }
                    }
                    QV(qPtr + STRBLTLQ_DSTOFFSET)    = dwDstOffset;
                    QV(qPtr + STRBLTLQ_DSTXY)        = (pbd->rDest.top << 18) | (pbd->rD
est.left + iDst);

                                        5

                    QV(qPtr + STRBLTLQ_DSTEXT)       = (dwDstHeight << 18) | dstWidthBur
st;
                    if (dwFlags & (DDBLT_KEYSRCOVERRIDE | DDBLT_KEYSRC)) {
                        QV(qPtr + STRBLTLQ_SRCETC)  = srcTile | (SF_COMPARE << 27) | (b
ytePP << 18) | dwSrcPitch;
                        switch (dwRGBBitCount) {
                            case 8:  QV(qPtr + STRBLTLQ_TCOLOUR8)  = dwColorKey; break;
                            case 15: QV(qPtr + STRBLTLQ_TCOLOUR15) = dwColorKey; break;
                            case 16: QV(qPtr + STRBLTLQ_TCOLOUR16) = dwColorKey; break;
                            case 24: QV(qPtr + STRBLTLQ_TCOLOUR24) = dwColorKey; break;
                            case 32: QV(2*qPtr + STRBLTLQ_TCOLOUR32) = dwColorKey; brea
k;
                        }
                    } else {
                        QV(qPtr + STRBLTLQ_SRCETC)  = srcTile | (bytePP << 18) | dwSrcP
itch;
                    }
                    if (dwFlags & (DDBLT_KEYDESTOVERRIDE | DDBLT_KEYDEST)) {
                        QV(qPtr + STRBLTLQ_DSTETC)  = dstTile | (SF_COMPARE << 27) | (b
ytePP << 18) | dwDstPitch;
                        switch (dwRGBBitCount) {
                            case 8:  QV(qPtr + STRBLTLQ_TCOLOUR8)  = dwColorKey; break;
                            case 15: QV(qPtr + STRBLTLQ_TCOLOUR15) = dwColorKey; break;
                            case 16: QV(qPtr + STRBLTLQ_TCOLOUR16) = dwColorKey; break;
                            case 24: QV(qPtr + STRBLTLQ_TCOLOUR24) = dwColorKey; break;
                            case 32: QV(2*qPtr + STRBLTLQ_TCOLOUR32) = dwColorKey; brea
k;
                        }
                    } else {
                        QV(qPtr + STRBLTLQ_DSTETC)  = dstTile | (bytePP << 18) | dwDstP
itch;
                    }
                    QV(qPtr + STRBLTLQ_YDDAINC)      = (dwSrcHeight << 18) / dwDstHeight
;
                    QV(qPtr + STRBLTLQ_YDDAACC)      = 0;
                    QV(qPtr + STRBLTLQ_SRCINC)       = srcInc[dstIndex >> (8-bytePP)];
                    for (iPos=0; iPos<(dstWidthBurst+dstMod]; iPos+=(8 >> bytePP)) {
                        QV(qPtr + STRBLTLQ_SWC + (iPos << bytePP))     = (DWORD)swc[(ds
tIndex+iPos) >> (3 - bytePP)];
                        QV(qPtr + STRBLTLQ_SWC + (iPos << bytePP) + 4) = (DWORD)(swc[(d
stIndex+iPos) >> (3 - bytePP)] >> 32);
                    }
                    (*pDriverData->pPrivDDInfo->lpHostPrimaryUsage)++;
                    mlUpdateQueue();
                    if (rightToLeft) {
                        dstWidthBurst = min(iDst, (DWORD)256 >> bytePP);
                        iDst -= dstWidthBurst;
                        striping = dstWidthBurst > 0;
                    } else {
                        iDst += dstWidthBurst;
                        dstWidthBurst = min(dwDstWidth - iDst, (DWORD)256 >> bytePP);
                        striping = iDst < dwDstWidth;
                    }
                } while (striping);

            } else if (dwFlags & (DDBLT_KEYSRCOVERRIDE | DDBLT_KEYDESTOVERRIDE | DDBLT_
KEYDEST | DDBLT_KEYSRC)) {
/*
    DPF("Blt32: MirrorBlt from %08X %dx%d -> %08X %dx%d key=%08X", dwSrcOffset, dwSrcWidth,
 dwSrcHeight, dwDstOffset, dwDstWidth, dwDstHeight, dwColorKey);

                                        6
```

```
    DDASSERT(pDriverData->pPrivDDInfo->vspDDFunctions.numFunctions != 0);

    qPtr = mlPostQueue(MBLT_SIZE, TASK_DD);
    QV(qPtr + MBLT_ENTRY) = pDriverData->pPrivDDInfo->vspDDFunctions.functionPointers[VEpDD
MBlt];
    QV(qPtr + MBLT_FLAGS) = MBLT_RIGHTLEFT | MBLT_UPDOWN;
    QV(qPtr + MBLT_SRCOFFSET) = dwSrcOffset;
    QV(qPtr + MBLT_SRCXY)      = (pbd->rSrc.top << 18) | pbd->rSrc.left;
    QV(qPtr + MBLT_DSTOFFSET) = dwDstOffset;
    QV(qPtr + MBLT_DSTXY)      = (pbd->rDest.top << 18) | pbd->rDest.left;
    QV(qPtr + MBLT_DSTEXT)     = (dwDstHeight << 18) | dwDstWidth;
    QV(qPtr + MBLT_DSTETC)     = dstTile | ((((dwRGBBitCount + 1) >> 3) - 1) << 18) | dwDstP
itch;
    QV(qPtr + MBLT_SRCETC)     = srcTile | ((((dwRGBBitCount + 1) >> 3) - 1) << 18) | dwSrcP
itch;
    (*pDriverData->pPrivDDInfo->lpHostPrimaryUsage)++;
    mlUpdateQueue();
    break;
*/
                    // ----------------------------------------------------------------
-----------------------------------
                    // Source compare and destination compare bitblt
                    //
                    // Description:
                    //      Bitblt with either source compare or destination compare.  Usin
g both is not supported.
                    // ----------------------------------------------------------------
-----------------------------------

                    if (dwFlags & DDBLT_KEYSRCOVERRIDE)        dwColorKey  = pbd->bltFX.ddck
SrcColorkey.dwColorSpaceLowValue;
                    else if (dwFlags & DDBLT_KEYDESTOVERRIDE) dwColorKey  = pbd->bltFX.ddck
DestColorkey.dwColorSpaceLowValue;
                    else if (dwFlags & DDBLT_KEYSRC)           dwColorKey  = pbd->lpDDSrcSur
face->ddckCKSrcBlt.dwColorSpaceLowValue;
                    else if (dwFlags & DDBLT_KEYDEST)          dwColorKey  = pbd->lpDDDestSu
rface->ddckCKDestBlt.dwColorSpaceLowValue;

                    DPF("Blt32: TransBlt from %08X %dx%d -> %08X %dx%d key=%08X", dwSrcOffs
et, dwSrcWidth, dwSrcHeight, dwDstOffset, dwDstWidth, dwDstHeight, dwColorKey);
                    DDASSERT(pDriverData->pPrivDDInfo->vspDDFunctions.numFunctions != 0);

                    qPtr = mlPostQueue(TBLT_SIZE, TASK_DD);
                    if (tileConfig == 0) {
                        tileSave = VspReg(PCI_QH_ENDIAN_TILE);
                        VspReg(PCI_QH_ENDIAN_TILE) = tileSave & ~(MASK_TILING_8 | MASK_TILI
NG_16_555 | MASK_TILING_16_565 | MASK_TILING_32);
                    }
                    QV(qPtr + TBLT_ENTRY) = pDriverData->pPrivDDInfo->vspDDFunctions.functi
onPointers[VEpDDTBlt];
                    switch (dwRGBBitCount) {
                        case 8:  QV(qPtr + TBLT_COLOUR8)  = dwColorKey; break;
                        case 15: QV(qPtr + TBLT_COLOUR15) = dwColorKey; break;
                        case 16: QV(qPtr + TBLT_COLOUR16) = dwColorKey; break;
                        case 24: QV(qPtr + TBLT_COLOUR24) = dwColorKey; break;
                        case 32: QV(2*qPtr + TBLT_COLOUR32) = dwColorKey; break;
                    }
                    QV(qPtr + TBLT_SRCOFFSET) = dwSrcOffset;
                    QV(qPtr + TBLT_SRCXY)      = (pbd->rSrc.top << 18) | pbd->rSrc.left;
                    QV(qPtr + TBLT_DSTOFFSET) = dwDstOffset;
```

7

```
                    QV(qPtr + TBLT_DSTXY)      = (pbd->rDest.top << 18) | pbd->rDest.left;
                    QV(qPtr + TBLT_DSTEXT)     = (dwDstHeight << 18) | dwDstWidth;
                    if (dwRGBBitCount == 32) {
                        if (dwFlags & (DDBLT_KEYDESTOVERRIDE | DDBLT_KEYDEST)) {
                            QV(qPtr + TBLT_DSTETC) = dstTile | (SF_COMPARE << 27) | (1 << 1
8) | (dwDstPitch >> 1);
                        } else {
                            QV(qPtr + TBLT_DSTETC) = dstTile | (1 << 18) | (dwDstPitch >> 1
);
                        }
                        QV(qPtr + TBLT_SRCETC)     = srcTile | (1 << 18) | (dwSrcPitch >> 1
);
                    } else {
                        if (dwFlags & (DDBLT_KEYDESTOVERRIDE | DDBLT_KEYDEST)) {
                            QV(qPtr + TBLT_DSTETC) = dstTile | (SF_COMPARE << 27) | ((((dwR
GBBitCount + 1) >> 3) - 1) << 18) | dwDstPitch;
                        } else {
                            QV(qPtr + TBLT_DSTETC) = dstTile | ((((dwRGBBitCount + 1) >> 3)
 - 1) << 18) | dwDstPitch;
                        }
                        QV(qPtr + TBLT_SRCETC)     = srcTile | ((((dwRGBBitCount + 1) >> 3)
 - 1) << 18) | dwSrcPitch;
                    }
                    if (tileConfig == 0) {
                        VspReg(PCI_QH_ENDIAN_TILE) = tileSave;
                    }
                    (*pDriverData->pPrivDDInfo->lpHostPrimaryUsage)++;
                    mlUpdateQueue();

                } else {
                    // ----------------------------------------------------------------
-----------------------------------
                    // Screen to screen bitblt
                    //
                    // Description:
                    //      Uses roey's arbfill bitblt routines
                    // ----------------------------------------------------------------
-----------------------------------
                    DPF("Blt32: Blt from %08X %dx%d -> %08X %dx%d", dwSrcOffset, dwSrcWidth
, dwSrcHeight, dwDstOffset, dwDstWidth, dwDstHeight);
                    qPtr = mlPostQueue(ARBCPY_SIZE, TASK_2D);
                    QV(qPtr + ARBCPY_ENTRY)            = pDriverData->pPrivDDInfo->vsp2DFunct
ions.functionPointers[VEp2DArbCopy];
                    QV(qPtr + ARBCPY_SRC)              = (pbd->rSrc.left << 16)  | pbd->rSrc.
top;
                    QV(qPtr + ARBCPY_DEST)             = (pbd->rDest.left << 16) | pbd->rDest
.top;
                    QV(qPtr + ARBCPY_EXT)              = (dwDstWidth << 16)      | dwDstHeigh
t;
                    QV(2*qPtr + ARBCPY_SRCOFF_LO18)  = dwSrcOffset;
                    QV(2*qPtr + ARBCPY_SRCOFF_HI18)  = (dwSrcOffset >> 18) | FORCE_PHYS_HI1
8 | srcArbTile;
                    QV(2*qPtr + ARBCPY_DESTOFF_LO18) = dwDstOffset;
                    QV(2*qPtr + ARBCPY_DESTOFF_HI18) = (dwDstOffset >> 18) | FORCE_PHYS_HI1
8 | dstArbTile;
                    if (dwRGBBitCount == 32) {
                        QV(qPtr + ARBCPY_DESTSTRIDE)     = dwDstPitch >> 1;
                        QV(qPtr + ARBCPY_SRCSTRIDE)      = dwSrcPitch >> 1;
                    } else {
                        QV(qPtr + ARBCPY_DESTSTRIDE)     = dwDstPitch;
```

8

```
                QV(qPtr + ARBCPY_SRCSTRIDE)       = dwSrcPitch;
            }
            (*pDriverData->pPrivDDInfo->lpHostPrimaryUsage)++;
            miUpdateQueue();
        }
        break;

    case BLACKNESS:
        // -----------------------------------------------------------------------
-------------------------------
        // ROP3 BLACKNESS
        // -----------------------------------------------------------------------
-------------------------------
        SolidFill(0, dwDstOffset, pbd->rDest.left, pbd->rDest.top, dwDstWidth, dwDs
tHeight, dwDstPitch, dstArbTile);
        break;

    case WHITENESS:
        // -----------------------------------------------------------------------
-------------------------------
        // ROP3 WHITENESS
        // -----------------------------------------------------------------------
-------------------------------
        SolidFill(0xFFFFFFFF, dwDstOffset, pbd->rDest.left, pbd->rDest.top, dwDstWi
dth, dwDstHeight, dwDstPitch, dstArbTile);
        break;

    default:
        // ***** General ROP3 bitblt *****
        // accelerate only pattern invariant ROPs
        if (((pbd->bltFX.dwROP & 0xF0) >> 4) == (pbd->bltFX.dwROP & 0x0F)) {
            DPF("Blt32: ROP3=%08X Dst=(%08X,%dx%d) Src=(%08X,%dx%d)", pbd->bltFX.dw
ROP,
                dwDstOffset, dwDstWidth, dwDstHeight, dwSrcOffset, dwSrcWidth, dwS
rcHeight);

#if ROSY_GETS_ROP3S_WORKING
            qPtr = miPostQueue(ROPBLT_SIZE, TASK_2D);
            QV(qPtr + ROPBLT_ENTRY) = pDriverData->pPrivDDInfo->vsp2DFunctions.func
tionPointers[VSp2DSolRop3];
            switch (pDriverData->HALInfo.vmiData.ddpfDisplay.bitDepth.dwRGBBitCount
) {
                case 8:  QV(qPtr + ROPBLT_SOLBRUSH8)  = pbd->bltFX.dwFillColor; bre
ak;
                case 15: QV(qPtr + ROPBLT_SOLBRUSH15) = pbd->bltFX.dwFillColor; bre
ak;
                case 16: QV(qPtr + ROPBLT_SOLBRUSH16) = pbd->bltFX.dwFillColor; bre
ak;
                case 24: QV(qPtr + ROPBLT_SOLBRUSH24) = pbd->bltFX.dwFillColor; bre
ak;
                case 32: QV(qPtr + ROPBLT_SOLBRUSH32) = pbd->bltFX.dwFillColor; bre
ak;
            }
            QV(qPtr + ROPBLT_ROP)  = pbd->bltFX.dwROP;
            QV(qPtr + ROPBLT_DEST) = (dwDstX << 16) | dwDstY;
            QV(qPtr + ROPBLT_EXT)  = (dwDstWidth << 16) | dwDstHeight;
            QV(qPtr + ROPBLT_SRC)  = (dwSrcX << 16) | dwSrcY;
            (*pDriverData->pPrivDDInfo->lpHostPrimaryUsage)++;
            miUpdateQueue();
#else
```

```
                return DDHAL_DRIVER_NOTHANDLED;
#endif
            } else {
                DPF("Blt32: Pattern Blt called, ROP3=%08X", pbd->bltFX.dwROP);
//              return DDHAL_DRIVER_NOTHANDLED;
            }
            break;
        }
    } else if (dwFlags & DDBLT_COLORFILL) {
        // -----------------------------------------------------------------------
-------------------------
        // Solid colour fill
        // -----------------------------------------------------------------------
-------------------------
        SolidFill(pbd->bltFX.dwFillColor, dwDstOffset, pbd->rDest.left, pbd->rDest.top, dwD
stWidth, dwDstHeight, dwDstPitch, dstArbTile);
    } else if (dwFlags & DDBLT_DDFX) {

        if (dwSrcWidth != dwDstWidth || dwSrcHeight != dwDstHeight) {
            // -------------------------------------------------------------------
---------------------------
            // Special FX StretchBlt
            //
            // Description:
            //      Same as regular strblt except without transparency
            // -------------------------------------------------------------------
---------------------------
            DWORD iDst, iSrc, iPos;
            DWORD dstIndex, leftPos;
            DWORD dstWidthBurst, srcWidthBurst;
            DWORD bytePP, alignMask, originalAligment;
            DWORD dwTmp1, dwTmp2, dwTmp3;
            BOOL rightToLeft, striping;

            DPF("Blt32: FXStretchBlt from %08X %dx%d -> %08X %dx%d", dwSrcOffset, dwSrcWidt
h, dwSrcHeight, dwDstOffset, dwDstWidth, dwDstHeight);
            DDASSERT(pDriverData->pPrivDDInfo->vspDDFunctions.numFunctions != 0);

            // generate alignment mask for determining alignment within a double
            switch (dwRGBBitCount) {
                case 8:  alignMask = 0x7; break;
                case 15:
                case 16:
                case 32: alignMask = 0x3; break;
                case 24: alignMask = 0x1; break;
            }

            // if stretch parameters are same as previous stretch, then do not recompute
            bytePP = ((dwRGBBitCount + 1) >> 3) - 1;    // bytes per pixel - 1
            dwTmp1 = (dwSrcWidth << 18) / dwDstWidth;   // xDDA increment term
            dwTmp2 = ((pbd->rSrc.left & alignMask) - (pbd->rDest.left & alignMask)) << byte
PP;
            dwTmp3 = pbd->rDest.left & alignMask;       // destination modulus = dstX % 8
            if (dwTmp1 != xDDAInc || dwTmp2 != alignment || dwTmp3 != dstMod || dwDstWidth
> dwDstWidthPrev || dwRGBBitCount != dwPixelDepthPrev) {
                alignment = dwTmp2;
                dstMod = dwTmp3;
                dwDstWidthPrev = dwDstWidth;
                dwPixelDepthPrev = dwRGBBitCount;
```

```
            GenerateSwitchConstants(alignMask, bytePP, dwTmp1, pbd->rDest.left, dwDstWi
dth);
        }

            // post it to the queue
        rightToLeft = pbd->rDest.left >= pbd->rSrc.left;
        originalAlignment = alignment;
        if (bytePP == 2) dstMod = pbd->rDest.left & 0x7;
        if (rightToLeft) {
            dstWidthBurst = dwDstWidth;
            if (dstWidthBurst > ((DWORD)256 >> bytePP)) {
                dstWidthBurst -= ((DWORD)256 >> bytePP) - dstMod;
                while (dstWidthBurst > ((DWORD)256 >> bytePP)) dstWidthBurst -= (DWORD)
256 >> bytePP;
            }
            iDst = dwDstWidth - dstWidthBurst;
        } else {
            iDst = 0;
            dstWidthBurst = min(dwDstWidth, ((DWORD)256 >> bytePP) - dstMod);
        }
        do {
            iSrc = xDDA[iDst] >> 18;
            dstIndex = iDst + dstMod;
            leftPos = pbd->rSrc.left + iSrc;
            srcWidthBurst = (xDDA[iDst + dstWidthBurst] >> 18) - iSrc + 2;
            qPtr = mlPostQueue(STRBLTLQ_SIZE, TASK_DD);
            QV(qPtr + STRBLTLQ_ENTRY)          = pDriverData->pPrivDDInfo->vspDDFunctions.
functionPointers[VEpDDStrBltLQ];
            QV(qPtr + STRBLTLQ_SRCOFFSET)    = dwSrcOffset;
            if (bytePP == 2) {
                alignment = (((pbd->rDest.left + iDst) & alignMask) - (leftPos & alignM
ask)) << 2;
                if (originalAlignment != 0) alignment = abs(alignment);
                QV(qPtr + STRBLTLQ_SRCXY)         = (pbd->rSrc.top << 18) | leftPos;
                QV(qPtr + STRBLTLQ_SRCEXT)        = (dwSrcHeight << 18) | srcWidthBurst;
                QV(qPtr + STRBLTLQ_ALIGNMENT)     = alignment;
            } else {
                // if the starting byte position plus alignment transitions another dou
ble, make adjustments
                if (((leftPos * (bytePP + 1)) & -0x7) == ((leftPos * (bytePP + 1) - ali
gnment) & -0x7)) {
                    // no adjustments
                    QV(qPtr + STRBLTLQ_SRCXY)         = (pbd->rSrc.top << 18) | leftPos;
                    QV(qPtr + STRBLTLQ_SRCEXT)        = (dwSrcHeight << 18) | srcWidthBur
st;
                    QV(qPtr + STRBLTLQ_ALIGNMENT)     = alignment;
                } else {
                    if (alignment & 0x80000000) {
                        // first pixel is on next double when aligned, easy fix is to j
ust shift the other way
                        QV(qPtr + STRBLTLQ_SRCXY)         = (pbd->rSrc.top << 18) | leftP
os;
                        QV(qPtr + STRBLTLQ_SRCEXT)        = (dwSrcHeight << 18) | srcWidt
hBurst;
                        QV(qPtr + STRBLTLQ_ALIGNMENT)     = 8 + alignment;
                    } else {
                        // first pixel is on previous double when aligned, read a doubl
e's worth more data
                        QV(qPtr + STRBLTLQ_SRCXY)         = (pbd->rSrc.top << 18) | (left
Pos - (8 >> bytePP));
```

```
                        QV(qPtr + STRBLTLQ_SRCEXT)        = (dwSrcHeight << 18) | (srcWid
thBurst + (8 >> bytePP));
                        QV(qPtr + STRBLTLQ_ALIGNMENT)     = alignment;
                    }
                }
            }
            QV(qPtr + STRBLTLQ_DSTOFFSET)    = dwDstOffset;
            QV(qPtr + STRBLTLQ_DSTXY)        = (pbd->rDest.top << 18) | (pbd->rDest.left
 + iDst);
            QV(qPtr + STRBLTLQ_DSTEXT)       = (dwDstHeight << 18) | dstWidthBurst;
            QV(qPtr + STRBLTLQ_SRCETC)       = srcTile | (bytePP << 18) | dwSrcPitch;
            QV(qPtr + STRBLTLQ_DSTETC)       = dstTile | (bytePP << 18) | dwDstPitch;
            QV(qPtr + STRBLTLQ_YDDAINC)      = (dwSrcHeight << 18) / dwDstHeight;
            QV(qPtr + STRBLTLQ_YDDAACC)      = 0;
            QV(qPtr + STRBLTLQ_SRCINC)       = srcInc[dstIndex >> (8-bytePP)];
            for (iPos=0; iPos<(dstWidthBurst+dstMod); iPos+=(8 >> bytePP)) {
                QV(qPtr + STRBLTLQ_SWC + (iPos << bytePP))      = (DWORD)swc[(dstIndex+i
Pos) >> (3 - bytePP)];
                QV(qPtr + STRBLTLQ_SWC + (iPos << bytePP) + 4) = (DWORD)(swc[(dstIndex+
iPos) >> (3 - bytePP)] >> 32);
            }
            (*pDriverData->pPrivDDInfo->lpHostPrimaryUsage)++;
            mlUpdateQueue();
            if (rightToLeft) {
                dstWidthBurst = min(iDst, (DWORD)256 >> bytePP);
                iDst -= dstWidthBurst;
                striping = dstWidthBurst > 0;
            } else {
                iDst += dstWidthBurst;
                dstWidthBurst = min(dwDstWidth - iDst, (DWORD)256 >> bytePP);
                striping = iDst < dwDstWidth;
            }
        } while (striping);

        } else if (pbd->bltFX.dwDDFX & (DDBLTFX_MIRRORUPDOWN | DDBLTFX_MIRRORLEFTRIGHT)) {
        // ----------------------------------------------------------------------------
----------------------------
        // Special FX mirror blt
        // ----------------------------------------------------------------------------
----------------------------
        DPF("Blt32: MirrorBlt from %08X %dx%d -> %08X %dx%d", dwSrcOffset, dwSrcWidth,
dwSrcHeight, dwDstOffset, dwDstWidth, dwDstHeight);
        DDASSERT(pDriverData->pPrivDDInfo->vspDDFunctions.numFunctions != 0);

            qPtr = mlPostQueue(MBLT_SIZE, TASK_DD);
        QV(qPtr + MBLT_ENTRY) = pDriverData->pPrivDDInfo->vspDDFunctions.functionPointe
rs[VEpDDMBlt];
        QV(qPtr + MBLT_FLAGS) = 0;
        if (pbd->bltFX.dwDDFX & DDBLTFX_MIRRORUPDOWN)    QV(qPtr + MBLT_FLAGS) |= MBLT_
UPDOWN;
        if (pbd->bltFX.dwDDFX & DDBLTFX_MIRRORLEFTRIGHT) QV(qPtr + MBLT_FLAGS) |= MBLT_
RIGHTLEFT;
        QV(qPtr + MBLT_SRCOFFSET) = (DWORD)dwSrcOffset;
        QV(qPtr + MBLT_SRCXY)     = (pbd->rSrc.top << 18) | pbd->rSrc.left;
        QV(qPtr + MBLT_DSTOFFSET) = (DWORD)dwDstOffset;
        QV(qPtr + MBLT_DSTXY)     = (pbd->rDest.top << 18) | pbd->rDest.left;
        QV(qPtr + MBLT_DSTEXT)    = (dwDstHeight << 18) | dwDstWidth;
        if (dwRGBBitCount == 32) {
            QV(qPtr + MBLT_DSTETC)     = dstTile | (1 << 18) | (dwDstPitch >> 1);
            QV(qPtr + MBLT_SRCETC)     = srcTile | (1 << 18) | (dwSrcPitch >> 1);
```

```
            } else {
                QV(qPtr + MBLT_DSTETC)     = dstTile | ((((dwRGBBitCount + 1) >> 3) - 1) <<
18) | dwDstPitch;
                QV(qPtr + MBLT_SRCETC)     = srcTile | ((((dwRGBBitCount + 1) >> 3) - 1) <<
18) | dwSrcPitch;
            }
            (*pDriverData->pPrivDDInfo->lpHostPrimaryUsage)++;
            mlUpdateQueue();

        } else {
            return DDHAL_DRIVER_NOTHANDLED;
        }
    } else if (dwFlags & DDBLT_DEPTHFILL) {
        // ---------------------------------------------------------------------
-----------------------
        // Z Buffer fill
        // ---------------------------------------------------------------------
-----------------------
        DWORD dwFillDepth  = pbd->bltFX.dwFillDepth;
        DPF("Blt32: depth fill %08X %08X %dx%d", dwDstOffset, dwFillDepth, dwDstWidth, dwDs
tHeight);
        qPtr = mlPostQueue(ARBFIL_SIZE, TASK_2D);
        if (tileConfig == 0) {
            tileSave = VspReg(PCI_QH_ENDIAN_TILE);
            VspReg(PCI_QH_ENDIAN_TILE) = tileSave & ~(MASK_TILING_8 | MASK_TILING_16_555 |
MASK_TILING_16_565 | MASK_TILING_32);
        }
        QV(qPtr + ARBFIL_ENTRY) = pDriverData->pPrivDDInfo->vsp2DFunctions.functionPointers
[VEp2DArbFill];
        QV(qPtr + ARBFIL_SOLDEPTH36)      = (pbd->bltFX.dwFillDepth&0xffff);
        QV(qPtr + ARBFIL_DEST)            = (pbd->rDest.left << 16) | pbd->rDest.top;
        QV(qPtr + ARBFIL_EXT)             = (dwDstWidth << 16)      | dwDstHeight;
        QV(2*qPtr + ARBFIL_DESTOFF_LO18) = dwDstOffset;
        QV(2*qPtr + ARBFIL_DESTOFF_HI18) = (dwDstOffset >> 18) | FORCE_PHYS_HI18 | dstArbTi
le;
        QV(qPtr + ARBFIL_DESTSTRIDE)      = dwDstPitch;
        if (tileConfig == 0) {
            VspReg(PCI_QH_ENDIAN_TILE) = tileSave;
        }
        (*pDriverData->pPrivDDInfo->lpHostPrimaryUsage)++;
        mlUpdateQueue();

    } else {
        return DDHAL_DRIVER_NOTHANDLED;
    }

    pbd->ddRVal = DD_OK;
    return DDHAL_DRIVER_HANDLED;

} /* Blt32 */
```

13

```
// ---------------------------------------------------------------------------------
----------------
// CreateSurface32
//
// Description:
//      Creates surfaces by allocating memory from RM.  Tiling and view configurations are
shown below:
//
//      Surface Type                    Tiling              View
//      --------------------------      ---------------     -----
//      DDSCAPS_3DDEVICE                don't care          don't care
//      DDSCAPS_ALPHA                   untiled             8 (not yet implemented)
//      DDSCAPS_BACKBUFFER              display tiling      FB
//      DDSCAPS_COMPLEX                 don't care          don't care
//      DDSCAPS_FLIP                    display tiling      FB
//      DDSCAPS_FRONTBUFFER             display tiling      FB
//      DDSCAPS_OFFSCREENPLAIN          no tiling           8, 15, 16, or 32
//      DDSCAPS_OVERLAY                 N/A                 N/A
//      DDSCAPS_PALETTE                 don't care          don't care
//      DDSCAPS_PRIMARYSURFACE          display tiling      FB
//      DDSCAPS_PRIMARYSURFACELEFT      display tiling      FB
//      DDSCAPS_SYSTEMMEMORY            N/A                 N/A
//      DDSCAPS_TEXTURE                 untiled+            8, 15, or 16
//      DDSCAPS_VIDEOMEMORY             don't care          don't care
//      DDSCAPS_VISIBLE                 display tiling      FB
//      DDSCAPS_WRITEONLY               don't care          don't care
//      DDSCAPS_ZBUFFER                 depends*            18
//      DDSCAPS_OWNDC                   don't care          don't care
//      DDSCAPS_LIVEVIDEO               mpeg tiling         8, 15, 16, or 32
//      DDSCAPS_HWCODEC                 mpeg tiling         8, 15, 16, or 32
//      DDSCAPS_MODEX                   no tiling           A000
//      DDSCAPS_MIPMAP                  untiled             8, 15, or 16
//      DDSCAPS_ALLOCONLOAD             don't care          don't care
//
//      * Zbuffers are tiled in full screen mode and untiled otherwise.  Zbuffers always ha
ve a shadow copy
//          in system memory.  The system copy is translated to RDRAM and back on Lock() an
d Unlock() calls.
//      + Textures do not obey pitch aligmment and always equal width.
// ---------------------------------------------------------------------------------
----------------

DWORD DDAPI CreateSurface32(LPDDHAL_CREATESURFACEDATA lpCreateSurfaceData)
{
LPDDRAWI_DDRAWSURFACE_LCL *lpLocal;
LPDDSURFACEDESC lpDDSurf;
DWORD bytesRequested, i, numBits, mSize;
DWORD displayPitch, tileWidth;
LPDDHALMODEINFO lpMode;
DWORD modeIndex;
BOOL allocFailed;
int view;
DWORD viewOffset;
DWORD curProcIndex;
DWORD textureDepth;
DWORD dwFBBaseAddr;
LPPRIVATE_DDSURFACEINFO privSurfInfo;

    DPF("Enter CreateSurface32");
    lpDDSurf = lpCreateSurfaceData->lpDDSurfaceDesc;
```

1

```
    lpLocal = lpCreateSurfaceData->lplpSList;
    lpMode = lpCreateSurfaceData->lpDD->lpModeInfo;
    modeIndex = lpCreateSurfaceData->lpDD->dwModeIndex;
    dwFBBaseAddr = lpCreateSurfaceData->lpDD->fpPrimaryOrig;

    if (!rmInitialized) {
        // Note: there are some situations where this DLL can be started without going thro
ugh DllMain().
        //      if that happens, then initialize RM here
        curProcIndex = VSPInit(_getpid(), &(pDriverData->pPrivDDInfo->dwRDRAMAvailable));
        DPF("RM reports %d bytes of RDRAM available", RDRAMAvailable);
        pDriverData->pPrivDDInfo->fullScreen = FALSE;
        rmInitialized = TRUE;
        UpdateMemoryAvailable(lpCreateSurfaceData->lpDD, 0);
    } else {
        // get the current process handle from the rmif process manager
        curProcIndex = VSPGetProcess(_getpid());
    }

    lpLocal[0]->dwReserved1 = 0;

//  if (lpDDSurf->dwFlags & DDSD_CAPS) {
    // HACK: this is contrary to documented behaviour, but applications continue to ignore
this flag
    if (TRUE) {
        DPF("Surface type = %08x", lpDDSurf->ddsCaps.dwCaps);

        // no overlays, no system memory
        if (lpDDSurf->ddsCaps.dwCaps & (DDSCAPS_SYSTEMMEMORY | DDSCAPS_OVERLAY)) {
            return DDHAL_DRIVER_NOTHANDLED;
        }

        if (lpDDSurf->ddsCaps.dwCaps & DDSCAPS_HWCODEC) {
            // HWCODEC surfaces always point to the 36 bit ALL view
            view = k36BitView;
            viewOffset = V36ALL;
        } else if ((lpDDSurf->ddsCaps.dwCaps & DDSCAPS_TEXTURE) && (lpCreateSurfaceData->lp
DDSurfaceDesc->dwFlags & DDSD_PIXELFORMAT)) {
            // texture pixel depths are decoupled frmo display pixel depth
            switch (lpCreateSurfaceData->lpDDSurfaceDesc->ddpfPixelFormat.dwRGBBitCount) {
                case 32: view = k8BitView;     viewOffset = V8BPP;  break;   // Note: 32 bit
 textures are not lossy, use 8 bit all view
                case 16: view = k16to565View; viewOffset = V16BPP; break;
                case 15: view = k16to555View; viewOffset = V15BPP; break;
                default: view = k8BitView;     viewOffset = V8BPP;  break;
            }
            // since there is no 15 bit texture per se, do a manual check of the bit masks
            if ((lpCreateSurfaceData->lpDDSurfaceDesc->ddpfPixelFormat.dwRGBBitCount == 16)
             && (lpCreateSurfaceData->lpDDSurfaceDesc->ddpfPixelFormat.dwRBitMask == 0x7C00
)
             && (lpCreateSurfaceData->lpDDSurfaceDesc->ddpfPixelFormat.dwGBitMask == 0x03E0
)
             && (lpCreateSurfaceData->lpDDSurfaceDesc->ddpfPixelFormat.dwBBitMask == 0x001F
)) {
                view = k16to555View;
                viewOffset = V15BPP;
            }
        } else {
            // set view according to current display pixel depth
            switch (lpMode[modeIndex].dwBPP) {
```

2

```
            case 32: view = k32To16BitView; viewOffset = V32BPP; break;
            case 16: view = k16to565View;   viewOffset = V16BPP; break;
            case 15: view = k16to555View;   viewOffset = V15BPP; break;
            default: view = k8BitView;      viewOffset = V8BPP;  break;
        }
    }

    if ((lpDDSurf->ddsCaps.dwCaps & (DDSCAPS_TEXTURE | DDSCAPS_MIPMAP | DDSCAPS_ALPHA |
DDSCAPS_OFFSCREENPLAIN | DDSCAPS_MODEX | DDSCAPS_LIVEVIDEO | DDSCAPS_HWCODEC))
        || ((lpDDSurf->ddsCaps.dwCaps & DDSCAPS_ZBUFFER) && !fullScreen)
        || ((lpDDSurf->ddsCaps.dwCaps & DDSCAPS_VIDEOMEMORY) && !(lpDDSurf->ddsCaps.dwCaps
& (DDSCAPS_BACKBUFFER | DDSCAPS_VISIBLE | DDSCAPS_FRONTBUFFER | DDSCAPS_PRIMARYSURFACE | DD
SCAPS_PRIMARYSURFACELEFT | DDSCAPS_ZBUFFER)))) {

        // *************** Untiled Surfaces ***************

        if (!(lpDDSurf->ddsCaps.dwCaps & DDSCAPS_HWCODEC) && ((lpMode[modeIndex].dwBPP
== 24 || lpMode[modeIndex].dwBPP==8) && (lpDDSurf->ddsCaps.dwCaps & (DDSCAPS_ZBUFFER | DDSC
APS_TEXTURE | DDSCAPS_MIPMAP | DDSCAPS_ALPHA)))) {
            // punt everything back in 24 bpp mode for full emulation, or punt 3d relat
ed surface in 8 bpp
            lpCreateSurfaceData->ddRVal = DDERR_INVALIDPIXELFORMAT;
            return DDHAL_DRIVER_HANDLED;
        }

        if (lpDDSurf->ddsCaps.dwCaps & DDSCAPS_TEXTURE) {
            // for textures, pitch is forced to width * bytesPerPel
            lpLocal[0]->lpGbl->lPitch = lpLocal[0]->lpGbl->wWidth;
            if (lpCreateSurfaceData->lpDDSurfaceDesc->dwFlags & DDSD_PIXELFORMAT) {
                textureDepth = lpCreateSurfaceData->lpDDSurfaceDesc->ddpfPixelFormat.dw
RGBBitCount;
            } else {
                // if texture depth is not defined, then use display mode depth
                textureDepth = lpMode[modeIndex].dwBPP;
            }
            switch (textureDepth) {
                case 1:  lpLocal[0]->lpGbl->lPitch = (lpLocal[0]->lpGbl->lPitch + 7) >>
 3; break;
                case 2:  lpLocal[0]->lpGbl->lPitch = (lpLocal[0]->lpGbl->lPitch + 3) >>
 2; break;
                case 4:  lpLocal[0]->lpGbl->lPitch = (lpLocal[0]->lpGbl->lPitch + 1) >>
 1; break;
                case 8:  break;
                case 15:
                case 16: lpLocal[0]->lpGbl->lPitch <<= 1; break;
                case 24: lpLocal[0]->lpGbl->lPitch *= 3;  break;
                case 32: lpLocal[0]->lpGbl->lPitch <<= 2; break;    // NOTE: 32 bpp tex
tures are really 32 bpp
            }
        } else {
            // force the pitch to be a multiple of 8 for nontexture surfaces
            if (view == k32To16BitView) lpLocal[0]->lpGbl->lPitch = (lpLocal[0]->lpGbl-
>lPitch + (DDHAL_SURFACE_ALIGNMENT * 2 - 1)) & ~(DDHAL_SURFACE_ALIGNMENT * 2 - 1);
            else lpLocal[0]->lpGbl->lPitch = (lpLocal[0]->lpGbl->lPitch + (DDHAL_SURFAC
E_ALIGNMENT - 1)) & ~(DDHAL_SURFACE_ALIGNMENT - 1);
        }

        if (lpDDSurf->ddsCaps.dwCaps & DDSCAPS_MIPMAP) {
            // mipmaps have special allocation because all levels must be contiguous
            // count the number of bits in size
```

3

```
            for (i=0, numBits=0, mSize=lpLocal[0]->lpGbl->wWidth; i<16; i++) {
                if (mSize & 0x1) numBits++;
                mSize >>= 1;
            }
            // can only create mipmaps if square and size is a power of 2
            if ((lpLocal[0]->lpGbl->wHeight != lpLocal[0]->lpGbl->wWidth) || (lpLocal[0
]->lpGbl->wWidth < 1) || (numBits != 1)) {
                lpCreateSurfaceData->ddRVal = DDERR_INVALIDPARAMS;
                return DDHAL_DRIVER_HANDLED;
            }
            // calculate total size of all mipmap levels
            for (mSize = (DWORD)lpLocal[0]->lpGbl->wWidth * lpLocal[0]->lpGbl->wHeight,
 bytesRequested = 0;
                 mSize > 1; mSize >>= 2) {
                bytesRequested += mSize;
            }
            bytesRequested++;
            switch (lpMode[modeIndex].dwBPP) {
                case 8:  break;
                case 15:
                case 16:
                case 32: bytesRequested *= 2; break;
                case 24: bytesRequested *= 3; break;
            }
        } else if (lpDDSurf->ddsCaps.dwCaps & DDSCAPS_ZBUFFER) {
            // zbuffer is always 18 bits
            bytesRequested = (DWORD)(lpLocal[0]->lpGbl->wHeight) * (DWORD)(lpLocal[0]->
lpGbl->wWidth) * 2;
        } else {
            // all other untiled surfaces
            bytesRequested = (DWORD)(lpLocal[0]->lpGbl->wHeight) * lpLocal[0]->lpGbl->l
Pitch;
            if (view == k32To16BitView) bytesRequested = (bytesRequested + 1) >> 1;
        }
        // round to a nice VSP friendly size
        bytesRequested = (bytesRequested + 7) & ~7;

        if (tileConfig == 0) {
            displayPitch = lpMode[modeIndex].lPitch;
            bytesRequested = (bytesRequested + (displayPitch * 16 - 1)) & ~(displayPitc
h * 8 - 1);
        }

        VSPAlloc(lpLocal[0], bytesRequested, curProcIndex);
        if (lpLocal[0]->lpGbl->dwReserved1 == 0) {
            lpCreateSurfaceData->ddRVal = DDERR_OUTOFVIDEOMEMORY;
            return DDHAL_DRIVER_HANDLED;
        }
        privSurfInfo = (LPPRIVATE_DDSURFACEINFO)lpLocal[0]->lpGbl->dwReserved1;
        privSurfInfo->dwTileMode = PSTM_TILEMODE_0;
        if (lpDDSurf->ddsCaps.dwCaps & DDSCAPS_ZBUFFER) {
            // zbuffers always lock to 18 bit all view
            privSurfInfo->lpTrueHostAddress = VSPLock(lpLocal[0], k18BitView);
            privSurfInfo->llVSPAddress = (((FLATPTR)(privSurfInfo->lpTrueHostAddress) -
 dwFBBaseAddr - V18ALL) >> 1) | VSPOFFSET_KERNEL_BIT;
            view = k18BitView;
            viewOffset = V18ALL;
            // for now, keep a copy in fpvidmem
            lpLocal[0]->lpGbl->fpVidMem = (FLATPTR)privSurfInfo->lpTrueHostAddress;
        } else if (lpDDSurf->ddsCaps.dwCaps & DDSCAPS_HWCODEC) {
```

4

```
            lpLocal[0]->lpGbl->fpVidMem = (FLATPTR)VSPLock(lpLocal[0], k36BitView);
            VSPUnlock(lpLocal[0]);
            view = k36BitView;
            viewOffset = V36ALL;
        } else {
            // for all other surfaces (except HWCODEC surfaces) lock it
            lpLocal[0]->lpGbl->fpVidMem = (FLATPTR)VSPLock(lpLocal[0], view);
            privSurfInfo->llVSPAddress = lpLocal[0]->lpGbl->fpVidMem - dwFBBaseAddr - v
iewOffset;
            if (view == k32To16BitView) privSurfInfo->llVSPAddress >>= 1;
            privSurfInfo->llVSPAddress |= VSPOFFSET_KERNEL_BIT;
        }
        privSurfInfo->dwView = view;
        privSurfInfo->dwViewBase = dwFBBaseAddr + viewOffset;
        if (tileConfig == 0) {
            if (lpDDSurf->ddsCaps.dwCaps & DDSCAPS_ZBUFFER) {
                lpLocal[0]->lpGbl->fpVidMem = dwFBBaseAddr + (((lpLocal[0]->lpGbl->fpVi
dMem - dwFBBaseAddr) + (displayPitch * 16 - 1)) & -(displayPitch * 16 - 1));
                lpLocal[0]->lpGbl->lPitch <<= 1;
            } else {
                lpLocal[0]->lpGbl->fpVidMem = dwFBBaseAddr + (((lpLocal[0]->lpGbl->fpVi
dMem - dwFBBaseAddr) + (displayPitch * 8 - 1)) & -(displayPitch * 8 - 1));
            }
            privSurfInfo->llVSPAddress = lpLocal[0]->lpGbl->fpVidMem - dwFBBaseAddr - v
iewOffset;
            if (view == k32To16BitView && !(lpDDSurf->ddsCaps.dwCaps & DDSCAPS_ZBUFFER)
) privSurfInfo->llVSPAddress >>= 1;
            privSurfInfo->llVSPAddress |= VSPOFFSET_KERNEL_BIT;
        }
        if (lpDDSurf->ddsCaps.dwCaps & DDSCAPS_MIPMAP) {
            lpLocal[0]->lpSurfMore->dwMipMapCount = lpCreateSurfaceData->lpDDSurfaceDes
c->dwMipMapCount;

            // DDRAW only supplies complex structure if DDSCAPS_COMPLEX is set
            if (lpDDSurf->ddsCaps.dwCaps & DDSCAPS_COMPLEX) {
                // virtualize this multilevel mipmap surface into many single level
 mipmap surfaces
                mSize = (DWORD)lpLocal[0]->lpGbl->wWidth * lpLocal[0]->lpGbl->wHeig
ht;
                switch (lpMode[modeIndex].dwBPP) {
                    case 8:  break;
                    case 15:
                    case 16:
                    case 32: mSize *= 2; break;
                    case 24: mSize *= 3; break;
                }

                for (i=1; i<lpCreateSurfaceData->lpDDSurfaceDesc->dwMipMapCount; i+
+) {
                    lpLocal[i]->dwReserved1 = 0;
                    lpLocal[i]->lpGbl->dwReserved1 = 0;
                    lpLocal[i]->lpGbl->fpVidMem = lpLocal[i-1]->lpGbl->fpVidMem
 + mSize;
                    mSize >>= 2;
                }
            }
        }

        // if this is a (rendering surface or zbuffer) and not a texture and 18 bpp and
 enabled, then enable 1/4 screen rendering
```

5

```
        if ((d3dLevel != 0) && (lpDDSurf->ddsCaps.dwCaps & (DDSCAPS_3DDEVICE | DDSCAPS
ZBUFFER)) && !(lpDDSurf->ddsCaps.dwCaps & DDSCAPS_TEXTURE) && (lpMode[modeIndex].dwBPP == 1
6 || lpMode[modeIndex].dwBPP == 15 || lpMode[modeIndex].dwBPP == 32)) {
            if (lpDDSurf->ddsCaps.dwCaps & DDSCAPS_ZBUFFER) privSurfInfo->dwQResState =
 1;
            else privSurfInfo->dwQResState = 0;
            if (d3dLevel & D3DQUALITY_AUTOSELECT) {
                // if surface is smaller then 120001 pixels, then go to high quality, e
lse 1/4 render min averaging
                if ((DWORD)(lpLocal[0]->lpGbl->wHeight) * (DWORD)(lpLocal[0]->lpGbl->wW
idth) <= 120000) {
                    privSurfInfo->bQResCapable = 0;
                    privSurfInfo->dwQResState = 0;
                } else privSurfInfo->bQResCapable = D3DQUALITY_MINAVG;
            } else privSurfInfo->bQResCapable = d3dLevel;
        }

        privSurfInfo->lpTrueHostAddress = (LPVOID)lpLocal[0]->lpGbl->fpVidMem;

        UpdateMemoryAvailable(lpCreateSurfaceData->lpDD, bytesRequested);
        lpCreateSurfaceData->ddRVal = DD_OK;
        return DDHAL_DRIVER_HANDLED;

    } else if ((lpDDSurf->ddsCaps.dwCaps & (DDSCAPS_BACKBUFFER | DDSCAPS_FLIP | DDSCAPS
_VISIBLE |
                DDSCAPS_FRONTBUFFER | DDSCAPS_PRIMARYSURFACE | DDSCAPS_PRIMARYSURFACELE
FT))
            || ((lpDDSurf->ddsCaps.dwCaps & DDSCAPS_ZBUFFER) && fullScreen)) {

        // *************** Tiled surfaces ***************
        // There are 2 main cases dealt with here:
        //      - Visible buffers, is the primary surface optionally with backbuffers
        //      - Zbuffers in full screen mode

        if (lpDDSurf->ddsCaps.dwCaps & DDSCAPS_ZBUFFER) {
            switch (lpMode[modeIndex].dwBPP) {
                case 8: displayPitch = lpMode[modeIndex].lPitch * 2; break;
                case 24: displayPitch = lpMode[modeIndex].lPitch * 2 / 3; break;
                case 32: displayPitch = lpMode[modeIndex].lPitch / 2; break;
                default: displayPitch = lpMode[modeIndex].lPitch; break;
            }
        } else {
            displayPitch = lpMode[modeIndex].lPitch;
        }
        if (tileConfig != 0) {
            if (lpDDSurf->ddsCaps.dwCaps & DDSCAPS_ZBUFFER) {
                tileWidth = ((lpLocal[0]->lpGbl->wWidth * 2) + 0xFF) & -0xFF;
            } else {
                // FIXME: get BPP info from somewhere else, mode info might not be vali
d place
                if (lpMode[modeIndex].dwBPP == 32) tileWidth = ((lpLocal[0]->lpGbl->wWi
dth * 2) + 0xFF) & -0xFF;
                else tileWidth = ((lpLocal[0]->lpGbl->wWidth * ((lpMode[modeIndex].dwBP
P + 1) / 8)) + 0xFF) & -0xFF;
            }
        } else {
            tileWidth = displayPitch;
        }
        bytesRequested = (DWORD)(lpLocal[0]->lpGbl->wHeight + 16) * tileWidth;
        bytesRequested = (bytesRequested + 2047) & -2047;    // size granularity of 2k (
```

6

```
1 RDRAM page)

        if (lpLocal[0]->lpGbl->dwGlobalFlags & DDRAWISURFGBL_ISGDISURFACE) {
            // no need to allocate more memory for primary surface, already allocated
            lpLocal[0]->lpGbl->fpVidMem = dwFBBaseAddr;
            // grab an accurate memory size before backbuffer allocation
            pDriverData->pPrivDDInfo->dwRDRAMAvailable = VSPGetAvailableVidMem();
            // do an allocation which is too big to succeed to force RM to compact memo
ry
            if (pDriverData->pPrivDDInfo->dwRDRAMAvailable > 65536) {
                    VSPAlloc(lpLocal[0], pDriverData->pPrivDDInfo->dwRDRAMAvailable - 6
5536, curProcIndex);
                    if (lpLocal[0]->lpGbl->dwReserved1 != 0) VSPDealloc(lpLocal[0]);
            }
            // do no allocation, but create the private surface info structure
            VSPAlloc(lpLocal[0], 0, curProcIndex);
            privSurfInfo = (LPPRIVATE_DDSURFACEINFO)lpLocal[0]->lpGbl->dwReserved1;
            privSurfInfo->llVSPAddress = VFB | VSPOFFSET_KERNEL_BIT | VSPOFFSET_TILE_BI
T;
            privSurfInfo->dwView = kFrameBufferView;
            privSurfInfo->dwViewBase = dwFBBaseAddr + VFB;
            // begin degradation of other processes
            VSPBeginSurfaceAllocation(&(pDriverData->pPrivDDInfo->dwRDRAMAvailable));
            surfaceAllocDone = FALSE;
        } else {
            // allocate display tiled memory
            VSPAlloc(lpLocal[0], bytesRequested, curProcIndex);
            if (lpLocal[0]->lpGbl->dwReserved1 == 0) {
                lpCreateSurfaceData->ddRVal = DDERR_OUTOFVIDEOMEMORY;
                return DDHAL_DRIVER_HANDLED;
            }
            privSurfInfo = (LPPRIVATE_DDSURFACEINFO)lpLocal[0]->lpGbl->dwReserved1;
            if (lpDDSurf->ddsCaps.dwCaps & DDSCAPS_ZBUFFER) {
                // zbuffers always lock to 18 bit all view
                privSurfInfo->lpTrueHostAddress = VSPLock(lpLocal[0], k18BitView);
                // ensure that it is aligned to beginning of tile boundary
                privSurfInfo->lpTrueHostAddress = (LPVOID)(dwFBBaseAddr + V18ALL + ((((
FLATPTR)privSurfInfo->lpTrueHostAddress - dwFBBaseAddr - V18ALL) * (displayPitch >> 8) / (t
ileWidth >> 8) + (displayPitch * 16 - 1)) & ~(displayPitch * 16 - 1)));
                privSurfInfo->llVSPAddress = (((FLATPTR)privSurfInfo->lpTrueHostAddress
 - dwFBBaseAddr - V18ALL) >> 1) | VSPOFFSET_KERNEL_BIT | VSPOFFSET_TILE_BIT;
                privSurfInfo->dwView = k18BitView;
                privSurfInfo->dwViewBase = dwFBBaseAddr + V18ALL;
                // for now, keep a copy in fpvidmem
                lpLocal[0]->lpGbl->fpVidMem = (FLATPTR)privSurfInfo->lpTrueHostAddress;
            } else {
                lpLocal[0]->lpGbl->fpVidMem = (FLATPTR)VSPLock(lpLocal[0], kFrameBuffer
View);
                // ensure that it is aligned to beginning of tile boundary
                if (view == k32To16BitView) {
                    lpLocal[0]->lpGbl->fpVidMem = dwFBBaseAddr + ((((lpLocal[0]->lpGbl-
>fpVidMem - dwFBBaseAddr) << 1) * (displayPitch >> 9) / (tileWidth >> 8) + (displayPitch *
8 - 1)) & ~(displayPitch * 8 - 1));
                } else {
                    lpLocal[0]->lpGbl->fpVidMem = dwFBBaseAddr + (((lpLocal[0]->lpGbl->
fpVidMem - dwFBBaseAddr) * (displayPitch >> 8) / (tileWidth >> 8) + (displayPitch * 8 - 1))
 & ~(displayPitch * 8 - 1));
                }
                privSurfInfo->llVSPAddress = lpLocal[0]->lpGbl->fpVidMem - dwFBBaseAddr
 - VFB;

                                        7
```

```
                if (view == k32To16BitView) privSurfInfo->llVSPAddress >>= 1;
                privSurfInfo->llVSPAddress |= VSPOFFSET_KERNEL_BIT | VSPOFFSET_TILE_BIT
;
                privSurfInfo->dwView = kFrameBufferView;
                privSurfInfo->dwViewBase = dwFBBaseAddr + VFB;
            }
            UpdateMemoryAvailable(lpCreateSurfaceData->lpDD, bytesRequested);
        }
        privSurfInfo->dwTileMode = PSTM_TILEMODE_1;
        lpLocal[0]->lpGbl->lPitch = displayPitch;
        privSurfInfo->lpTrueHostAddress = (LPVOID)lpLocal[0]->lpGbl->fpVidMem;

        // if this is a (rendering surface or zbuffer) and not a texture and 18 bpp and
 enabled, then enable 1/4 screen rendering
        if ((d3dLevel != 0) && fullScreen && (lpDDSurf->ddsCaps.dwCaps & (DDSCAPS_3DDEV
ICE | DDSCAPS_ZBUFFER)) && (lpMode[modeIndex].dwBPP == 16 || lpMode[modeIndex].dwBPP == 15
|| lpMode[modeIndex].dwBPP == 32)) {
            if (lpDDSurf->ddsCaps.dwCaps & DDSCAPS_ZBUFFER) privSurfInfo->dwQResState =
 1;
            else privSurfInfo->dwQResState = 0;
            if (d3dLevel & D3DQUALITY_AUTOSELECT) {
                // if surface is smaller then 120001 pixels, then go to high quality, e
lse 1/4 render min averaging
                if ((DWORD)(lpLocal[0]->lpGbl->wHeight) * (DWORD)(lpLocal[0]->lpGbl->wW
idth) <= 120000) {
                    privSurfInfo->bQResCapable = 0;
                    privSurfInfo->dwQResState = 0;
                } else privSurfInfo->bQResCapable = D3DQUALITY_MINAVG;
            } else privSurfInfo->bQResCapable = d3dLevel;
        }

        // if a flippable surface, then create backbuffers too.
        if (lpDDSurf->ddsCaps.dwCaps & DDSCAPS_FLIP) {
            allocFailed = FALSE;
            for (i=1; i<(lpLocal[0]->dwBackBufferCount + 1); i++) {
                VSPAlloc(lpLocal[i], bytesRequested, curProcIndex);
                if (lpLocal[i]->lpGbl->dwReserved1 == 0) {
                    allocFailed = TRUE;
                } else {
                    privSurfInfo = (LPPRIVATE_DDSURFACEINFO)lpLocal[i]->lpGbl->dwReserv
ed1;
                    privSurfInfo->dwTileMode = PSTM_TILEMODE_1;
                    lpLocal[i]->lpGbl->fpVidMem = (FLATPTR)VSPLock(lpLocal[i], kFrameBu
fferView);
                    if (view == k32To16BitView) {
                        lpLocal[i]->lpGbl->fpVidMem = dwFBBaseAddr + ((((lpLocal[i]->lp
Gbl->fpVidMem - dwFBBaseAddr) << 1) * (displayPitch >> 9) / (tileWidth >> 8) + (displayPitc
h * 8 - 1)) & ~(displayPitch * 8 - 1));
                    } else {
                        lpLocal[i]->lpGbl->fpVidMem = dwFBBaseAddr + (((lpLocal[i]->lpG
bl->fpVidMem - dwFBBaseAddr) * (displayPitch >> 8) / (tileWidth >> 8) + (displayPitch * 8 -
 1)) & ~(displayPitch * 8 - 1));
                    }
                    privSurfInfo->llVSPAddress = lpLocal[i]->lpGbl->fpVidMem - dwFBBase
Addr - VFB;
                    if (view == k32To16BitView) privSurfInfo->llVSPAddress >>= 1;
                    privSurfInfo->llVSPAddress |= VSPOFFSET_KERNEL_BIT | VSPOFFSET_TILE
_BIT;
                    privSurfInfo->dwView = kFrameBufferView;
                    privSurfInfo->dwViewBase = dwFBBaseAddr + VFB;

                                        8
```

```
                    UpdateMemoryAvailable(lpCreateSurfaceData->lpDD, bytesRequested);
                    lpLocal[i]->lpGbl->lPitch = displayPitch;
                    privSurfInfo->lpTrueHostAddress = (LPVOID)lpLocal[i]->lpGbl->fpVidM
em;
                    // if this is a (rendering surface or zbuffer) and not a texture an
d 16 bpp and enabled, then enable 1/4 screen rendering
                    if ((d3dLevel != 0) && fullScreen && (lpDDSurf->ddsCaps.dwCaps & (D
DSCAPS_3DDEVICE | DDSCAPS_ZBUFFER)) && (lpMode[modeIndex].dwBPP == 16 || lpMode[modeIndex].
dwBPP == 15 || lpMode[modeIndex].dwBPP == 32)) {
                        if (lpDDSurf->ddsCaps.dwCaps & DDSCAPS_ZBUFFER) privSurfInfo->d
wQResState = 1;
                        else privSurfInfo->dwQResState = 0;
                        if (d3dLevel & D3DQUALITY_AUTOSELECT) {
                            // if surface is smaller then 120001 pixels, then go to hig
h quality, else 1/4 render min averaging
                            if ((DWORD)(lpLocal[i]->lpGbl->wHeight) * (DWORD)(lpLocal[i
]->lpGbl->wWidth) <= 120000) {
                                privSurfInfo->bQResCapable = 0;
                                privSurfInfo->dwQResState = 0;
                            } else privSurfInfo->bQResCapable = D3DQUALITY_MINAVG;
                        } else privSurfInfo->bQResCapable = d3dLevel;
                    }
                    if ((lpLocal[i]->lpGbl->fpVidMem - dwFBBaseAddr + (bytesRequested *
 (displayPitch >> 8) / (tileWidth >> 8))) > 0x400000) allocFailed = TRUE;
                }
            }
            // HWFIX: if in 15, 16, 32 bpp and (fpVidMem+size) > 4M, then reject
            if (allocFailed && (lpMode[modeIndex].dwBPP==15 || lpMode[modeIndex].dwBPP=
=16 || lpMode[modeIndex].dwBPP==32)) {
                for (i=1; i<(lpLocal[0]->dwBackBufferCount + 1); i++) {
                    VSPUnlock(lpLocal[i]);
                    VSPDealloc(lpLocal[i]);
                    pDriverData->pPrivDDInfo->dwRDRAMAvailable += bytesRequested;
                    UpdateMemoryAvailable(lpCreateSurfaceData->lpDD, (DWORD)(-(long)byt
esRequested));
                }
                lpCreateSurfaceData->ddRVal = DDERR_OUTOFVIDEOMEMORY;
                return DDHAL_DRIVER_HANDLED;
            }
        }

        lpCreateSurfaceData->ddRVal = DD_OK;
        return DDHAL_DRIVER_HANDLED;

    } else if (lpDDSurf->ddsCaps.dwCaps & DDSCAPS_COMPLEX) {
        return DDHAL_DRIVER_NOTHANDLED;
    }
  }
  return DDHAL_DRIVER_NOTHANDLED;
}
```

We claim:

1. A method of dynamically adjusting a resolution of a first image comprising:

rendering the first image at a first resolution;

for each pixel of the first image, generating a plurality of pixels of a second image, said second image having a second resolution, wherein each pixel of the first image has a same number of bits as each pixel of the second image; and performing a 2-D graphical operation on the second image.

2. The method of claim 1, wherein the plurality of pixels of the second image generated for the pixel of the first image further comprises a pixel block, the pixel of the first image being replicated in each pixel of the pixel block.

3. The method of claim 1, wherein the plurality of pixels of the second image generated for the pixel of the first image are determined by bilinear center-biased interpolation.

4. The method of claim 3, wherein the plurality of pixels of the second image generated for the pixel of the first image are determined by bilinear filtering.

5. The method of claim 3, wherein the plurality of pixels of the second image generated for the pixel of the first image are determined by subpixel correction.

6. A method of dynamically adjusting a resolution of a first image rendered at a first resolution comprising:

performing a 2-D graphical operation on the first image;

subdividing the first image into a plurality of pixel blocks, each pixel block comprising a plurality of pixels;

for each pixel block of the first image, generating only one pixel of a second image, said second image having a second resolution.

7. The method of claim 6, wherein each of said pixels has a value, the value of the pixel of the second image generated for the pixel block of the first image being determined by averaging the values of all pixels in the pixel block of the first image.

8. A method for rendering 3-D graphical images on a memory of a computer comprising:

rendering a first image at a first resolution;

receiving a request to perform a graphical operation on the first image;

determining a type of the graphical operation;

upon determining that the graphical operation is of a first type, generating a second image having a second resolution by enhancing the resolution of the first image and performing the graphical operation on the second image; and upon determining that the graphical operation is of a second type, performing the graphical operation on the first image.

9. A method for rendering 3-D graphical images on a memory of a computer comprising:

rendering a first image at a first resolution; rendering a second image at a second resolution;

receiving a request to perform a graphical operation on the first image and the second image;

determining a type of the graphical operation;

upon determining that the graphical operation is of a first type, generating a third image having a third resolution by enhancing the resolution of the first image and performing the graphical operation on the second and the third images; and upon determining that the graphical operation is of a second type, generating a fourth image having a fourth resolution by enhancing the resolution of the second image and performing the graphical operation on the first and the fourth images; and upon determining that the graphical operation is of a third type, generating a third image having a third resolution by enhancing the resolution of the first image, generating a fourth image having a fourth resolution by enhancing the resolution of the second image, and performing the graphical operation on the third and the fourth images; and upon determining that the graphical operation is of a fourth type, performing the graphical operation on the first and the second images.

10. A method of rendering 3-D graphical images by dynamically adjusting a resolution of an image, comprising:

rendering a first image at a first resolution;

receiving a request to perform a graphical operation on the first image;

generating a second image having a second resolution by enhancing the resolution of the first image using a predetermined technique; and performing the operation on the second image.

11. The method of claim 10, wherein the predetermined technique comprises bilinear center-biased interpolation.

12. The method of claim 10, wherein the predetermined technique comprises bilinear filtering.

13. The method of claim 10, wherein the predetermined technique comprises subpixel correction.

14. A method of dynamically adjusting a resolution of a first z-buffer comprising:

rendering the first z-buffer at a first resolution;

for each pixel of the first z-buffer, generating a plurality of pixels of a second z-buffer, said second z-buffer having a second resolution; and performing a 2-D graphical operation on the second z-buffer.

15. The method of claim 14, wherein the plurality of pixels of the second z-buffer generated for the pixel of the first z-buffer further comprises a pixel block, the pixel of the first z-buffer being replicated in each pixel of the pixel block.

16. A method of dynamically adjusting a resolution of a first z-buffer rendered at a first resolution comprising:

performing a 2-D graphical operation on the first z-buffer;

subdividing the first z-buffer into a plurality of pixel blocks, each pixel block comprising a plurality of pixels;

for each pixel block of the first z-buffer, generating only one pixel of a second z-buffer, said second z-buffer having a second resolution.

17. The method of claim 16, wherein each of said pixels has a value, the value of the pixel of the second z-buffer generated for the pixel block of the first z-buffer being determined by using subpixel correction to move the center of the pixel of the first z-buffer to the upper left corner of the pixel of the first z-buffer.

* * * * *